(12) United States Patent
Sekizawa

(10) Patent No.: US 6,430,711 B1
(45) Date of Patent: Aug. 6, 2002

(54) SYSTEM AND METHOD FOR MONITORING THE STATE OF A PLURALITY OF MACHINES CONNECTED VIA A COMPUTER NETWORK

(75) Inventor: Hiroaki Sekizawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/226,332

(22) Filed: Jan. 6, 1999

(30) Foreign Application Priority Data

| Jan. 6, 1998 | (JP) | 10-000694 |
|---|---|---|
| Mar. 27, 1998 | (JP) | 10-081169 |
| Mar. 27, 1998 | (JP) | 10-081170 |
| Apr. 6, 1998 | (JP) | 10-093737 |
| Apr. 6, 1998 | (JP) | 10-093738 |
| Dec. 7, 1998 | (JP) | 10-347359 |

(51) Int. Cl.[7] .................... G06F 11/32; G06K 15/00
(52) U.S. Cl. ................ 714/47; 358/1.14; 358/1.15
(58) Field of Search .................... 714/47, 39; 709/217, 709/224, 223, 249, 238; 710/1, 105, 15, 62; 340/825.06, 286.02; 399/18; 700/169, 175, 108, 110; 370/908; 347/17, 101; 358/1.14, 1.15

(56) References Cited

U.S. PATENT DOCUMENTS

| 4,251,858 A | * | 2/1981 | Cambigue et al. |
|---|---|---|---|
| 5,077,582 A | | 12/1991 | Kravette et al. |
| 5,084,875 A | | 1/1992 | Weinberger et al. |
| 5,214,772 A | | 5/1993 | Weinberger et al. |
| 5,220,674 A | * | 6/1993 | Morgan et al. |
| 5,305,199 A | | 4/1994 | LoBiondo et al. |
| 5,333,286 A | | 7/1994 | Weinberger et al. |
| 5,580,177 A | * | 12/1996 | Gase et al. |
| 5,604,578 A | | 2/1997 | Shibuya et al. |
| 5,651,006 A | | 7/1997 | Fujino et al. |
| 5,727,135 A | * | 3/1998 | Webb et al. |
| 5,859,778 A | | 1/1999 | Kuroda et al. |
| 5,982,994 A | * | 11/1999 | Mori et al. |
| 6,088,816 A | * | 7/2000 | Nouri et al. |

FOREIGN PATENT DOCUMENTS

| JP | 03-161765 | 7/1991 |
|---|---|---|
| JP | 04-256971 | 9/1992 |
| JP | 5-191405 | 7/1993 |
| JP | 05-236555 | 9/1993 |
| JP | 06-284150 | 10/1994 |
| JP | 06-348632 | 12/1994 |
| JP | 07-044630 | 2/1995 |
| JP | 07-288871 | 10/1995 |
| JP | 08-115125 | 5/1996 |
| JP | 08-241019 | 9/1996 |
| JP | 08-286854 | 11/1996 |
| JP | 09-134297 | 5/1997 |
| JP | 09-152815 | 6/1997 |
| JP | 9-188042 | 7/1997 |
| JP | 09-251356 | 9/1997 |

* cited by examiner

Primary Examiner—Gopal C. Ray
(74) Attorney, Agent, or Firm—Stroock & Stroock & Lavan LLP

(57) ABSTRACT

Each agent unit gets status information indicating the state of each of network printers connected by a LAN from the network printers every first time period. Whenever each agent unit gets the status information from the network printer, it overwrites a status log data file with the gotten status information. Each agent unit converts all status information stored in the status log data file into status mail of electronic mail and transmits the status mail to a mail server every second time period longer than the first time period. On the other hand, a console unit accesses the mail server and reads the status mail in a proper time period to the console unit.

69 Claims, 42 Drawing Sheets

FIG. 11

CUSTOMER INFORMATION

OK
CLOSE

AGENCY MAIL ADDRESS
aspa@xxxxxxx.jp

☑ TRANSMIT ALSO TO EPSON: aspa@xxxxxxx.jp ▶

IMPORT
EXPORT

CUSTOMER INFORMATION

CUSTOMER NAME: ○×△CORPORATION
ADDRESS: ... MATSUMOTO CITY, NAGANO
TEL NO.: 0263 - 12 - 3456   FAX NO.: 0263 - 12 - 3456
ADMINISTRATOR: TARO SHINANO
MAIL ADDRESS: aspa@xxxxxxx.jp
REMARKS:

STATUS TRANSMISSION

⦿ INTERVAL SPECIFICATION: 2 HOURS   0 MINUTES
○ TIME SPECIFICATION: 2 HOURS   0 MINUTES   ▶

FIG. 12

MAIL HEADER FORMAT  φ5

| ITEM | MESSAGE |
|---|---|
| Subject | CDS CustomerMessage |

MAIL TEXT FORMAT

| CUSTOMER NAME BEFORE CHANGE | CUSTOMER NAME BEFORE CHANGE (BLANK FOR NEW CUSTOMER) |
|---|---|
| CUSTOMER NAME AFTER CHANGE | CUSTOMER NAME AFTER CHANGE (DITTO FOR NEW CUSTOMER) |
| ADDRESS 1 | CUSTOMER ADDRESS 1 |
| ADDRESS 2 | CUSTOMER ADDRESS 2 |
| TEL 1, TEL 2, TEL 3 | CUSTOMER TELEPHONE NUMBER |
| FAX 1, FAX 2, FAX 3 | CUSTOMER FAX NUMBER |
| ADMINISTRATOR | CUSTOMER ADMINISTRATOR |
| MAIL ADDRESS | MAIL ADDRESS OF AGEN UNIT ADMINISTRATOR |
| REMARKS | REMARKS |
| UPDATE DATE AND TIME | LAST UPDATE DATE AND TIME IN AGENT UNIT |

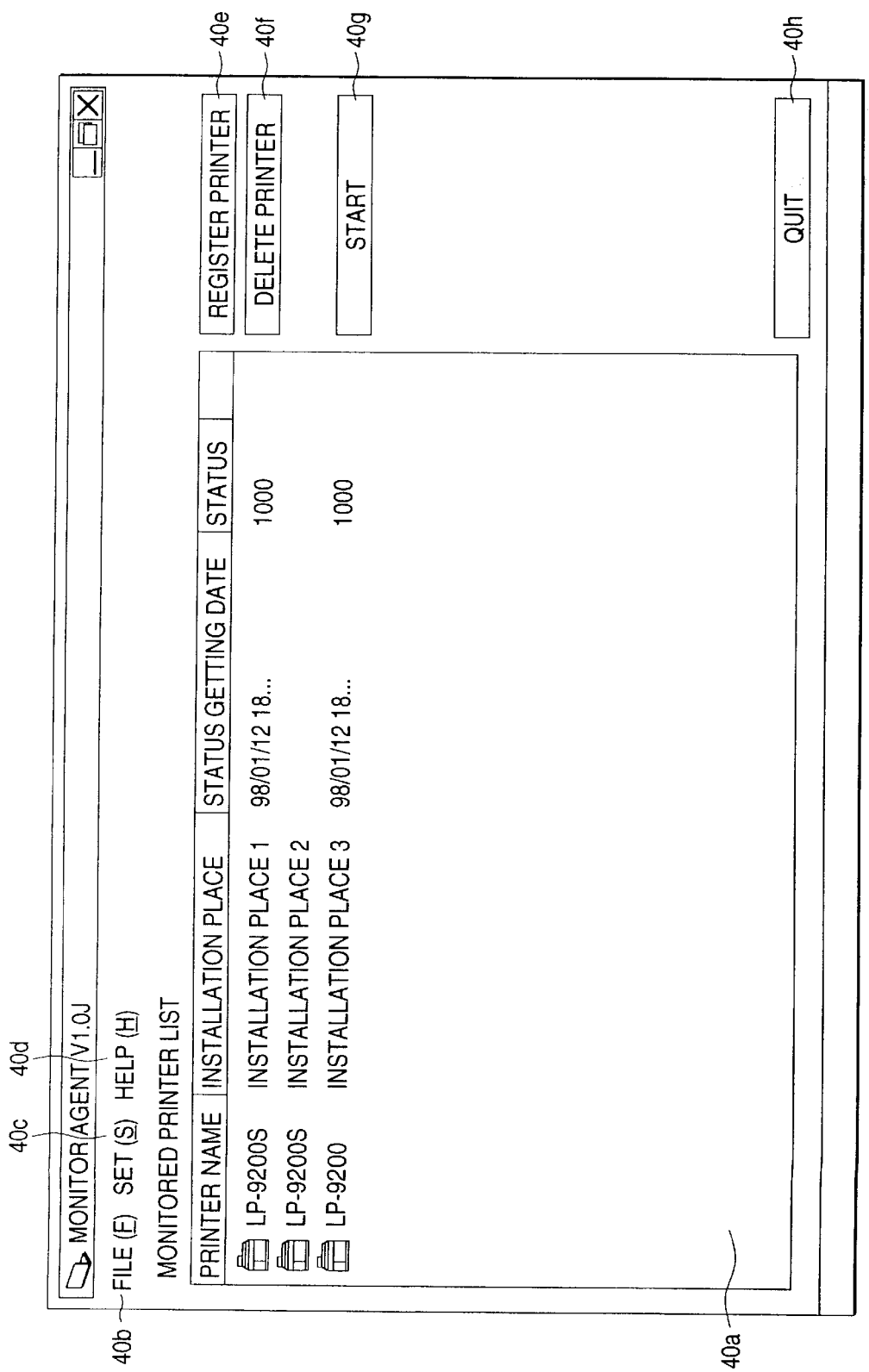

FIG. 17

| | 12c |
|---|---|
| IP ADDRESS | IP ADDRESS OF PRINTER |
| SERIAL NUMBER | SERIAL NUMBER OF PRINTER MONITORED BY AGENT UNIT<br>EXAMPLE: AAX0027122 |
| PRINTER INSTALLATION PLACE | INSTALLATION PLACE OF PRINTER |
| PRINTER MANUFACTURER NAME | MANUFACTURER NAME OF PRINTER |
| MODEL NAME | PRINTER NAME |
| PRINTER TYPE | PAGE: PAGE PRINTER<br>COLOR PAGE: COLOR PAGE PRINTER |
| MONITOR FLAG | DETERMINATION AS TO WHETHER OR NOT PRINTER IS TO BE MONITORED<br>0: NOT MONITOR<br>1: MONITOR |
| DATE AND TIME | DATE AND TIME AT WHICH STATUS WAS GOTTEN |
| STATUS CODE | CURRENT STATUS CODE |

FIG. 18

MAIL HEADER FORMAT  φ4

| ITEM | MESSAGE |
|---|---|
| Subject | CDS PrinterMessage |

MAIL TEXT FORMAT

| "SERIAL NUMBER BEFORE CHANGE" | , | "SERIAL NUMBER AFTER CHANGE" | , | "PRINTER INSTALLATION PLACE" | , | "PRINTER NAME" | , |

| "PRINTER TYPE" | , | "CUSTOMER NAME" | , | "ADDRESS 1" | , | "ADDRESS 2" | , | "TEL 1" | , |

| "TEL 2" | , | "TEL 3" | , | "FAX 1" | , | "FAX 2" | , |

| "FAX 3" | , | "ADMINIS-TRATOR" | , | "MAIL ADDRESS" | , | "REMARKS" | , |

| "UPDATE DATE AND TIME" | ¥n |

| FIELD NAME | DESCRIPTION |
| --- | --- |
| CUSTOMER MAIL ADDRESS | MAIL ADDRESS OF CUSTOMER HAVING PRINTER WHOSE STATUS WAS GOTTEN |
| INFORMATION GETTING DATE AND TIME | DATE AND TIME AT WHICH MONITOR AGENT MONITORED<br>FORMAT:<br>EXAMPLE: 1997/09/30 13:39:17 |
| S/N | SERIAL NUMBER OF PRINTER |
| PRINTER STATUS | STATUS CODE OF PRINTER MONITORED BY MONITOR AGENT |
| TONER REMAINING AMOUNT | TONER REMAINING AMOUNT (%) IN PRINTER STATUS |
| INK REMAINING AMOUNT 1 | INK REMAINING AMOUNT (%): BLACK |
| INK REMAINING AMOUNT 2 | INK REMAINING AMOUNT (%): CYAN |
| INK REMAINING AMOUNT 3 | INK REMAINING AMOUNT (%): MAGENTA |
| INK REMAINING AMOUNT 4 | INK REMAINING AMOUNT (%): YELLOW |
| WASTE TONER | WASTE TONER BOX USE AMOUNT |
| OIL ROLL | OIL ROLL REMAINING AMOUNT |
| PHOTOSENSITIVE UNIT REMAINING LIFE | REMAINING LIFE OF POHOTOSENSITIVE UNIT IN PRINTER STATUS |
| TOTAL NUMBER OF PRINT SHEETS | TOTAL NUMBER OF PRINT SHEETS |
| IN TERMS OF MONOCHROME PRINT | TOTAL NUMBER OF PRINT SHEETS IN TERMS MONOCHROME PRINT |
| COLOR RATIO | COLOR PRINT RATIO |

FIG. 20

| ERROR LEVEL | CODE | DISPLAY STATUS MESSAGE |
|---|---|---|
| ⊗ Fatal Error | > 6000 XXXX | SERVICE CALL ERROR<br>FATAL ERROR CONTINUES FOR ONE HOUR OR MORE |
| ⓘ Waning | 2001 | TONER IS GETTING LOW |
| | 2002 | PRINT WITH SOME OMISSION BECAUSE OF MEMORY SHORTAGE |
| | 2003 | MEMORY SHOULD BE ADDED |
| | 3000 | PRINT OVERRUN |
| | 3001 | MEMORY SHORTAGE |
| | 3004 | MEMORY FOR PRINTING REAR SIDE IS INSUFFICIENT |
| | 4001 | TONER OUT |
| | 4003 | IC CARD OR DIMM WRITE RESULTED IN FAILURE |
| | 4008 | PAPER JAM |
| | 4009 | PAPER FEED ERROR |
| | 4012 | PAPER JAM IN PAPER DISCHARGE SECTION |
| | 4014 | UNAVAILABLE OPTION TYPE B INTERFACE CARD IS MOUNTED |
| | 4017 | PAPER JAM IN DOUBLE-SIDED UNIT |
| ⓘ Information | 1000 | IDLE (PRINTABLE) |
| | 1001 | UNPRINTABLE |
| | 1002 | JOB EXECUTION (PRINTABLE) |
| | 1003 | JOB CANCEL |
| | 1004 | RESET PROCESSING |
| | 1005 | IC CARD OR DIMM WRITE |
| | 1006 | ENGINE WARMING UP |
| | 1007 | POWER SAVE MODE |
| | 1008 | FORCIBLE PAPER DISCHARGE |
| | 1009 | ENGINE PRINT OPERATION |
| | 1010 | TEST PRINT |
| | 1012 | INACTIVE INTERFACE |
| | 2000 | WRITABLE, BUT UNFORMATTED IC CARD OR DIMM IS INSERTED |
| | 2004 | PASSED PAPER SIZE AND SIZE OF PAPER TO BE ATTEMPTED TO PRINT DO NOT MATCH |
| | 2005 | DOUBLE-SIDED PRINT IS CANCELED |
| | 2007 | PCMCIA CARD BACKUP POWER BATTERY HAS INSUFFICIENT CAPACITY |
| | 3003 | PAPER SIZE SET TO SHEET FEEDER AND SIZE OF PAPER TO BE ATTEMPTED TO PRINT DO NOT MATCH |
| | 4000 | TONER CARTRIDGE IS NOT SET |
| | 4002 | PRINTER COVER IS OPEN |
| | 4003 | UNAVAILABLE IC CARD, CARTRIDGE OR DIMM IS INSERTED |
| | 4004 | IC CARD OR CARTRIDGE IS INSERTED OR EXTRACTED IN INSERTION/EXTRACTION INHIBIT MODE |
| | 4007 | PAPER CASSETTE IS NOT SET |
| | 4010 | NO PAPER |
| | 4011 | PAPER FEED ERROR OR NO PAPER |
| | 4013 | PAPER THAT CANNOT BE PRINTED IN PORTRAIT ORIENTATION IS SET IN PORTRAIT ORIENTATION |
| | 4015 | DOUBLE-SIDED UNIT COVER IS OPEN |
| | 4016 | MISMATCH BETWEEN PASSED PAPER SIZE AND SIZE OF PAPER TO BE ATTEMPTED TO PRINT IN DOUBLE-SIDED PRINT MODE |
| | 4018 | UNAVAILABLE Localtalk/serial Module IS MOUNTED |
| | 4019 | PCMCIA CARD BACKUP BATTERY OUT |
| | 4020 | COMMUNICATION ERROR OCCURRED IN SERIAL I/F |
| ⓘ Information | | MISCELLANEOUS ERROR<br>    THIS ERROR OCCURS IF PRINTER POWER IS OFF OR ASP MONITOR AGENT DOES NOT NORMALLY OPERATE. |

FIG. 21

| | 12d |
|---|---|
| INFORMATION GETTING DATE AND TIME | DATE AND TIME AT WHICH FATAL ERROR OCCURRED. USED AS ONE-HOUR CONTINUATION DETERMINATION. FORMAT: EXAMPLE: 97/09/30 PM1:39:17 |
| PRINTER SERIAL NUMBER | SERIAL NUMBER OF PRINTER MONITORED BY AGENT UNIT EXAMPLE: AAX0027122 |
| IP ADDRESS | IP ADDRESS OF PRINTER TO BE MONITORED FOR ONE-HOUR CONTINUATION |
| PRINTER TYPE | PAGE: PAGE PRINTER COLOR PAGE: COLOR PAGE PRINTER |
| STATUS CODE | STATUS CODE WHEN FATAL ERROR OCCURRED |

FIG. 22

MAIL HEADER FORMAT    φ2

| ITEM | MESSAGE |
|---|---|
| Subject | CDS Message: *Mail Address* |

MAIL TEXT FORMAT

| FIELD NAME | DESCRIPTION |
|---|---|
| CUSTOMER MAIL ADDRESS | MAIL ADDRESS OF CUSTOMER HAVING PRINTER WHOSE STATUS WAS GOTTEN |
| INFORMATION GETTING DATE AND TIME | DATE AND TIME AT WHICH MONITOR AGENT MONITORED<br>FORMAT:<br>EXAMPLE: 1997/09/30 13:39:17 |
| S/N | SERIAL NUMBER OF PRINTER |
| PRINTER STATUS | STATUS CODE OF PRINTER MONITORED BY MONITOR AGENT |
| TONER REMAINING AMOUNT | TONER REMAINING AMOUNT (%) IN PRINTER STATUS |
| INK REMAINING AMOUNT 1 | INK REMAINING AMOUNT (%): BLACK |
| INK REMAINING AMOUNT 2 | INK REMAINING AMOUNT (%): CYAN |
| INK REMAINING AMOUNT 3 | INK REMAINING AMOUNT (%): MAGENTA |
| INK REMAINING AMOUNT 4 | INK REMAINING AMOUNT (%): YELLOW |
| WASTE TONER | WASTE TONER BOX USED AMOUNT |
| OIL ROLL | OIL ROLL REMAINING AMOUNT |
| PHOTOSENSITIVE UNIT REMAINING LIFE | REMAINING LIFE OF POHOTOSENSITIVE UNIT IN PRINTER STATUS |
| TOTAL NUMBER OF PRINT SHEETS | TOTAL NUMBER OF PRINT SHEETS |
| IN TERMS OF MONOCHROME PRINT | TOTAL NUMBER OF PRINT SHEETS IN TERMS OF MONOCHROME PRINT |
| COLOR RATIO | COLOR PRINT RATIO |

FIG. 23

| TRANSMISSION DESTINATION MAIL ADDRESS | MAIL ADDRESS OF CONSOLE UNIT TO WHICH MAIL IS TO BE TRANSMITTED<br>EXAMPLE: aspc@xxx.xxx.co.jp |
|---|---|
| SERIAL NUMBER | SERIAL NUMBER OF PRINTER MONITORED BY AGENT UNIT<br>EXAMPLE: AAX0027122 |
| TRANSMISSION DATE AND TIME | DATE AND TIME AT WHICH AGENT UNIT TRANSMITTED STATUS<br>EXAMPLE: 97/09/30 PM 1:39:17 |
| TRANSMISSION STATUS | MAIL TRANSMISSION STATUS  0: NORMAL, NOT 0: ERROR |

FIG. 28

| TABLE NAME | FIELD NAME | ATTRIBUTE | SIZE | DESCRIPTION |
|---|---|---|---|---|
| AGENT INFORMATION | COMPANY NAME | Text | 100 | MONITOR AGENT INSTALLATION AGENCY NAME |
| | INSTALLATION DATE | Date/Time | 8 | MONITOR AGENT INSTALLATION DATE AND TIME |
| | TEL NUMBER | Text | 20 | AGENCY TELEPHONE NUMBER |
| | FAX NUMBER | Text | 20 | AGENCY FAX NUMBER |
| | ADMINISTRATOR | Text | 100 | PERSON IN CHARGE OF ADMINISTRATING MONITOR AGENT |
| | REMARKS | Text | 255 | REMARKS INFORMATION |
| | MONITOR INTERVAL | Number | 4 | RECEPTION PARTY ADDRESS RECEPTION INTERVAL OF MAIL SENT FROM CUSTOMERS |
| | NON-RECEPTION DETERMINATION CRITERION | Number | 1 | TIMER SPECIFICATION OR INTERVAL SPECIFICATION FOR NON-RECEPTION DETERMINATION |
| | NON-RECEPTION DETERMINATION | Number | 4 | NON-RECEPTION DETERMINATION TIME |
| | SYSTEM LOG SIZE | Number | 4 | NUMBER OF RECORDS TO DISPLAY PAST INFORMATION OF PRINTER STATUS |
| CUSTOMER INFORMATION | CUSTOMER CODE | Number | 4 | CODE ASSIGNED BY SYSTEM |
| | COMPANY NAME | Text | 100 | CUSTOMER NAME |
| | CUSTOMER PILOT TEL NUMBER | Text | 20 | PILOT TEL NUMBER OF CUSTOMER |
| | CUSTOMER PILOT FAX NUMBER | Text | 20 | PILOT FAX NUMBER OF CUSTOMER |
| | ADDRESS 1 | Text | 255 | CUSTOMER ADDRESS 1 |
| | ADDRESS 2 | Text | 255 | CUSTOMER ADDRESS 2 |
| | REPRESENTATIVE | Text | 100 | CUSTOMER REPRESENTATIVE |
| | E-MAIL ADDRESS | Text | 128 | MAIL ADDRESS OF MACHINE IN WHICH MONITOR AGENT IS INSTALLED |
| | ADMINISTRATOR MAIL ADDRESS | Text | 128 | MAIL ADDRESS OF MONITOR AGENT ADMINISTRATOR |
| | LAST UPDATE DATE AND TIME | Date/time | 8 | INFORMATION UPDATE DATE AND TIME |
| | REMARKS | Text | 255 | REMARKS INFORMATION |
| | ERROR LEVEL | Text | 1 | MOST RECENT STATUS  A: Fatal  B: Warning  C: Information  D: Default |
| | AGENCY MEMO | Memo | | AGENCY MEMO IS STORED |
| | TRANSMISSION SETTING | Text | 1 | INTERVAL SPECIFICATION OR TIME SPECIFICATION FOR TRANSMISSION |
| | TRANSMISSION DAY UNITS | Text | 1 | DAY INTERVALS OF INTERVAL SPECIFICATION TRANSMISSION |
| | TRANSMISSION TIME | Text | 1 | TRANSMISSION TIME |
| | TRANSMISSION INTERVAL | Number | 4 | TRANSMISSION INTERVAL PRINTER INFORMATION |

| | | | | |
|---|---|---|---|---|
| PRINTER INFORMATION | S/N | Text | 10 | SERIAL NUMBER OF PRINTER |
| | CUSTOMER CODE | Number | 4 | EXTERNAL REFERENCE TO CUSTOMER CODE IN CUSTOMER INFORMATION |
| | PRINTER NAME | Text | 40 | PRINTER NAME |
| | PRINTER TYPE | Text | 10 | PRINTER TYPE: PAGE, SIDM_1, SIDM_2, INJ_1, INJ_2, NO TYPE |
| | ADMINISTRATION DEPARTMENT | Text | 100 | ADMINISTRATION DEPARTMENT OF PRINTER |
| | STATUS | Text | 5 | STORAGE OF STATUS CODE FROM PRINTER |
| | ERROR LEVEL | Text | 1 | MOST RECENT STATUS A: Fatal B: Warning C: Information D: Default |
| | INFORMATION GETTING DATE AND TIME | Date/Time | 8 | DATE AND TIME AT WHICH INFORMATION WAS GOTTEN |
| | INFORMATION UPDATE DATE AND TIME | Date/Time | 8 | DATE AND TIME AT WHICH INFORMATION WAS UPDATED |
| | AGENCY MEMO | Memo | | MEMO IN AGENCY |
| STATUS INFORMATION | S/N | Text | 10 | EXTERNAL REFERENCE TO S/N IN PRINTER INFORMATION |
| | INFORMATION GETTING DATE AND TIME | Date/Time | 8 | DATE AND TIME AT WHICH INFORMATION WAS GOTTEN |
| | ERROR LEVEL | | 1 | HISTORY STATUS FOR EACH PRINTER A: Fatal B: Warning C: Information |
| | STATUS | Text | 5 | MAIL TEXT SENT FROM NOMITOR AGENT |
| | TONER/INK REMAINING AMOUNT | Number | 4 | TONER/INK REMAINING AMOUNT IN PRINTER |
| | INK REMAINING AMOUNT 1 | Number | 4 | INK REMAINING AMOUNT IN PRINTER (COLOR: BLACK) |
| | INK REMAINING AMOUNT 2 | Number | 4 | INK REMAINING AMOUNT IN PRINTER (COLOR: YELLOW) |
| | INK REMAINING AMOUNT 3 | Number | 4 | INK REMAINING AMOUNT IN PRINTER (COLOR: MAGENTA) |
| | INK REMAINING AMOUNT 4 | Number | 4 | INK REMAINING AMOUNT IN PRINTER (COLOR: CYAN) |
| | INK REMAINING AMOUNT 5 | Number | 4 | INK REMAINING AMOUNT IN PRINTER (COLOR: LIGHT CYAN) |
| | INK REMAINING AMOUNT 6 | Number | 4 | INK REMAINING AMOUNT IN PRINTER (COLOR: LIGHT MAGENTA) |
| | TOTAL NUMBER OF PLANES | Number | 4 | TOTAL NUMBER OF PLANES |
| | IN TERMS OF MONOCHROME PRINT | Number | 4 | TOTAL NUMBER OF PRINT SHEETS IN TERMS OF MONOCHROME PRINT |
| | COLOR RATIO | Number | 4 | COLOR PRINT RATIO |
| | CONSUMABLES | Text | 1 | CONSUMABLE FLAG 1: CONSUMABLE 0: OTHERS |
| | PHOTOSENSITIVE UNIT | Number | 4 | REMAINING LIFE OF PHOTOSENSITIVE UNIT |
| | OIL ROLL | Number | 4 | OIL ROLL REMAINING AMOUNT |
| | WASTE TONER | Number | 4 | WASTE TONER BOX USED AMOUNT |

FIG. 37

△ CUSTOMER INFORMATION

― CUSTOMER INFORMATION ―

CUSTOMER NAME: ○×△ CORPORATION

ADDRESS:

TEL NO.: ☐ - ☐ - ☐  FAX NO.: ☐ - ☐ - ☐

ADMINISTRATOR:

MAIL ADDRESS:

TRANSMISSION INTERVAL: ☐ HOURS ☐ MINUTES ☐ ONCE EVERY DAYS

REMARKS:

AGENCY MEMO:

[OK]  [CLOSE]  [DELETE CUSTOMER]

FIG. 40A

StatusReport:     1997/11/04   11:21:54

○△× CORPORATION (MAIL ADDRESS: aspa@xxx.xxx.co.jp)

LP-9200s

PRINT PERIOD: 97/11/04 ~ 97/11/08

| INFORMATION WAS GOTTEN AT: | TONER REMAINING AMOUNT | ERROR LEVEL | STATUS |
|---|---|---|---|
| 97/11/04 12:30:00 | 80% | 1 | IDLE (PRINTABLE) |
| 97/11/05 12:30:00 | 70% | 1 | IDLE (PRINTABLE) |
| 97/11/06 12:30:00 | 55% | 1 | IDLE (PRINTABLE) |
| 97/11/07 | 38% (PREDICTED VALUE) | | |
| 97/11/08 | 20% (PREDICTED VALUE) | | SUPPLY REQUIRED |

StatusReport: 1997/11/25 11:21:54

○△✕ CORPORATION (MAIL ADDRESS: aspa@xxx.xxx.co.jp)
LP-8300

PRINT PERIOD: 97/11/04 ~ 97/11/08

| INFORMATION WAS GOTTEN AT: | TONER REMAINING AMOUNT | ERROR LEVEL | STATUS |
|---|---|---|---|
| 97/11/04 12:30:00 | 50% | 1 | IDLE (PRINTABLE) |
| 97/11/14 12:30:00 | 42% | 1 | IDLE (PRINTABLE) |
| 97/11/18 12:30:00 | 30% | 1 | IDLE (PRINTABLE) |
| 97/11/25 12:30:00 | 20% | 1 | IDLE (PRINTABLE) |
| 97/12/02 | 10% (PREDICTED VALUE) | | SUPPLY REQUIRED |

57

SYSTEM AND METHOD FOR MONITORING THE STATE OF A PLURALITY OF MACHINES CONNECTED VIA A COMPUTER NETWORK

BACKGROUND OF THE INVENTION

1. Field of the Invention

The present invention relates to a machine monitor system for monitoring the state of each of a plurality of machines connected via a computer network, a local monitor unit and an integrated monitor unit making up such a machine monitor system, a machine monitor method using such a machine monitor system, a computer-readable medium storing a program for causing a computer to function as a local monitor unit, and a computer-readable medium storing a program for causing a computer to function as an integrated monitor unit.

2. Description of the Related Art

A printer is one of peripheral machines constructing a computer system centering on a personal computer. It consumes toner, ink, an ink ribbon, etc. (the "consumable article"), in response to its print method. When the remaining amount of toner, ink, etc., is low, the quality of the characters and images printed by the printer is degraded. When the printer runs out of toner, ink, etc., it cannot print and enters a non-operational state. Thus, it is desirable to monitor the remaining amount of the consumable article to avoid entry of the machine into a non-operational state.

Japanese Patent Number JP-A-9-188042 discloses an example of a recorder capable of monitoring consumables. The recorder disclosed here detects the remaining amount of ink, etc., and when the remaining amount falls below a predetermined value, the recorder automatically transmits an ink purchase order to a store by fax.

To realize the system described in JP-A-9-188042, a communication system for transmitting a purchase order to a store by fax, namely, a communication machine such as a modem and communication software must be built in each recorder. However, if the communication system is built in each recorder, a steep rise in costs of each recorder occurs. To connect each recorder to a telephone line, a considerable investment becomes necessary. Particularly, an extremely large number of printers are installed in offices as compared with copiers, thus building of a communication system in each recorder and connecting of each recorder to a telephone line cost enormously. On the other hand, in stores, facsimile machines receive purchase orders from the recorders; if a large number of recorders are involved, while a facsimile machine receives a purchase order issued from one printer, the facsimile communication occupies the telephone line, thus purchase orders issued from other units, etc., cannot be received. To avoid such a situation, the number of reception lines must be increased and a steep rise in costs of the reception system in the store also occurs. This point is a first problem in the related art.

In the system described in JP-A-9-188042, purchase orders are transmitted separately from printers to a store and personnel in the store must manually sort the purchase orders and adds up the order figures. However, as the number of recorders to be monitored increases, the number of purchase orders also increases, thus making it difficult to add up the order figures. The actual maintenance items for recorders include not only replenishment of consumables of ink, etc., but also items requiring dispatching of maintenance personnel such as photosensitive drum replacement. When requests for such maintenance are issued from printers, if maintenance personnel are dispatched as requested by the printers, there is a possibility that a number of maintenance persons may be dispatched separately to a plurality of recorders installed at the same site (namely, a plurality of recorders belonging to the same user) within a short time period. If maintenance personnel concentrate thus on one site, a situation in which other customers must wait a long time for maintenance personnel to come can also occur. This point is a second problem in the related art.

In the art described in JP-A-9-188042, the threshold value of the ink remaining amount for requesting the recorder to transmit a purchase order is set uniformly for all recorders. However, the consumption speed of consumables including ink, a photosensitive drum, and paper varies depending on the recorder installation place and the recorder application, thus the time interval between the instant at which a purchase order is transmitted and the instant at which consumables run out actually is multifarious. For example, for a printer with an extremely large ink consumption amount per day, the time interval between the instant at which the ink remaining amount falls below the threshold value and the instant at which ink runs out is shorter than that for a printer with a standard ink consumption amount. Therefore, if a purchase order is transmitted when the ink remaining amount falls below the threshold value, there is a possibility that the printer may run out of ink before ink sent according to the purchase order arrives at the user. In contrast, with a printer with an extremely small ink consumption amount per day, if ink is sent according to a purchase order transmitted when the ink remaining amount falls below the threshold value, there is a possibility that ink may still remain in the printer after the ink arrives at the user. In this case, the ink arriving at the user is kept idle without being loaded into the printer, thus it is feared that the ink quality may be degraded. Since purchase orders are sent to a store at random from recorders, orders may concentrate at a time in large quantities or no orders may be given. Thus, the store cannot predict shipment amounts and thus must always have large amounts of articles in stock. This point is a third problem in the related art.

SUMMARY OF THE INVENTION

It is a first object of the invention to solve the first problem in the related art and specifically to provide a configuration at low costs for eliminating the need for a communication system from each machine to be monitored and a totalizer of a special hardware configuration and enabling the machines to be reliably monitored regardless of the number of the monitored machines.

It is a second object of the invention to solve the second problem in the related art and specifically to provide a configuration which makes it possible to precisely keep track of the state of each of the machines to be monitored and efficiently dispatch maintenance personnel in user units if the machines to be monitored increase.

It is a third object of the invention to solve the third problem in the related art and specifically to provide a configuration which makes it possible to execute a shipment procedure, etc., of a consumable article at an appropriate timing for each machine to be monitored and efficiently manage the inventory of consumables in a store.

According to a first embodiment of the invention, there is provided a local monitor unit for transmitting status information indicating an operation state of a machine to be monitored to an integrated monitor unit through a computer network, the local monitor unit comprising local information getting means for getting the status information from the machine through a first-type computer network, local information retention means for retaining the status information gotten by the local information getting means, and local information transmission means for transmitting at least a part of a plurality of pieces of the status information retained in the local information retention means to the integrated monitor unit through a second-type computer network connecting the first-type computer network to the integrated monitor unit.

According to the local monitor unit thus configured, each machine such as a printer need not have an ordering function of consumables or a sending function of purchase orders over the public switched network. Instead, the local monitor unit connected to the first-type computer network together with the machines to be monitored gets the status information of the machines to be monitored and transmits the status information to the integrated monitor unit. Therefore, it is not necessary to change the specifications of the machines to be monitored or add functions, so that a machine monitor system can be constructed at comparatively low costs.

The local monitor unit once stores the status information of the machines installed in the same area or in the proximity of the area through the first-type computer network and sends all or some of the stored status information to the integrated monitor unit installed at a site remote from the local monitor unit, such as a place of business, via the second-type computer network. Thus, the machines to be monitored need not communicate with the integrated monitor unit, so that the integrated monitor unit need not be provided with interfaces corresponding to the machines to be monitored or means for communicating with the machines to be monitored (for example, telephone lines). Thus, the interfaces and the communication means need not be controlled separately either. Therefore, the integrated monitor unit of a simple configuration at low costs can be used to monitor a number of machines installed in a wide range. Since the machines to be monitored and the integrated monitor unit need not communicate with each other, the communication frequency for getting the status information can be lessened. Therefore, the communication costs for getting the status information from the machines can be reduced.

The local monitor unit gets the status information from the machines to be monitored such as printers through the computer network enabling a large amount of information to be transmitted in a short time at setup fast communication speed and transmits the status information to the integrated monitor unit through the second-type computer network. Thus, if network-compatible machines such as network printers are to be monitored, the local monitor unit can use only already provided functions to get the status information of the machines if the machines are not modified. Since the processing time in the machine required for transmitting the status information through the computer network to the local monitor unit is short as compared with the data transmission time of an ink purchase order, etc., to the agency over a telephone line, the data transmission little affects the essential function of the machine.

A second embodiment of the invention specifies that the first-type computer network in the first embodiment is a local area network and the second-type computer network is the Internet. If the Internet is thus adopted, the communication costs can be more decreased as compared with the conventional system using a facsimile machine, etc., because the Internet covers almost all the world. Since the Internet eliminates local problems, the integrated monitor unit can be installed anywhere. Thus, the state of each of the machines installed in various areas can be monitored in batch at one or several sites; the number of persons required for monitoring the machine state can be decreased and service can be improved.

A third embodiment of the invention specifies that the local information transmission means in the first embodiment comprises electronic mail preparation means for converting the status information into a format of electronic mail to which the address of the integrated monitor unit is added, and electronic mail sending means for sending electronic mail prepared by the electronic mail preparation means to a mail server of the second-type computer network. If electronic mail is thus used, it is temporarily stored in the mail server in the Internet and is read by the integrated monitor unit whenever necessary, so that the network traffic is furthermore relieved. Moreover, if electronic mail is thus used, it is not necessary to establish connection each time the status-information is exchanged between the local monitor unit and the integrated monitor unit, thus the integrated monitor unit can smoothly get the status information from a number of first-type networks. Since a reference to the information retained on the database provided in the integrated monitor unit can be made through the Internet from each business office, etc., higher-quality after-sales service can be provided for the machine user.

A fourth embodiment of the invention specifies that the local information getting means in the third embodiment gets status information of a plurality of machines and that the electronic mail preparation means of the local information transmission means converts the status information gotten from the machines into one piece of electronic mail.

A fifth embodiment of the invention specifies that the local information getting means in the first embodiment gets the status information in a first time period and that the local information transmission means transmits the most recent status information of the machine to the integrated monitor unit in a second time period longer than the first time period. The status information is thus gotten from each machine to be monitored in the first time period which is comparatively short, whereby the local monitor unit can check for changes in the operation state of each machine to be monitored in detail and thus can reliably keep track of the operation state of each machine to be monitored. The local monitor unit retains the status information in batch and sends all or some of the status information to the second-type network in a packet in the second time period which is comparatively long, whereby the communication frequency can be decreased, the traffic of the second-type network can be prevented from increasing, and the communication costs can be reduced. When the local information transmission means sends the status information, it sends only the most recent status information. Thus, if the machine to be monitored temporarily enters an abnormal state, the integrated monitor unit is not informed of the abnormal state if the abnormal state is corrected when the status information is transmitted; the load is taken off the integrated monitor unit. However, if the abnormal state is not corrected when the status information is transmitted, the integrated monitor unit is informed of the abnormal state, so that the operator of the integrated monitor unit can precisely keep track of the abnormal state in the machine to be monitored and can take appropriate steps of after-sales service, etc.

A sixth embodiment of the invention specifies that the local monitor unit in the fifth embodiment further includes state determination means for determining whether the status information gotten by the local information getting means indicates an abnormal state of the machine, wherein the local information getting means gets the status information in a time period shorter than the first time period only while the state determination means determines that the status information indicates an abnormal state of the machine. In such a configuration, if the machine to be monitored enters an abnormal state, the local monitor unit can finely monitor the abnormal state by increasing the frequency of monitoring the machine. If the machine to be monitored is recovered from the abnormal state, the frequency of monitoring the machine is restored to the former frequency, so that the monitor frequency can be prevented from unnecessarily increasing.

A seventh embodiment of the invention specifies that the local information getting means in the sixth embodiment gets the status information of a plurality of machines and while the state determination means determines that the status information gotten from a specific machine indicates an abnormal state of the machine, gets the status information only from the specific machine in a time period shorter than the first time period.

An eighth embodiment of the invention specifies that the local monitor unit in the fifth embodiment further includes state determination means for determining whether the status information gotten by the local information getting means indicates an abnormal state of the machine, wherein when the state determination means starts to determine that the status information indicates an abnormal state of the machine, the local information transmission means transmits the status information to the integrated monitor unit regardless of the second time period.

A ninth embodiment of the invention specifies that when the state determination means determines that the status information indicates an abnormal state of the machine over a predetermined time, the local information transmission means in the sixth or eighth embodiment transmits status information indicating the fact to the integrated monitor unit regardless of the second time period. Unlike an abnormal condition such as a paper jam that can be corrected by the user in a short time, an abnormal condition such as a mechanical failure requiring maintenance cannot be corrected until the failure machine undergoes maintenance, thus the operator of the integrated monitor unit can easily recognize the degree of the abnormal state of the machine. If the operator recognizes that the abnormal state requires maintenance, the integrated monitor unit can provide various services such as a service of warning the user of the machine to be monitored that the machine is in an abnormal state and a service of dispatching maintenance personnel.

A tenth embodiment of the invention specifies that the local monitor unit in the first embodiment further includes display means for displaying a main screen for indicating information concerning every machine connected through the first-type computer network and a subscreen for indicating detailed information concerning a specific machine specified on the main screen.

An eleventh embodiment of the invention specifies that the machine in the first embodiment is a computer system peripheral machine.

A twelfth embodiment of the invention specifies that the machine in the first embodiment is a network printer.

According to a thirteenth embodiment of the invention, there is provided a local monitor unit for transmitting status information indicating the operation state of a machine to be monitored to an integrated monitor unit through a computer network, the local monitor unit comprising local information getting means for getting the status information from the machine, electronic mail preparation means for converting the status information gotten by the local information getting means into a format of electronic mail to which the address of the integrated monitor unit is added, and local information transmission means for sending electronic mail prepared by the electronic mail preparation means to a mail server of the computer network.

The local monitor unit thus configured transmits the status information of the machines to be monitored to the integrated monitor unit in the electronic mail format. Therefore, the electronic mail containing the status information of the machines to be monitored is given the network address of the integrated monitor unit, then is sent to the mail server of the computer network at a proper timing. The integrated monitor unit can read the electronic mail thus stored in the mail server at a proper timing. Therefore, the machines to be monitored and the integrated monitor unit need not be directly connected and a direct communication line need not be placed between the local monitor unit and the integrated monitor unit. If the status information is thus stored in the electronic mail of store-and-forward data and the electronic mail is transmitted, a larger amount of information can be sent to the integrated monitor unit without increasing the network traffic with load. Therefore, the communication costs can be reduced. A communication path of connectionless type is formed between the local monitor unit and the integrated monitor unit. Thus, if a number of local monitor units transmit electronic mail at the same time, all the electronic mail pieces are stored in the mail server and the integrated monitor unit can read the electronic mail pieces from the mail server at a proper timing and process them. Since synchronization between the local monitor unit and the integrated monitor unit is not required, the processing time required for monitoring one machine to be monitored can be decreased drastically.

According to a fourteenth embodiment of the invention, there is provided an integrated monitor unit for receiving status information indicating the operation state of each of machines to be monitored, connected to a first-type computer network through a second-type computer network connected to the first-type computer network, the integrated monitor unit comprising global information getting means for getting the status information from the machines, a database for storing information concerning the machines, database management means for updating the database based on the status information gotten by the global information getting means, and display means for displaying the information stored on the database.

According to the integrated monitor unit thus configured, the display means displays the information in the database updated by the database management means. Thus, at a site where the integrated monitor unit is installed, for example, a service center, the operator of the integrated monitor unit can easily keep track of the operation state of each of the machines to be monitored, dispersed in a wide range. For example, when the machine to be monitored is in an abnormal state, the operator of the integrated monitor unit can voluntarily dispatch maintenance personnel before the user calls the service center, or can inform the user of the abnormal state of the machine and prompt after-sales service can be provided for the machine. Thus, according to the invention, the after-sales service for the machine to be monitored can be made more satisfactory.

A fifteenth embodiment of the invention specifies that the first-type computer network in the thirteenth embodiment is a local area network and the second-type computer network is the Internet.

A sixteenth embodiment of the invention specifies that the global information getting means in the fifteenth embodiment comprises electronic mail reception means for receiving electronic mail storing the status information from a mail server of the second-type computer network, and extraction means for extracting the status information from the electronic mail received by the electronic mail reception means.

A seventeenth embodiment of the invention specifies that the database in the fourteenth embodiment also stores the past status information of the machines gotten by the global information getting means and that the display means displays a main screen for indicating the status information of the machines connected through the first-type computer network and a subscreen for indicating a history of the status information of a specific machine specified on the main screen.

An eighteenth embodiment of the invention specifies that the main screen in the seventeenth embodiment indicates the most recent status information of each machine.

A nineteenth embodiment of the invention specifies that the main screen in the seventeenth embodiment indicates the status information of machines grouped for each first-type computer network.

A twentieth embodiment of the invention specifies that the status information in the seventeenth embodiment contains information indicating the remaining amount of a consumable article and that the subscreen for indicating a history of the status information of a specific machine displays a history of the remaining amounts of the consumable article of the machine.

A twenty-first embodiment of the invention specifies that the machine in the fourteenth embodiment is a computer system peripheral machine.

A twenty-second embodiment of the invention specifies that the machine in the fourteenth embodiment is a network printer.

According to a twenty-third embodiment of the invention, there is provided an integrated monitor unit for receiving status information indicating the operation state of each of machines to be monitored through a computer network, the integrated monitor unit comprising electronic mail reception means for receiving electronic mail storing the status information from a mail server of the computer network, extraction means for extracting the status information from the electronic mail received by the electronic mail reception means, a database for storing information concerning the machines, database management means for updating the database based on the status information extracted by the extraction means, and display means for displaying the information stored on the database.

Since the integrated monitor unit thus configured gets the status information converted into the electronic mail format, the contents of the status information extracted from the electronic mail can be displayed on a screen instantly. Thus, the operator of the integrated monitor unit can easily keep track of the operation state of each of the machines to be monitored, dispersed in a wide range with no delay. Thus, when the machine to be monitored is in an abnormal state, the operator of the integrated monitor unit can voluntarily dispatch maintenance personnel before the user calls the service center, or can inform the user of the abnormal state of the machine and prompt after-sales service can be provided for the machine. Thus, according to the invention, the after-sales service for the machine to be monitored can be made more satisfactory.

According to a twenty-fourth embodiment of the invention, there is provided an integrated monitor unit for receiving status information indicating the operation state of each of machines to be monitored through a computer network, the integrated monitor unit comprising global information getting means for getting the status information from the machines, and display means for displaying the status information gotten by the global information getting means in installation area units of the machines.

In such a configuration, if the number of the machines to be monitored increases, the operator of the integrated monitor unit can easily keep track of the state of each of the machines to be monitored in area units as compared with the case where the status information of the machines to be monitored is displayed in the registration order. Thus, the operator of the integrated monitor unit can easily determine the area in which the machine requiring a supply or maintenance is installed, and can efficiently deliver the supply, dispatch maintenance personnel, etc., and the quality of the after-sales service can be improved. For example, when a maintenance person needs to be dispatched to one machine, if a failing machine exists near the installation place of that machine, the operator of the integrated monitor unit can make the same maintenance person repair the machines on the same day. After a maintenance person is dispatched to one machine, if another machine fails in the area in which that machine is installed or in the proximity of the area, the operator of the integrated monitor unit can immediately keep track of the failure and thus call the maintenance person so as to handle the failure. Resultantly, an inefficient situation in which separate maintenance persons are dispatched to the machines can be prevented from occurring and service can be improved by efficiently dispatching maintenance personnel. If the status information of the machines to be monitored is displayed in area units, the status information of the machines to be monitored, installed in each area can be all displayed at a time although a large number of the machines to be monitored exist.

If the status information of the machines to be monitored is displayed in area units, to ship a consumable article of ink, etc., to one machine, if the operator erroneously ships the consumable article to another machine to be monitored, displayed together with that machine, the erroneous shipment destination is in the same area as the correct shipment destination. Therefore, the possibility that the consumable article may be shipped to the erroneous shipment destination lowers.

A twenty-five embodiment of the invention specifies that the machines in the twenty-fourth embodiment are connected to first-type computer networks connected to each other through a second-type computer network and that the display means displays the status information of the machines in first-type computer network units to which the machines are connected.

A twenty-sixth embodiment of the invention specifies that the display means in the twenty-fourth embodiment displays the most recent status information of each machine. If the most recent status information is thus displayed for each machine, the operator of the integrated monitor unit can recognize at a glance the operation state of each of the machines to be monitored, changing from moment to moment, and can take various steps based on the most recent status information.

According to a twenty-seventh embodiment of the invention, there is provided an integrated monitor unit for receiving status information containing remaining amount information of a consumable article of each of machines to be monitored through a computer network, the integrated monitor unit comprising global information getting means for periodically getting the status information from the machines, a database for storing information concerning the machines, database management means for storing the status information gotten by the global information getting means on the database, statistical processing means for predicting statistics of the remaining amount of the consumable article based on a plurality of pieces of the status information of each machine stored on the database, and output means for outputting the remaining amount statistics of the consumable article predicted by the statistical processing means.

The integrated monitor unit thus configured periodically gets and retains the status information containing remaining amount information of a consumable article of the machine to be monitored such as a printer (for example, ink, toner, or an ink ribbon) and predicts the statistics of the remaining amount of the consumable article based on a plurality of pieces of the retained status information. Thus, the operator of the integrated monitor unit can easily keep track of the consumable consumption tendency for each machine based on the predicted statistics. For example, the operator can understand the machine consuming consumables at high speed or low speed. Therefore, the operator of the integrated monitor unit can supply a consumable article to the machine consuming consumables at high speed at a stage where the remaining amount is comparatively large and the machine consuming consumables at low speed at a stage where the remaining amount is comparatively small, whereby the consumable article can be supplied just before it runs out. Thus, the consumable article can be prevented from running out or from being stocked for a long term. When a single integrated monitor unit monitors a number of machines, the whole consumption tendencies of all machines to be monitored can also be grasped based on the remaining amount statistics of the consumables in each machine. Thus, good use of the statistical information can be made for keeping the reasonable inventories in the service center, etc., and also for setting up a plan of manufacturing, sales, etc., of consumables by feeding back the consumption amounts of the consumables into the manufacturer.

A twenty-eighth embodiment of the invention specifies that the machines in the twenty-seventh embodiment are printers and the consumable article is ink, toner, or an ink ribbon.

A twenty-ninth embodiment of the invention specifies that the statistical processing means in the twenty-seventh embodiment predicts the remaining amount statistics of the consumable article on a monthly, weekly, or daily basis. In such a configuration, the remaining amount statistics in a comparatively short term on a weekly or daily basis can be predicted for the machines consuming consumables at high speed and the remaining amount statistics on a monthly basis can be predicted for the machines consuming consumables at low speed. Therefore, the statistics can be predicted matching the machines different in consumption tendency of consumables and the supply timing of consumables, etc., can be determined more precisely.

A thirtieth embodiment of the invention specifies that the database in the twenty-seventh embodiment stores the status information of the machines gotten by the global information getting means and that the output means displays a main screen for indicating the status information of the machines and a subscreen for indicating the remaining amount statistics of the consumable article of a specific machine specified on the main screen.

A thirty-first embodiment of the invention specifies that the output means in the twenty-seventh embodiment outputs the remaining amount statistics of the consumable article of the machine in a graph format.

A thirty-second embodiment of the invention specifies that the output means in the twenty-seventh embodiment outputs a history of the remaining amounts of the consumable article of the machine and the remaining amount statistics of the consumable article of the machine predicted by the statistical processing means in a graph format.

According to a thirty-third embodiment of the invention, there is provided a machine monitor system for executing centralized monitor of status information indicating the operation state of each of machines to be monitored, the machine monitor system comprising a local monitor unit being connected to the machines to be monitored through a first-type computer network for sending status information of the machines to be monitored to a second-type computer network, and an integrated monitor unit for receiving the status information sent by the local monitor unit to the second-type computer network.

According to the machine monitor system thus configured, each machine such as a printer need not have an ordering function of consumables or a sending function of purchase orders over the public switched network. Instead, the local monitor unit connected to the first-type computer network together with the machines to be monitored gets the status information of the machines to be monitored and transmits the status information to the integrated monitor unit. Therefore, it is not necessary to change the specifications of the machines to be monitored or add functions, so that the machine monitor system can be constructed at comparatively low costs.

The machine monitor system once stores the status information of the machines installed in the same area or in the proximity of the area through the first-type computer network and sends all or some of the stored status information to the integrated monitor unit installed at a site remote from the local monitor unit, such as a place of business, via the second-type computer network. Thus, the machines to be monitored need not communicate with the integrated monitor unit, so that the integrated monitor unit need not be provided with interfaces corresponding to the machines to be monitored or means for communicating with the machines to be monitored (for example, telephone lines). Thus, the interfaces and the communication means need not be controlled separately either. Therefore, the integrated monitor unit of a simple configuration at low costs can be used to monitor a number of machines dispersed in a wide range. Since the machines to be monitored and the integrated monitor unit need not communicate with each other, the communication frequency for getting the status information can be lessened. Therefore, the communication costs for getting the status information from the machines can be reduced.

With the machine monitor system, the local monitor unit gets the status information from the machines to be monitored such as printers through the computer network enabling a large amount of information to be transmitted in a short time at setup fast communication speed and transmits the status information to the integrated monitor unit through the second-type computer network, and the integrated monitor unit updates the database based on the status information. Thus, if network-compatible machines such as network printers are to be monitored, the local monitor unit can use only already provided functions to get the status information of the machines if the machines are not modified. Since the processing time in the machine required for transmitting the status information through the computer network to the local monitor unit is short as compared with the data transmission time of an ink purchase order, etc., to the agency over a telephone line, the data transmission little affects the essential function of the machine.

A thirty-fourth embodiment of the invention specifies that the local monitor unit in the thirty-third embodiment comprises local information getting means for getting the status information from the machines through the first-type computer network, local information retention means for retaining the status information gotten by the local information getting means, and local information transmission means for transmitting at least a part of a plurality of pieces of the status information retained in the local information retention means to the integrated monitor unit through the second-type computer network, and that the integrated monitor unit comprises global information getting means for receiving the status information through the second-type computer network, a database for storing information concerning the machines, database management means for updating the database based on the status information gotten by the global information getting means, and display means for displaying the information stored on the database.

A thirty-fifth embodiment of the invention specifies that the first-type computer network in the thirty-fourth embodiment is a local area network and the second-type computer network is the Internet.

A thirty-sixth embodiment of the invention specifies that the local information transmission means of the local monitor unit in the thirty-fifth embodiment comprises electronic mail preparation means for converting the status information into a format of electronic mail to which the address of the integrated monitor unit is added, and electronic mail sending means for sending electronic mail prepared by the electronic mail preparation means to a mail server of the second-type computer network, and that the global information getting means of the integrated monitor unit comprises electronic mail reception means for receiving electronic mail storing the status information from a mail server of the second-type computer network, and extraction means for extracting the status information from the electronic mail received by the electronic mail reception means.

A thirty-seventh embodiment of the invention specifies that the local information getting means of the local monitor unit in the thirty-fourth embodiment gets the status information in a first time period and that the local information transmission means of the local monitor unit transmits the most recent status information of each machine to the integrated monitor unit in a second time period longer than the first time period.

According to a thirty-eighth embodiment of the invention, there is provided a machine monitor system for executing centralized monitor of status information indicating the operation state of each of machines to be monitored, the machine monitor system comprising a local monitor unit being connected to the machines to be monitored through a first-type network for converting status information of the machines to be monitored into a format of electronic mail and sending the electronic mail to a second-type network, and an integrated monitor unit for receiving the electronic mail sent by the local monitor unit to the second-type network and extracting the status information from the electronic mail.

With the machine monitor system thus configured, the status information of the machines to be monitored is transmitted to the integrated monitor unit in the electronic mail format. Therefore, the electronic mail containing the status information of the machines to be monitored is given the network address of the integrated monitor unit, then is sent to the mail server of the computer network at a proper timing. The integrated monitor unit can read the electronic mail thus stored in the mail server at a proper timing and update the database. Therefore, the machines to be monitored and the integrated monitor unit need not be directly connected. Likewise, a direct communication line need not be placed between the local monitor unit and the integrated monitor unit. If the status information is thus stored in the electronic mail of store-and-forward data and the electronic mail is transmitted, a larger amount of status information can be sent to the integrated monitor unit without increasing the network traffic with load. Therefore, the communication costs can be reduced. A communication path of connectionless type is formed between the local monitor unit and the integrated monitor unit. Thus, if a number of local monitor units transmit electronic mail at the same time, all the electronic mail pieces are stored in the mail server and the integrated monitor unit can read the electronic mail pieces from the mail server at a proper timing and process them. Since synchronization between the local monitor unit and the integrated monitor unit is not required, the processing time required for monitoring one machine to be monitored can be decreased drastically.

A thirty-ninth embodiment of the invention specifies that the local monitor unit in the thirty-eighth embodiment comprises local information getting means for getting the status information from the machines, electronic mail preparation means for converting the status information gotten by the local information getting means into a format of electronic mail to which the address of the integrated monitor unit is added, and local information transmission means for sending electronic mail prepared by the electronic mail preparation means to a mail server of the second-type computer network, and that the integrated monitor unit comprises electronic mail reception means for receiving electronic mail storing the status information from the mail server of the second-type computer network, extraction means for extracting the status information from the electronic mail received by the electronic mail reception means, a database for storing information concerning the machines, database management means for updating the database based on the status information extracted by the extraction means, and display means for displaying the information stored on the database.

According to a fortieth embodiment of the invention, there is provided a machine monitor method comprising a local monitor step of getting status information indicating the operation state of each of machines to be monitored, connected to a first-type computer network and sending the status information to a second-type computer network connected to the first-type computer network and a global monitor step of getting the status information through the second-type computer network, wherein the local monitor step comprises a local information getting step of getting the status information of the machines, a local information retention step of retaining the gotten status information, and a local information transmission step of sending the retained status information to the second-type computer network, and wherein the global monitor step comprises a global information getting step of getting the status information through the second-type computer network, a step of providing a machine database for storing information concerning the machines to be monitored, a database management step of updating the machine database based on the status information, a step of providing a display, and a display step of displaying the information stored on the machine database on the display.

According to the machine monitor method, each machine such as a printer need not have an ordering function of consumables or a sending function of purchase orders over the public switched network. Instead, the unit being connected to the first-type computer network together with the machines to be monitored for executing the local monitor step gets the status information of the machines to be monitored and transmits the status information to the second-type computer network. The unit for executing the global monitor step gets the status information sent to the second-type computer network. Therefore, it is not necessary to change the specifications of the machines to be monitored or add functions, so that a machine monitor system can be constructed at comparatively low costs.

According to the machine monitor method, the status information of the machines installed in the same area or in the proximity of the area is once stored through the first-type computer network and all or some of the stored status information is sent to the second-type computer network. The global monitor step is executed at a remote site such as a place of business, whereby the status information sent to the second-type computer network is gotten. Thus, the unit for executing the global monitor step need not communicate with the machines to be monitored, so that it is not necessary to provide interfaces corresponding to the machines to be monitored or means for communicating with the machines to be monitored (for example, telephone lines). Thus, the interfaces and the communication means need not be controlled separately either. Therefore, the unit of a simple configuration at low costs can be used to monitor a number of machines installed in a wide range. Since it is not necessary to communicate with the machines to be monitored, the communication frequency for getting the status information can be lessened. Therefore, the communication costs for getting the status information from the machines can be reduced.

A forty-first embodiment of the invention specifies that the first-type computer network in the fortieth embodiment is a local area network and the second-type computer network is the Internet.

A forty-second embodiment of the invention specifies that the local information transmission step in the forty-first embodiment includes converting the status information of the machine into a format of electronic mail and sending the electronic mail to the second-type computer network, and that the global information getting step includes extracting the status information from the electronic mail received through the second-type computer network.

A forty-third embodiment of the invention specifies that the local information getting step in the fortieth embodiment includes getting the status information in a first time period, and that the local information transmission step includes sending the status information in a second time period different from the first time period.

A forty-fourth embodiment of the invention specifies that the local information getting step in the forty-third embodiment includes getting the status information in a time period shorter than the first time period only while the status information indicates an abnormal state of the machine.

A forty-fifth embodiment of the invention specifies that when the status information starts to indicate an abnormal state of the machine, the local information transmission step in the forty-fourth embodiment includes transmitting the status information to the second-type computer network regardless of the second time period.

A forty-sixth embodiment of the invention specifies that the display step in the fortieth step comprises a main screen display step of displaying a main screen for listing the machines registered on the database on the display and a subscreen display step of displaying a subscreen for indicating information concerning a specific machine specified on the main screen on the display.

A forty-seventh embodiment of the invention specifies that the display step in the fortieth embodiment comprises a main screen display step of displaying a main screen for listing the machines registered on the database on the display and a subscreen display step of displaying a subscreen for indicating a history of the status information of a specific machine specified on the main screen on the display.

A forty-eighth embodiment of the invention specifies that the main screen in the forty-seventh embodiment displays the most recent status information of the machine.

A forty-ninth embodiment of the invention specifies that the main screen in the forty-seventh embodiment indicates the status information of machines grouped for each first-type computer network.

A fiftieth embodiment of the invention specifies that the status information in the forty-seventh embodiment contains information indicating the remaining amount of a consumable article and the subscreen for indicating a history of the status information of a specific machine displays a history of the remaining amounts of the consumable article of the machine.

According to a fifty-first embodiment of the invention, there is provided a machine monitor method comprising a local monitor step of getting status information indicating the operation state of each of machines to be monitored and sending the status information to a computer network and a global monitor step of getting the status information through the computer network, wherein the local monitor step comprises a local information getting step of getting the status information of the machines, an electronic mail preparation step of converting the gotten status information into a format of electronic mail, and a local information sending step of sending prepared electronic mail to the computer network, and wherein the global monitor step comprises an electronic mail reception step of receiving the electronic mail through the computer network, an extraction step of extracting the status information from the received electronic mail, a step of providing a machine database for storing information concerning the machines to be monitored, a database management step of updating the machine database based on the status information, a step of providing a display, and a display step of displaying the information stored on the machine database on the display.

According to the machine monitor method, the status information of the machines to be monitored is transmitted to the unit for executing the global monitor step in the electronic mail format. Therefore, the electronic mail containing the status information of the machines to be monitored is given the network address of the unit, then is sent to the mail server of the computer network at a proper timing. The unit for executing the global monitor step can read the electronic mail thus stored in the mail server at a proper timing and update the database. Therefore, it is not necessary to communicate directly with the machines to be monitored. If the status information is thus stored in the electronic mail of store-and-forward data and the electronic mail is transmitted, a larger amount of status information is transmitted without increasing the network traffic with load. Therefore, the communication costs can be reduced.

According to a fifty-second embodiment of the invention, there is provided a machine monitor method comprising a data getting step of getting status information indicating the operation state of each of machines to be monitored, connected to a computer network through the computer network, a step of providing a display, and a display step of displaying the status information of the machines in installation area units of the machines on the display.

A fifty-third embodiment of the invention specifies that the machines in the fifty-second embodiment are connected to first-type computer networks connected to each other through a second-type computer network, and that the display step includes displaying the status information of the machines in first-type computer network units to which the machines are connected.

A fifty-fourth embodiment of the invention specifies that the display step in the fifty-third step includes displaying the most recent status information of each machine.

According to a fifty-fifth embodiment of the invention, there is provided a machine monitor method comprising a data getting step of periodically getting status information containing remaining amount information of a consumable article of each of machines to be monitored, connected to a computer network, a data retention step of retaining the gotten status information, a statistical processing step of predicting statistics of the remaining amount of the consumable article based on a plurality of pieces of the retained status information of each machine, and an output step of outputting the predicted remaining amount statistics of the consumable article.

A fifty-sixth embodiment of the invention specifies that the machines in the fifty-fifth embodiment are printers and the consumable article is ink, toner, or an ink ribbon.

A fifty-seventh embodiment of the invention specifies that the statistical processing step in the fifty-fifth embodiment includes predicting the remaining amount statistics of the consumable article on a monthly, weekly, or daily basis.

A fifty-eighth embodiment of the invention specifies that in the fifty-fifth embodiment, the gotten status information of the machines is stored, and that the output step comprises a main screen display step of displaying a main screen for indicating the status information of the machines and a subscreen display step of displaying a subscreen for indicating the remaining amount statistics of the consumable article of a specific machine specified on the main screen.

A fifty-ninth embodiment of the invention specifies that the output step in the fifty-fifth embodiment includes outputting the remaining amount statistics of the consumable article of the machine in a graph format.

A sixtieth embodiment of the invention specifies that the output step in the fifty-fifth embodiment includes outputting a history of the remaining amounts of the consumable article of the machine and the predicted remaining amount statistics of the consumable article of the machine in a graph format.

According to a sixty-first embodiment of the invention, there is provided a computer-readable medium storing a program for causing a computer connected to machines to be monitored through a first-type computer network to execute a local information getting step of getting status information indicating the operation state of each of the machines to be monitored, a local information retention step of retaining the status information, and a local information transmission step of sending the status information to a second-type computer network.

A sixty-second embodiment of the invention specifies that the program in the sixty-first embodiment causes the computer to convert the status information into a format of electronic mail and send the electronic mail to the second-type computer network at the local information transmission step.

A sixty-third embodiment of the invention specifies that the program in the sixty-first embodiment causes the computer to output image data of a main screen for indicating information concerning all machines to be monitored, connected through the first-type computer network and image data of a subscreen for indicating detailed status information of a specific machine specified on the main screen.

According to a sixty-fourth embodiment of the invention, there is provided a computer-readable medium storing a program for causing a computer connected to a machine to be monitored to execute a local information getting step of getting status information indicating the operation state of the machine to be monitored, an electronic mail preparation step of converting the gotten status information into a format of electronic mail, and a local information transmission step of sending the prepared electronic mail to a computer network.

According to a sixty-fifth embodiment of the invention, there is provided a computer-readable medium storing a program for causing a computer connected to machines to be monitored through a computer network to execute a global information getting step of getting status information indicating the operation state of each of the machines to be monitored through the computer network, a database management step of updating a machine database storing monitor information of the machines based on the status information, and a display step of displaying the information stored on the machine database on a display.

A sixty-sixth embodiment of the invention specifies that the program in the sixty-third embodiment causes the computer to extract the status information from the electronic mail received through the computer network at the global information getting step.

According to a sixty-seventh embodiment of the invention, there is provided a computer-readable medium storing a program for causing a computer connected to machines to be monitored through a computer network to execute an electronic mail reception step of receiving electronic mail storing status information indicating the operation state of each of the machines to be monitored through the computer network, an extraction step of extracting the status information from the received electronic mail, a database management step of updating a machine database storing information concerning the machines to be monitored based on the status information, and a display step of displaying the information stored on the machine database on a display.

According to a sixty-eighth embodiment of the invention, there is provided a computer-readable medium storing a program for causing a computer connected to machines to be monitored through a computer network to execute a global information getting step of getting status information indicating the operation state of each of the machines to be monitored through the computer network, and a display step of displaying the gotten status information in installation area units of the machines.

According to a sixty-ninth embodiment of the invention, there is provided a computer-readable medium storing a program for causing a computer connected to machines to be monitored through a computer network to execute a global information getting step of periodically getting status information containing remaining amount information of a consumable article of each of machines to be monitored, a data retention step of retaining the gotten status information, a statistical processing step of predicting statistics of the remaining amount of the consumable article based on a plurality of pieces of the retained status information of each machine, and an output step of outputting the predicted remaining amount statistics of the consumable article.

BRIEF DESCRIPTION OF THE DRAWINGS

The invention will be described below in detail with reference to the accompanying drawings, in which:

FIG. 11 depicts an illustrative customer information window displayed on a display;

FIG. 12 depicts an illustrative format of customer registration/change mail;

FIG. 13 depicts an illustrative main window displayed on the display;

FIG. 17 depicts an illustrative format of a printer registration log file retained in a local information retention section;

FIG. 18 depicts an illustrative format of printer registration/change mail;

FIG. 19 depicts an illustrative format of a status log file retained in the local information retention section;

FIG. 20 depicts an illustrative format of an error table;

FIG. 21 depicts an illustrative format of a fatal error log file retained in the local information retention section;

FIG. 22 depicts an illustrative format of status mail;

FIG. 23 depicts an illustrative format of a transmission log file retained in the local information retention section;

FIGS. 28A and 28B are tables decpiting data stored in tables making up a database;

FIG. 37 decpitcs an illustrative customer information window displayed on the display;

FIGS. 40A and 40B depict illustrative printer status histories printed on a local printer;

DESCRIPTION OF THE PREFERRED EMBODIMENTS

Referring now to the accompanying drawings, there is shown a preferred embodiment of a machine monitor system according to the invention.

Figure 1:
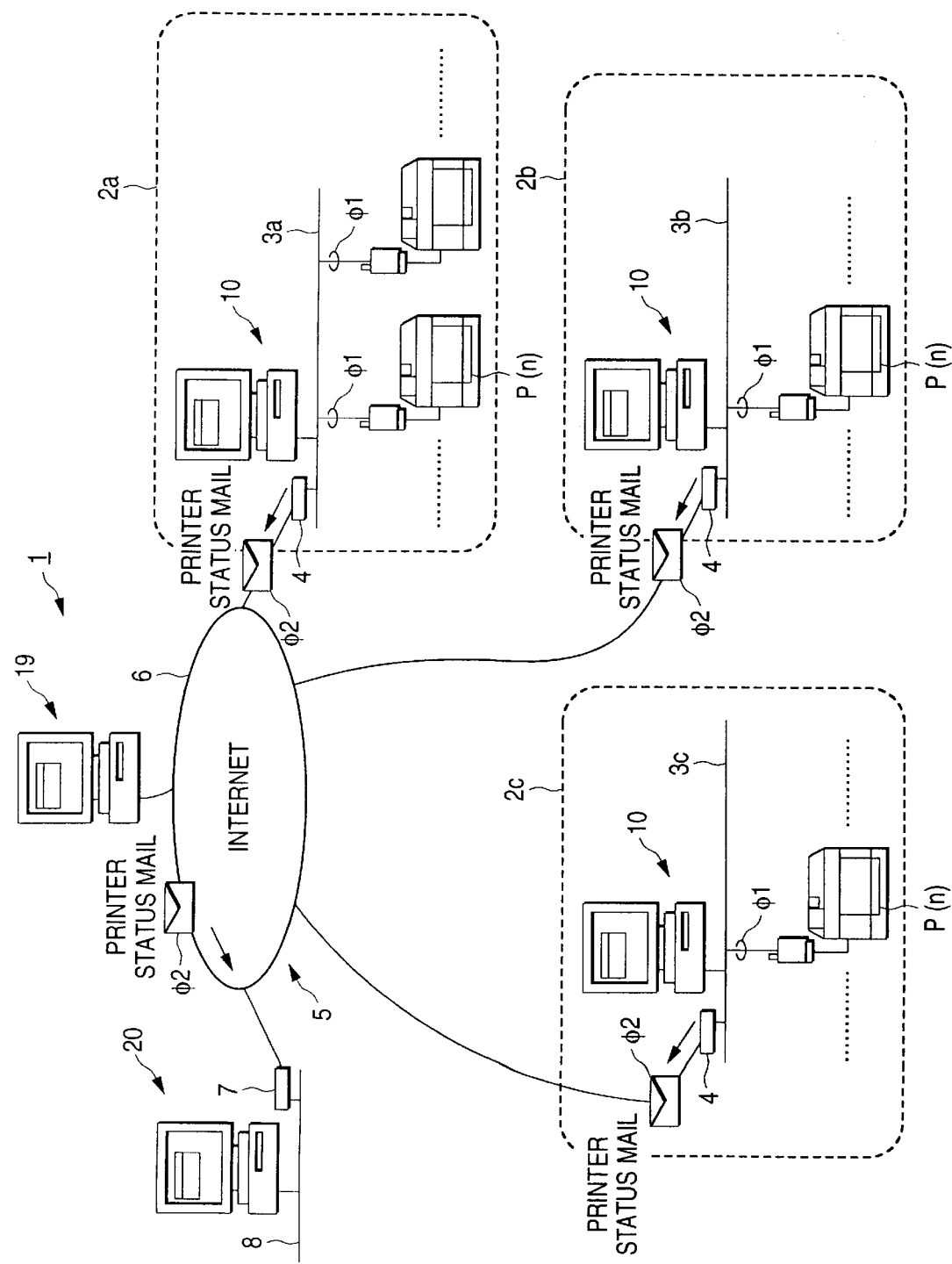
FIG. 1 is a schematic block diagram of a machine monitor system of an embodiment of the invention.

FIG. 1 is a schematic block diagram of a machine monitor system 1 according to an embodiment of the invention. The machine monitor system 1 is made up of one integrated monitor unit, which will be hereinafter referred to as console unit 20 and a plurality of local monitor units, which will be hereinafter referred to as agent unit 10.

Each agent unit 10 is connected to a first-type computer network, which will be hereinafter referred to as LAN (local area network), 3 (3a–3c) laid in a comparatively narrow area (first-type area) 2 (2a–2c) corresponding to a customer store, a business department of a customer company, or the like. In FIG. 1, three first-type areas 2 and three LANs 3 are shown; since the first-type areas 2 (2a–2c) are of the same configuration and the LANs 3 (3a–3c) are of the same configuration, only the first-type area 2a and the LAN 3a will be discussed and others will not be discussed. In the first-type area 2a, the LAN 3a connects a plurality of network printers P, an agent unit 10, and a router 4 to each other. The router 4 connects the LAN 3a to a second-type computer network 6 set so as to cover a wider area (second-type area) 5 than the first-type area 2. In the embodiment, the Internet covering almost all the world is adopted as the second-type computer network 6. However, every type of computer network can be adopted as the second-type computer network 6 so long as the computer network provides terminal-to-terminal information transfer service through electronic mail and connects LANs. On the other hand, the console unit 20 is installed in an agency for selling the network printers P or the materials department of the manufacturer of the network printers P (the description to follow assumes that the console unit 20 is installed in the agency) and is connected to a LAN 8 laid in the agency. A router 7 connected to the Internet 6 is also connected to the LAN 8. In addition, a mail server for relaying transfer of electronic mail is connected to the Internet.

In the machine monitor system 1 according to the embodiment in the connection described, the agent unit 10 and the console unit 20 support SMTP and POP3 of standard protocols for transmitting and receiving electronic mail through the Internet 6 and MAP1 provided as an interface for transmitting and receiving electronic mail through the Internet 6 enables electronic mail to be exchanged between the units. Specifically, the agent unit 10 gets status information Ø1 indicating the operation state of each network printer P connected to the LAN 3a and the toner remaining amount, the ink remaining amount, photosensitive drum remaining life, etc., and prepares status mail (electronic mail) Ø2 storing the status information Ø1. It adds the address of the console unit 20 to the status mail Ø2 and sends the status mail Ø2 via the router 4 to the Internet 6. Then, the status mail Ø2 is stored in the mail server 19 of the provider with which the agency contracts. Status mail Ø2 addressed to the console unit 20 from other agent units 10 is also stored in the mail server 19. The console unit 20 reads at a proper timing a large number of pieces of the status mail Ø2 stored in the mail server 19.

In the embodiment, the status mail Ø2 is transmitted from the agent units 10 to the console unit 20, but the machine monitor system 1 can also be configured as a two-way communication system wherein the console unit 20 sends a delivery schedule of consumables, a printer check sheet, etc., to each agent unit 10.

The configurations of the agent unit 10 and the console unit 20 will now be discussed separately in detail.

Figure 2:
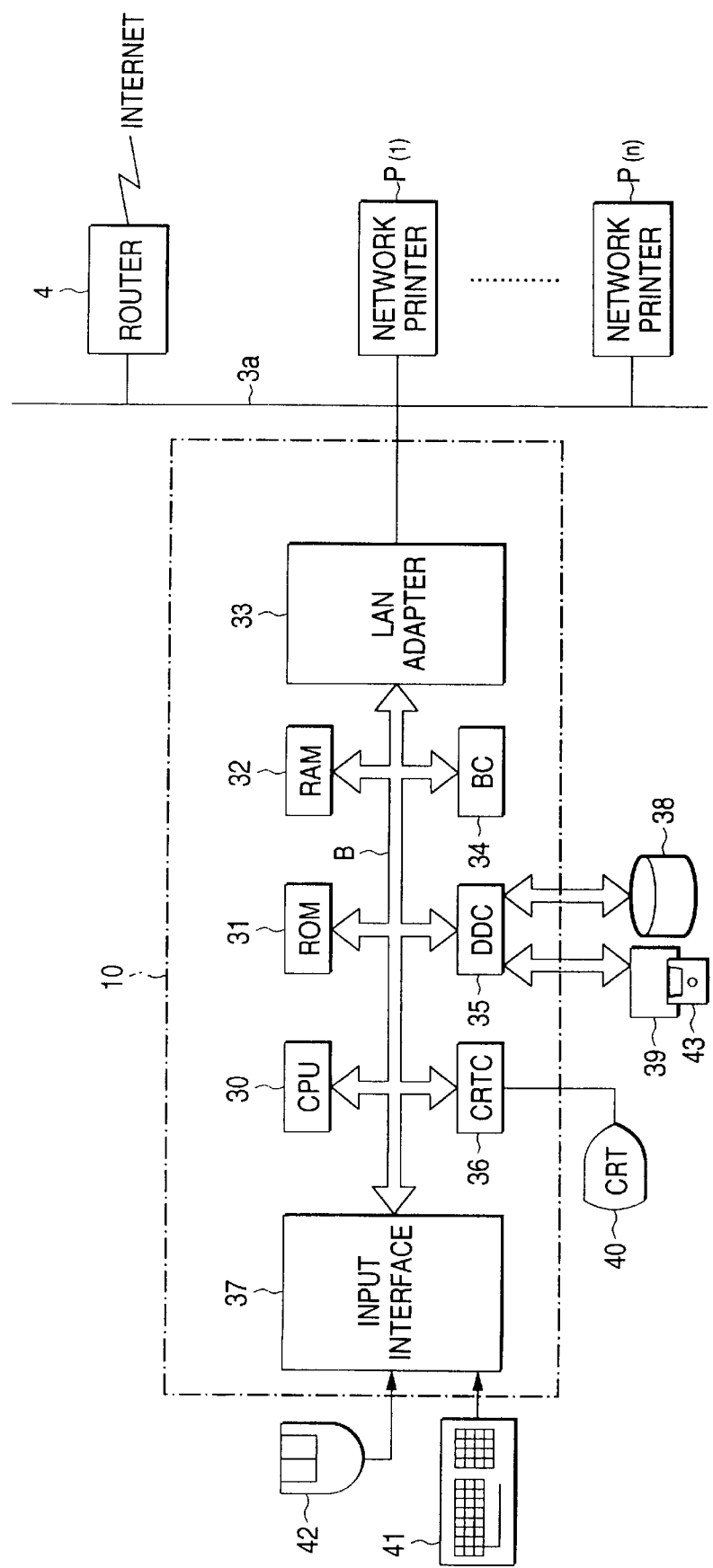
FIG. 2 is a block diagram depicting the circuit configuration of an agent unit shown in FIG. 1.

FIG. 2 is a block diagram of the hardware configuration of a computer forming the agent unit 10. As shown here, the agent unit 10 is made up of a CPU (central processing unit) 30, ROM (read-only memory) 31, RAM (random access memory) 32, a LAN adapter 33, a bus controller 34, a disk drive controller (DDC) 35, a display controller 36, and an input interface 37, all connected by a bus B, a hard disk 38 and a floppy disk drive 39 connected to the disk drive controller (DDC) 35, a display 40 connected to the display controller 36, and a keyboard 41 and a mouse 42 connected to the input interface 37.

The bus controller 34 manages the state of the bus B and enables data transfer between circuits via the bus B. The disk drive controller (DDC) 35 drives the disk drives 38, 39 under the control of the CPU 30, thereby writing data onto the disk (hard disk 38, floppy disk 43) and reading data therefrom. An operating system program (Windows 95 (TM) manufactured by Microsoft) and an agent program (described later) executed by the CPU 30 are stored on the hard disk 38. When the operating system or agent program is upgraded, a floppy disk 43 storing the upgrade program is set in the floppy disk drive 39 and the program stored on the floppy disk 43 is copied into the hard disk 38. Since the hard disk 38 functions as a local information retention section 12, a customer information retention section 18, and an error table retention section 9 shown in FIG. 3, log files 12a–12d, customer information, and an error table (described later) are stored on the hard disk 38. ROM 31 is memory storing a BIOS program.

The CPU 30 controls the whole agent unit 10 and also functions as local information getting means, local information retention means, local information transmission means (electronic mail preparation means, electronic mail sending means), state determination means, and display means. When power is turned on, the CPU 30 reads the BIOS program from the ROM 31 and executes the BIOS program, thereby reading the operating system program from the hard disk 38. Then, the CPU 30 executes the operating system program, whereby it can control the whole agent unit 10. The display controller 36 forming a part of the display means displays various screens prepared by the CPU 30 on the display 40 under the control of the CPU 30. The input interface 37 encodes signals entered through the mouse 42 and the keyboard 41, thereby inputting user-entered information (a signal indicating a pressed key, vector information entered through the mouse 42, a click signal entered through the mouse 42) into the CPU 30. Any other pointing device than the mouse 42, such as a touch panel, may be connected to the input interface 37. The LAN adapter 33 forming a part of the local information transmission means (electronic mail sending means) stores data output from the CPU 30 in a packet and sends the packet to the LAN 3a. Also, it disassembles a packet received from the LAN 3a and edits the packet to a data form that can be handled by the CPU 30. The RAM 32 is memory used as a work area of the CPU 30 and the operating system program and the agent program read by the CPU 30 from the hard disk 38 are expanded in the RAM 32.

Figure 3:
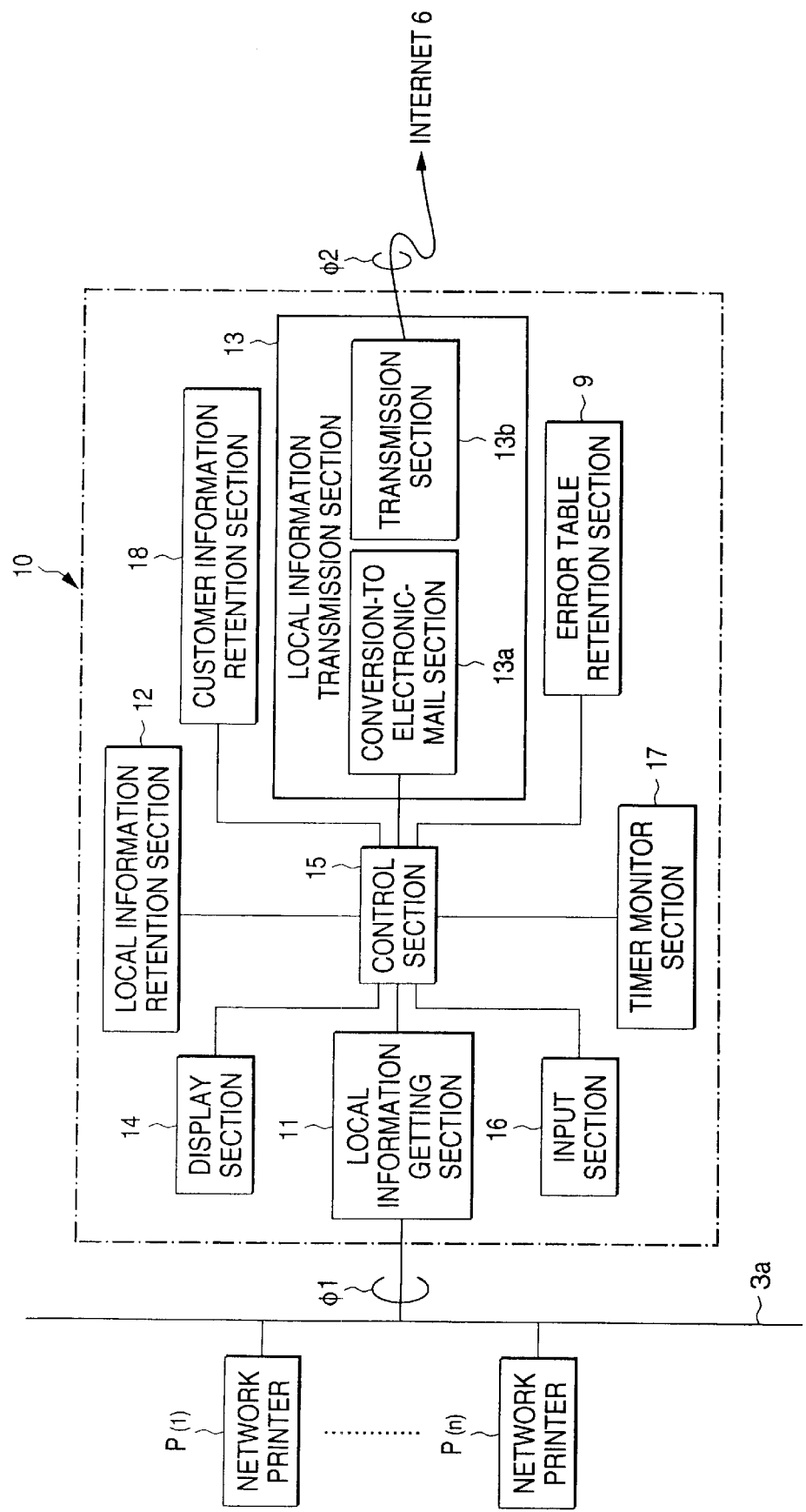
FIG. 3 is a block diagram depicting the functions of a CPU, RAM, and a hard disk in a state in which an agent program is executed.

FIG. 3 is a block diagram of the functions of the CPU 30, the RAM 32, and the hard disk 38 provided when the CPU 30 executes the operating system program and the agent program expanded in the RAM 32. The functions of the CPU 30 and the RAM 32 shown in FIG. 3 are error table retention section 9, local information getting section 11, local information retention section 12, local information transmission section 13, display section 14, control section 15, input section 16, timer monitor section 17, and customer information retention section 18.

The customer information retention section 18 retains customer information consisting of the name, the address, the telephone number, the FAX number, the electronic mail address, etc., of the customer operating the agent unit 10.

The local information getting section 11 as local information getting means gets status information Ø1 indicating the operation state of each network printer P registered in a printer registration log file 12c (described later) and the remaining amount information of the toner remaining amount, the ink remaining amount, photosensitive drum life, etc., from the corresponding network printer P.

The local information transmission section 13 as local information transmission means is made up of a conversion-to-electronic-mail section 13a and a transmission section 13b. The conversion-to-electronic-mail section 13a as electronic mail preparation means converts the customer information retained in the customer information retention section 18 into electronic mail (customer registration/change mail (FIG. 12)), converts the printer registration log file 12c stored in the local information retention section 12 into electronic mail (printer registration/change mail (FIG. 18)), and converts the status information Ø1 gotten by the local information getting section 11 into electronic mail (status mail (FIG. 22)). The transmission section 13b as electronic mail sending means transmits electronic mail prepared by the conversion-to-electronic-mail section 13a to the mail server 19 (address of the console unit 20) through the Internet 6. The electronic mail formats will be discussed later in detail.

The local information retention section 12 as local information retention means retains the above-mentioned printer registration log file 12c registering the IP addresses, serial numbers, etc., of the network printers P in text format (FIG. 17), a status log file 12a registering the status information Ø1 of the network printers P in text format (FIG. 19), a fatal error log file 12d registering the network printers P where a fatal error occurred in text format (FIG. 21), and a transmission log file 12b registering an electronic mail transmission history in the local information transmission section 13 in text format (FIG. 23). The formats of the log files will be discussed later in detail.

The display section 14 as display means displays the status information Ø1, etc., on the display 40.

The input section 16 interprets input information based on an input signal from the keyboard 41 or the mouse 42. For example, the input section 16 displays a cursor moving in response to a vector signal from the mouse 42 on the display 40 and when a click signal is entered through the mouse 42, the input section 16 assumes that the displayed information superposed on the cursor at the point in time, such as a button, is entered.

The timer monitor section 17 monitors the timing at which the local information getting section 11 gets the status information Ø1, the timing at which the local information transmission section 13 transmits the status information Ø1, and the like.

The error table retention section 9 stores the error table shown in FIG. 20. The format of the error table will be discussed later in detail.

The control section 15 operates the local information getting section 11, the local information retention section 12, the local information transmission section 13, the display section 14, the input section 16, and the timer monitor section 17 for causing the sections to perform the required operation. The control section 15 registers customer information entered through the input section 16 in the customer information retention section 18, creates a printer registration log file 12c based on printer relevant information entered through the input section 16, stores the file in the local information retention section 12, creates a status log file 12a based on the status information Ø1 gotten by the local information getting section 11, stores the file in the local information retention section 12, records a communication history in the local information transmission section 13 in the transmission log file 12b, and stores the transmission log file 12b in the local information retention section 12. The control section 15 looks up in the error table in the error table retention section 9 (FIG. 20) to determine the error level corresponding to the status information Ø1 in the status log file 12a. If the control section 15 determines that the error level is fatal, it creates a fatal error log file 12d and stores the file in the local information retention section 12. Further, the control section 15 causes the local information getting section 11 to get the status information Ø1 every first time period T1 and causes the local information transmission section 13 to transmit status mail every second time period T2 longer than the first time period T1. If the control section 15, as the status determination means, determines that the error level corresponding to the status information Ø1 gotten from one network printer P is fatal (status code>6000), it instructs the local information transmission section 13 to transmit status mail storing the contents of the fatal error log file 12d (fatal error occurrence mail). The control section 15 also instructs the local information getting section 11 to get the status information Ø1 every minute from the network printer P with status code>6000 (the error level corresponding to the status information Ø1 is fatal). Further, if the error level corresponding to the status information Ø1 gotten from one network printer P is not fatal any longer, the control section 15 instructs the local information transmission section 13 to transmit status mail indicating the fact (fatal error recovery mail). Further, if the control section 15, as the status determination means, determines that the state in which the error level corresponding to the status information Ø1 gotten from one network printer P is fatal exceeds one hour, it judges that the user cannot correct the error and that it is necessary to request the agency to dispatch maintenance personnel, and immediately causes the local information transmission section 13 to transmit status mail indicating the request for dispatching maintenance personnel (service call error mail).

Figure 8:
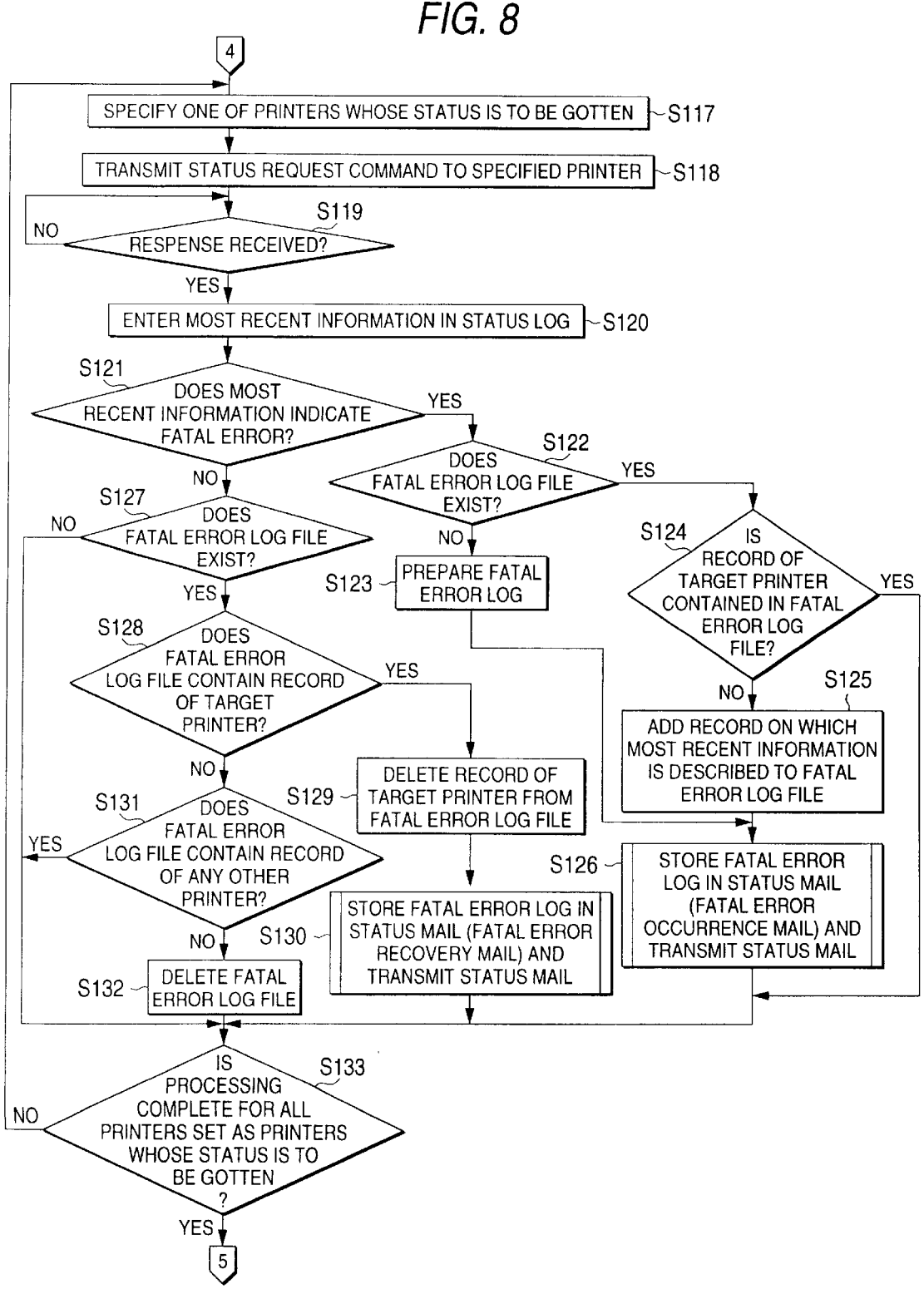
FIG. 8 is a flowchart of an automatic monitor process forming a part of the agent program.
Figure 9:
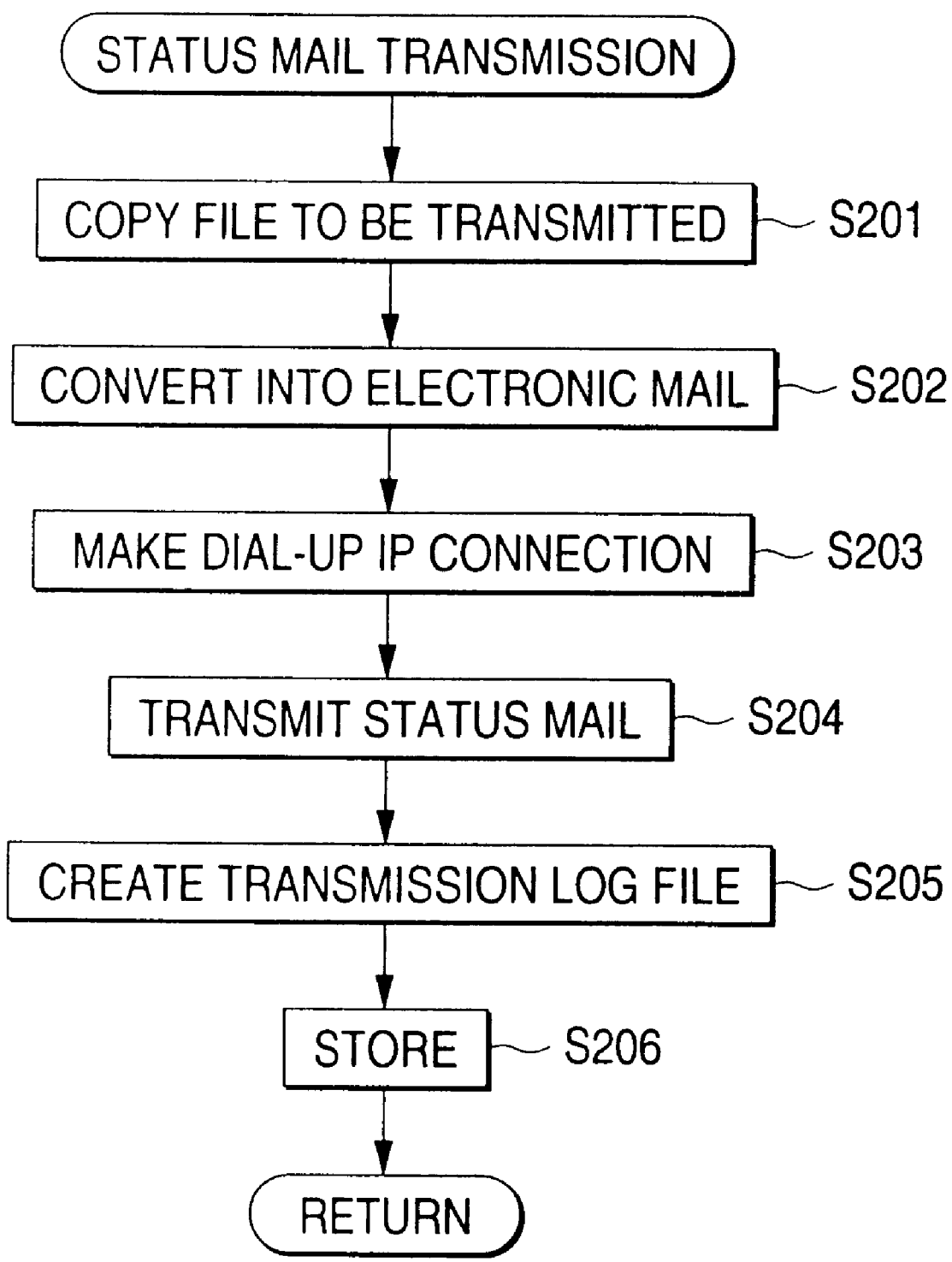
FIG. 9 is a flowchart of a status mail transmission subroutine executed at each of step S115 in FIG. 7 and steps S126 and S130 in FIG. 8.
Figure 10:
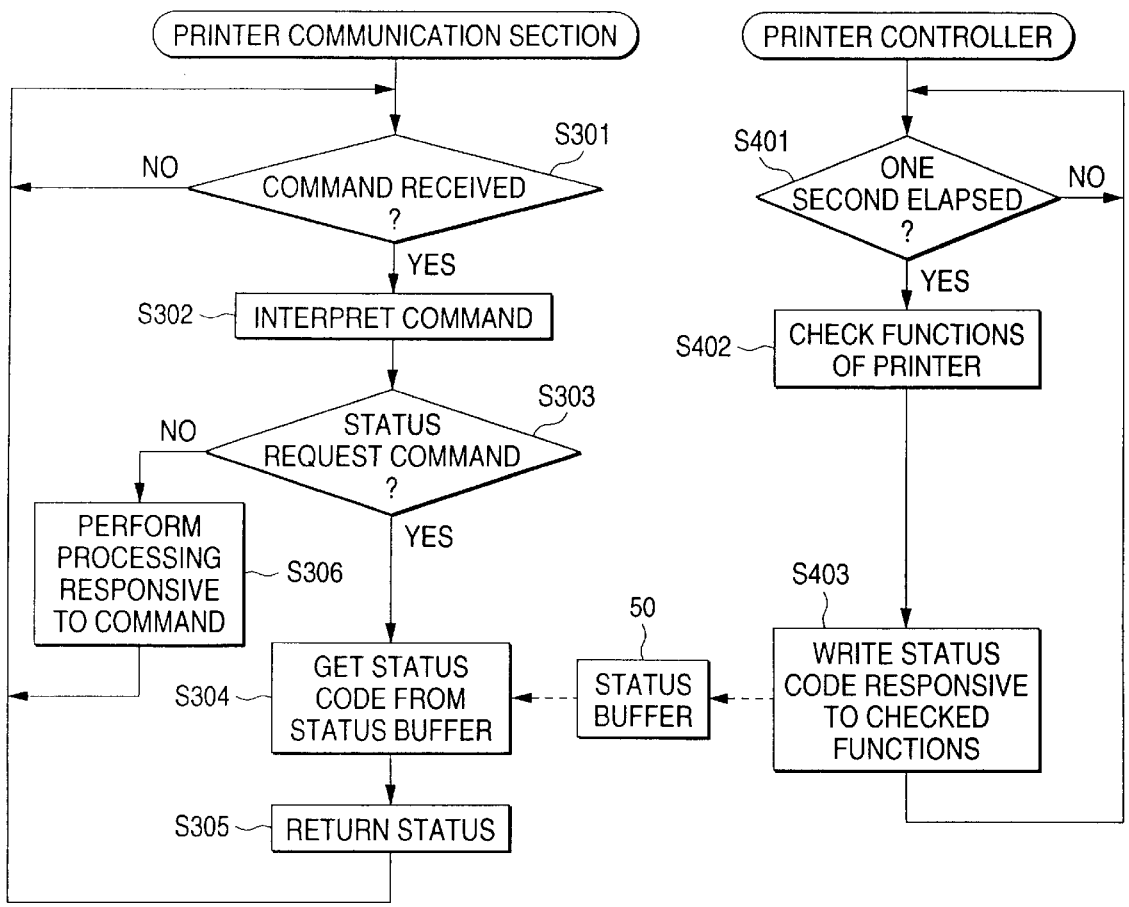
FIG. 10 is a flowchart of a process executed in a network printer.

The operation performed when the CPU 30 having the described function executes the agent program will be discussed with reference to flowcharts in FIG. 4 to FIG. 10. The agent program is made up of a screen display process shown in FIG. 4 to FIG. 6 and an automatic monitor process shown in FIG. 7 to FIG. 9. FIG. 10 is a flowchart to show a process executed by a controller of the network printer P to be monitored.

When a cursor is superposed on an icon displayed on the display 40 according to vector information entered through the mouse 42 and a click signal is input in this state, the screen display process is started. In the description which follows, the fact that a click signal is input (entered) with the cursor superposed on information displayed on the display 40, such as a button or an icon, is represented by the expression "the information is input (entered)," "the information is clicked," or "the button is turned on." At the first step S001 in the screen display process thus started, the CPU 30 checks whether customer information is registered in the customer information retention section 18. If customer information is not yet registered as just after the agent program is installed, the CPU 30 advances the process to step S002.

At step S002, the CPU 30 displays a customer information window shown in FIG. 11 on the display 40. The customer information window is provided with fields for writing the mail address of the agency where the console unit 20 is installed, the customer name, address, telephone number, FAX number, etc. When customer information is not yet entered, the fields remain blank.

At step S003, the CPU 30 checks whether an X button or a CLOSE (i.e., QUIT) button is clicked. If neither the X button nor the CLOSE button is clicked, the CPU 30 goes to step S005 and checks whether an OK button is clicked. If the OK button is not clicked, the CPU 30 goes to step S009 and checks whether any other information is entered. If any other information is not entered, the CPU 30 returns the process to step S003.

If any other information is entered while the CPU 30 executes the check loop of steps S003, S005, and S009, the CPU 30 goes to step S010 and executes processing responsive to the entered information. For example, if some character is entered through the keyboard 41 after any field is clicked, the entered character is written into the field. If INTERVAL SPECIFICATION is clicked, it is made possible to enter the transmission interval of status mail Ø2 described later (second time period T2; see step S109). If TIME SPECIFICATION is clicked, it is made possible to enter the transmission time of status mail Ø2. Upon completion of step S010, the CPU 30 returns the process to step S003.

If the X button or the CLOSE button is input, the CPU 30 advances the process to step S004 from step S003 and closes the customer information window, then terminates the screen display process.

If the OK button is clicked, the CPU 30 advances the process to step S006 from step S005 and registers the information entered in the fields at the point in time in the customer information retention section 18. At step S007, the CPU 30 prepares customer registration/change mail Ø5 based on the information registered at step S006 and transmits the customer registration/change mail ⓪ to the mail server 19 (address of the console unit 20) via the LAN 3a and the Internet 6. The customer registration/change mail Ø5 consists of a mail header of subject indicating customer registration/change mail Ø5 and mail address and a mail a text containing information such as customer name before change (blank at this point in time), customer name after change (new entered customer name), customer address, customer telephone number, and customer FAX number. At step S008, the CPU 30 closes the customer information window and advances the process to step S011.

In contrast, if customer information is already registered in the customer information retention section 18 as a result of previous execution of steps S002 to S010, the CPU 30 judges at step S001 that customer information is already registered, and advances the process to step S011.

At step S011, the CPU 30 displays a main window (main screen) shown in FIG. 13 on the display 40. A list viewer area 40a for listing information on the network printers P to be monitored is provided at the center of the main window. Specifically, the names and installation places of all network printers P connected to the LAN 3a, the status getting dates indicating the dates on which status information Ø1 was gotten from the network printers P, and the status code contained in the status information Ø1 are displayed in the list viewer area 40a from side to side. In the example in FIG. 13, the network printer LP-9200S on the intermediate row does not operate and thus the status getting date and the status code corresponding thereto are blank. A menu bar indicating a FILE button 40b, a SET button 40c, and a HELP button 40d is provided at the top of the main window. Further, a REGISTER PRINTER button 40e, a DELETE PRINTER button 40f, a START/STOP button 40g, and a QUIT (i.e. CLOSE) button 40h are provided in order from top to bottom on the right of the list viewer area 40a on the main window.

At step S012, the CPU 30 checks whether automatic execution of automatic monitor process is set. If automatic execution is not set, the CPU 30 advances the process to step S016. In contrast, if automatic execution is set, the CPU 30 goes to step S013 and changes the character string displayed on the START/STOP button 40g from START to STOP. At step S014, the CPU 30 starts an automatic monitor process shown in FIG. 7 to FIG. 9. At step S015, the CPU 30 waits for the operator to click on the START/STOP button 40g and when the START/STOP button 40g is turned on, the CPU 30 restores the character string displayed on the START/STOP button 40g to START and releases the setting of automatic execution of automatic monitor process, then advances the process to step S016.

At step S016, the CPU 30 checks whether the FILE button 40b is clicked. If the FILE button 40b is not clicked, the CPU 30 goes to step S032 (FIG. 5) and checks whether the SET button 40c is clicked. If the SET button 40c is not clicked, the CPU 30 goes to step S041 and checks whether the REGISTER PRINTER button 40e is clicked. If the REGISTER PRINTER button 40e is not clicked, the CPU 30 goes to step S053 (FIG. 6) and checks whether the START/STOP button 40g is clicked. If the START/STOP button 40g is not clicked, the CPU 30 goes to step S057 and checks whether any printer name displayed in the list viewer area 40a is double-clicked. If none of the printer names are double-clicked, the CPU 30 goes to step S069 and checks whether the X button or the CLOSE button is clicked. If neither the X button nor the CLOSE button is clicked, the CPU 30 goes to step S070 and checks whether any other information is entered. If no information is entered, the CPU 30 returns the process to step S011.

If the FILE button 40b is clicked while the CPU executes the described check loop, the CPU 30 goes to step S017 and displays a pull-down menu providing items of LOG REFERENCE, PROPERTY, etc.

Figure 14:
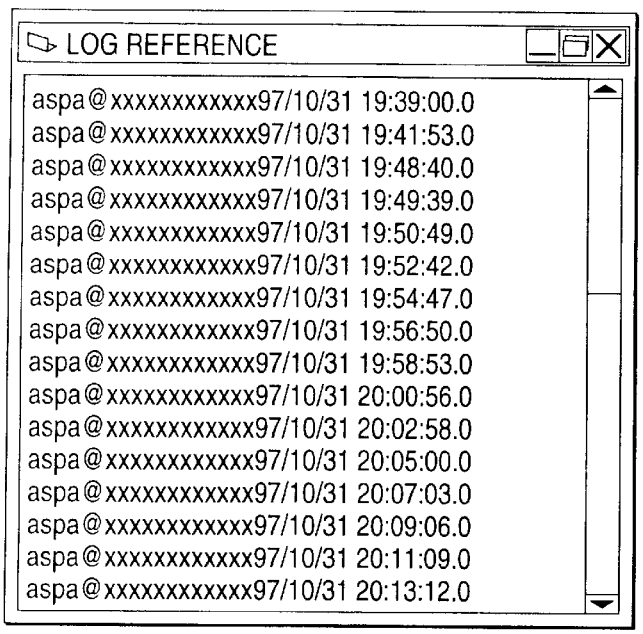
FIG. 14 depicts an illustrative log reference window displayed on the display.

At step S018, the CPU 30 checks whether LOG REFERENCE is selected out of the pull-down menu. If LOG REFERENCE is selected, the CPU 30 goes to step S022 and displays a log reference window shown in FIG. 14 on the display 40. This log reference window is a window for listing a summary of all the transmission log file 12b (see FIG. 23) retained in the local information retention section 12. At step S023, the CPU 30 waits for the operator to click on the X button of the log reference window and when the X button is clicked, the CPU 30 goes to step S024 and closes the log reference window, then returns the process to step S011.

In contrast, if LOG REFERENCE is not selected at step S018, the CPU 30 goes to step S019 and checks whether PROPERTY is selected. If PROPERTY is selected, the CPU 30 goes to step S025 and opens a property window shown in FIG. 15. This property window is a window for setting the monitor interval (first time period T1; see step S103) and monitored items (all items or error) in the automatic monitor process described later.

At step S026, the CPU 30 checks whether the X button or the CLOSE button is clicked. If neither the X button nor the CLOSE button is clicked, the CPU 30 goes to step S027 and checks whether the OK button is clicked. If the OK button is not clicked, the CPU 30 goes to step S028 and checks whether any other information is entered. If any other information is not entered, the CPU 30 returns the process to step S026.

If any other information is entered while the CPU 30 executes the check loop of steps S026–S028, the CPU 30 goes to step S029 and executes processing responsive to the entered information. For example, if digits are entered through the keyboard 41 after the PRINTER MONITOR INTERVAL field is clicked, the entered digits are written into the field. Upon completion of step S029, the CPU 30 returns the process to step S026.

If the X button or the CLOSE button is input, the CPU 30 advances the process to step S031 from step S026. In contrast, if the OK button is clicked, the CPU 30 advances the process to step S030 from step S027 and registers the information entered in the fields at the point in time in the local information retention section 12, then advances the process to step S031 at which the CPU 30 closes the property window and returns the process to step S011.

In contrast, if the CPU 30 determines at step S019 that PROPERTY is not selected, it goes to step S020 and checks whether another item is selected. If no items are selected, the CPU 30 returns the process to step S018. If any item is selected, the CPU 30 goes to step S021 and executes processing corresponding to the selected item, then returns the process to step S011.

On the other hand, if the SET button 40c of the main window is clicked while the CPU 30 executes the check loop of steps S012, S016, S032, S041, S053, S057, S069, and S070, the CPU 30 advances the process to step S033 from step S032. At step S033, the CPU 30 displays the customer information window shown in FIG. 11 on the display 40. Since customer information is registered in the local information retention section 12 at the point in time, the CPU 30 enters the registered customer information contents in the corresponding field in the customer information window.

At step S034, the CPU 30 checks whether the X button or the CLOSE button is clicked. If neither the X button nor the CLOSE button is clicked, the CPU 30 goes to step S035 and checks whether the OK button is clicked. If the OK button is not clicked, the CPU 30 goes to step S039 and checks whether any other information is entered. If any other information is not entered, the CPU 30 returns the process to step S034.

If any other information is entered while the CPU 30 executes the check loop of steps S034, S035, and S039, the CPU 30 goes to step S040 and executes processing responsive to As the entered information. For example, if some character is entered through the keyboard 41 after any field is clicked, the field is overwritten with the entered character. If INTERVAL SPECIFICATION is clicked, it is made possible to change the transmission interval of status mail Ø2 described later. If TIME SPECIFICATION is clicked, it is made possible to change the transmission time of status mail Ø2. Upon completion of step S040, the CPU 30 returns the process to step S034.

If the X button or the CLOSE button is input, the CPU 30 advances the process to step S038 from step S034 and closes the customer information window, then returns the process to step S011.

If the OK button is clicked, the CPU 30 advances the process to step S036 from step S035 and overwrites the customer information retention section 18 with the information entered in the fields at the point in time. At step S037, the CPU 30 prepares customer registration/change mail Ø5 (FIG. 12) based on the new information written at step S036 and transmits the customer registration/change mail Ø5 to the mail server 19 (address of the console unit 20) via the LAN 3a and the Internet 6. At step S038, the CPU 30 closes the customer information window and returns the process to step S011.

Figure 16:
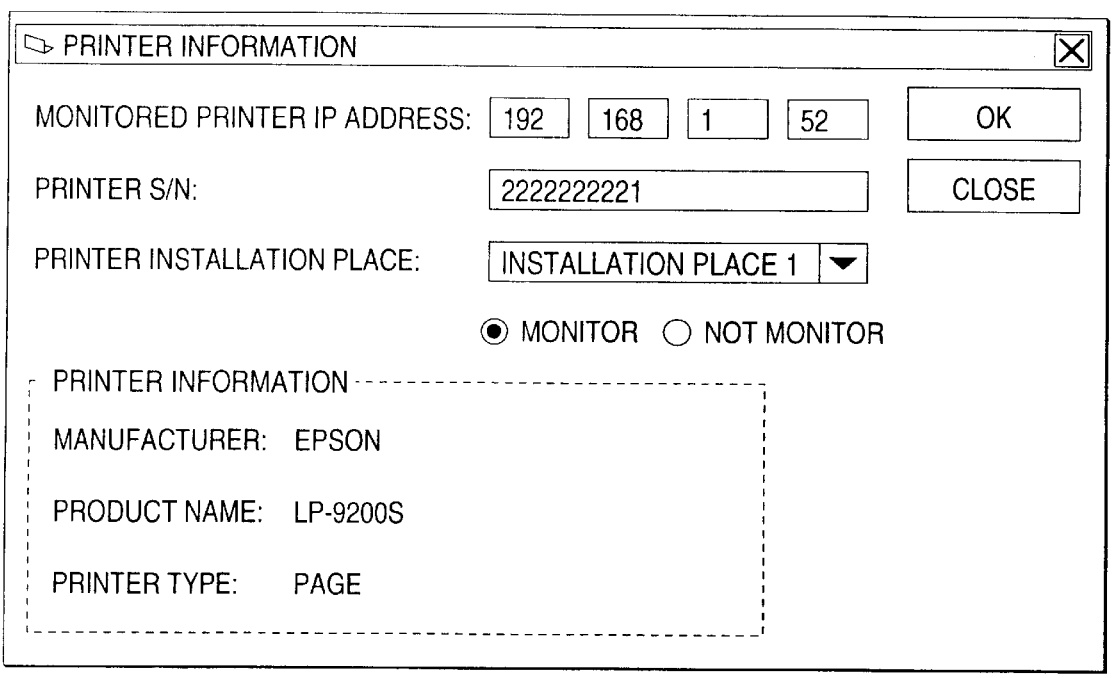
FIG. 16 depicts an illustrative printer information window displayed on the display.

On the other hand, if the REGISTER PRINTER button 40e of the main window is clicked while the CPU 30 executes the check loop of steps S012, S016, S032, S041, S053, S057, S069, and S070, the CPU 30 advances the process to step S042 from step S041. At step S042, the CPU 30 displays a printer information window shown in FIG. 16 on the display 40 in the initial state. The printer information window (subscreen) is provided with fields in which the IP address, SIN (serial number), and installation place of each network printer P to be monitored are entered. However, in the initial state, the fields are blank. The printer information window also contains a button clicked to set the displayed network printer P as the monitored printer.

At step S043, the CPU 30 checks whether the X button or the CLOSE button is clicked. If neither the X button nor the CLOSE button is clicked, the CPU 30 goes to step S044 and checks whether the OK button is clicked. If the OK button is not clicked, the CPU 30 goes to step S051 and checks-whether any other information is entered. If any other information is not entered, the CPU 30 returns the process to step S043.

If any other information is entered while the CPU 30 executes the check loop of steps S043, S044, and S051, the CPU 30 goes to step S052 and executes processing responsive to the entered information. For example, if digits are entered through the keyboard 41 with the IP address entry field clicked, the CPU 30 enters the entered digits in the IP address entry field and automatically gets the status information Ø1 of the network printer P, then displays the discrete information on the network printer P, such as the manufacturer name, the product name, and the printer type, in the lower area of the screen. If the MONITOR button is clicked, the CPU 30 displays a check mark. Upon completion of step S052, the CPU 30 returns the process to step S043.

If the X button or the CLOSE button is input, the CPU 30 advances the process to step S050 from step S043 and closes the printer information window, then returns the process to step S011.

If the OK button is clicked, the CPU 30 advances the process to step S045 from step S044 and determines the information entered in the fields at the point in time. Then, at step S046, the CPU 30 transmits a status request command via the LAN 3a to the network printer P specified by the information determined at step S045, goes to step S047, and waits for a response to the request command.

FIG. 10 shows a status getting process executed in the network printer P. In the network printer P, every second at step S401, the printer controller (not shown) checks the functions of the network printer P at step S402 and overwrites a status buffer 50 with the status information Ø1 corresponding to the state of each function checked, namely, the status code, the toner remaining amount, the ink remaining amount, the waste toner box use amount, the oil remaining amount, the total number of print sheets, the photosensitive unit remaining life, etc., at step S403. The status code written here contains fatal error status code such as 6003 (fuser anomaly), 6008 (engine anomaly), 6014 (engine communication anomaly), and 6020 (sensor dirt) in addition to the status code listed in the error table shown in FIG. 20. When a printer communication section in the network printer P receives a command from the agent unit 10 at step S301, it interprets the contents of the received command at step S302. If the printer communication section determines at step S303 that the received command is a status request command, it reads the most recent status information Ø1 from the status buffer 50 at step S304 and returns the status information Ø1 via the LAN 3a to the agent unit 10 at step S305. If the printer communication section determines at step S303 that the received command is not a status request command, it executes processing responsive to the received command at step S306.

Upon reception of the status information Ø1 from the network printer P, the CPU 30 advances the process to step S048 from step S047. At step S048, the CPU 30 creates a printer registration log file 12c shown in FIG. 17 and retains the created file 12c in the local information retention section 12. The information of the IP address, the serial number, specification as to whether the network printer P is to be monitored, etc., entered on the printer information window and determined at step S045 and the status code, the status code getting date and time, etc., gotten at step S047 are written into the printer registration log file 12c.

At step S049, the CPU 30 prepares printer registration/change mail Ø4 based on the information determined at step S045 and transmits the printer registration/change mail Ø4 to the mail server 19 (address of the console unit 20) via the LAN 3a and the Internet 6. The printer registration/change mail Ø4 consists of a mail header of subject indicating printer registration/change mail and mail address and a mail text containing information such as serial number before change (blank at this point in time), serial number after change (new entered serial number), printer installation place, etc., as shown in FIG. 18. At step S050, the CPU 30 closes the printer information window and returns the process to step S011.

Figure 7:
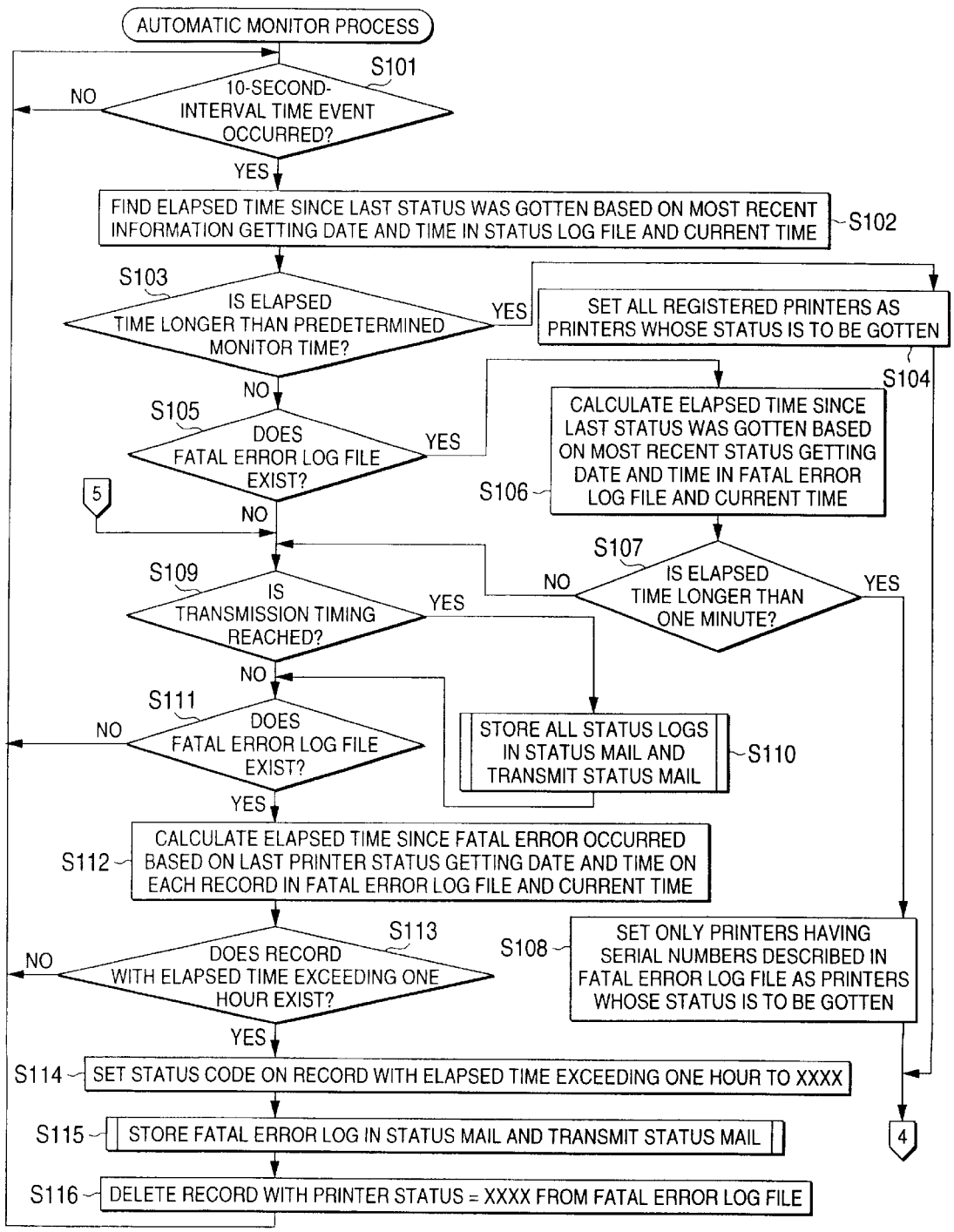
FIG. 7 is a flowchart of an automatic monitor process forming a part of the agent program.

On the other hand, if the START/STOP button 40g is clicked while the CPU 30 executes the check loop of steps S012, S016, S032, S041, S053, S057, S069, and S070, the CPU 30 changes the character string displayed on the START/STOP button 40g from START to STOP and advances the process to step S054 from S053. At step S054, the CPU 30 starts the automatic monitor process (FIG. 7 to FIG. 9). Then, at step S056, the CPU 30 waits for the operator to click on the START/STOP button 40g and when the START/STOP button 40g is clicked, the CPU 30 changes the character string displayed on the START/STOP button 40g from STOP to START and advances the process to step S057.

On the other hand, if any printer name displayed in the list viewer area 40a is double-clicked while the CPU 30 executes the check loop of steps S012, S016, S032, S041, S053, S057, S069, and S070, the CPU 30 advances the process to step S058 from S057. At step S058, the CPU 30 displays the printer information window (subwindow) shown in FIG. 16 on the display 40. At this time, the CPU 30 reads the printer registration log file 12c corresponding to the double-clicked printer name from the local information retention section 12 and enters the information described in the printer registration log file 12c in the fields of the printer information window. A printer status information display field may be contained in the printer information window although it is not shown in FIG. 16.

At step S059, the CPU 30 checks whether the X button or the CLOSE button is clicked. If neither the X button nor the CLOSE button is clicked, the CPU 30 goes to step S060 and checks whether the OK button is clicked. If the OK button is not clicked, the CPU 30 goes to step S067 and checks whether any other information is entered. If any other information is not entered, the CPU 30 returns the process to step S059.

If any other information is entered while the CPU 30 executes the check loop of steps S059, S060, and S067, the CPU 30 goes to step S068 and executes processing responsive to the entered information. For example, if digits are entered through the keyboard 41 with the IP address entry clicked, the CPU 30 overwrites the IP address entry with the entered digits. If the MONITOR button is clicked with a check mark displayed on the NOT MONITOR button, a check mark is put on the MONITOR button and the check mark on the NOT MONITOR button is erased. Upon completion of step S068, the CPU 30 returns the process to step S059.

If the X button or the CLOSE button is input, the CPU 30 advances the process to step S066 from step S059 and closes the printer information window, then returns the process to step S011.

If the OK button is clicked, the CPU 30 advances the process to step S061 from step S060 and determines the information entered in the fields at the point in time. Then, at step S062, the CPU 30 transmits a status request command via the LAN 3a to the network printer P specified by the information determined at step S061, goes to step S063, and waits for a response to the request command. Upon reception of information from the network printer P (i.e., a response), the CPU 30 goes to step S64 and rewrites new contents into the printer registration log file 12c based on the information determined at step S061, then stores the printer registration log file 12c with the new contents in the local information retention section 12.

At step S065, the CPU 30 prepares printer registration/change mail Ø4 based on the information determined at step S061 and transmits the printer registration/change mail Ø4 to the mail server 19 (address of the console unit 20) via the LAN 3a and the Internet 6. At step S066, the CPU 30 closes the printer information window and returns the process to step S011.

On the other hand, if any other input than clicking of the X button or the CLOSE button occurs while the CPU 30 executes the check loop of steps S012, S016, S032, S041, S053, S057, S069, and S070, the CPU 30 goes to step S071 and performs processing responsive to the input information. For example, if the DELETE PRINTER button 40f is clicked after any printer name displayed in the list viewer area 40a is clicked, the CPU 30 deletes the printer registration log file 12c corresponding to the printer name from the local information retention section 12.

On the other hand, if the X button or the CLOSE button is clicked at step S069 while the CPU 30 executes the check loop of steps S012, S016, S032, S041, S033, S057, S069, and S070, the CPU 30 terminates the screen display process.

Next, the automatic monitor process (local monitor step) started at steps S014 and S054 of the screen display process will be discussed with reference to FIG. 7 to FIG. 9. At the first step S101 after the main routine of the automatic monitor process shown in FIG. 7 is started, the CPU 30 waits for a timer event occurring every 10 seconds to occur. When a timer event occurs, the CPU 30 advances the process to step S102.

At step S102, the CPU 30 makes a reference to the status log file 12a stored in the local information retention section 12. FIG. 19 shows one record in the status log file 12a. The record is prepared separately for each of all network printers P for which the MONITOR button is input on the printer information screen in FIG. 16. A set of all the records thus prepared forms the status log file 12a. As shown in FIG. 19, each record in the status log file 12a describes the status information Ø1 indicating the state of the corresponding network printer P, namely, status code, toner remaining amount, ink remaining amounts (black ink remaining amount, cyan ink remaining amount, magenta ink remaining amount, and yellow ink remaining amount, etc.), waste toner box use amount, oil remaining amount, total number of print sheets, photosensitive unit remaining life, etc. It also contains an entry of information getting date and time (at which the status information Ø1 was gotten). The CPU 30 checks all records in the status log file 12a and determines the most recent information getting date and time. Then, it calculates the time difference between the determined most recent information getting date and time and the current time indicated by the timer monitor section 17 and assumes the timer difference to be the elapsed time since the last status was gotten.

Figure 4:
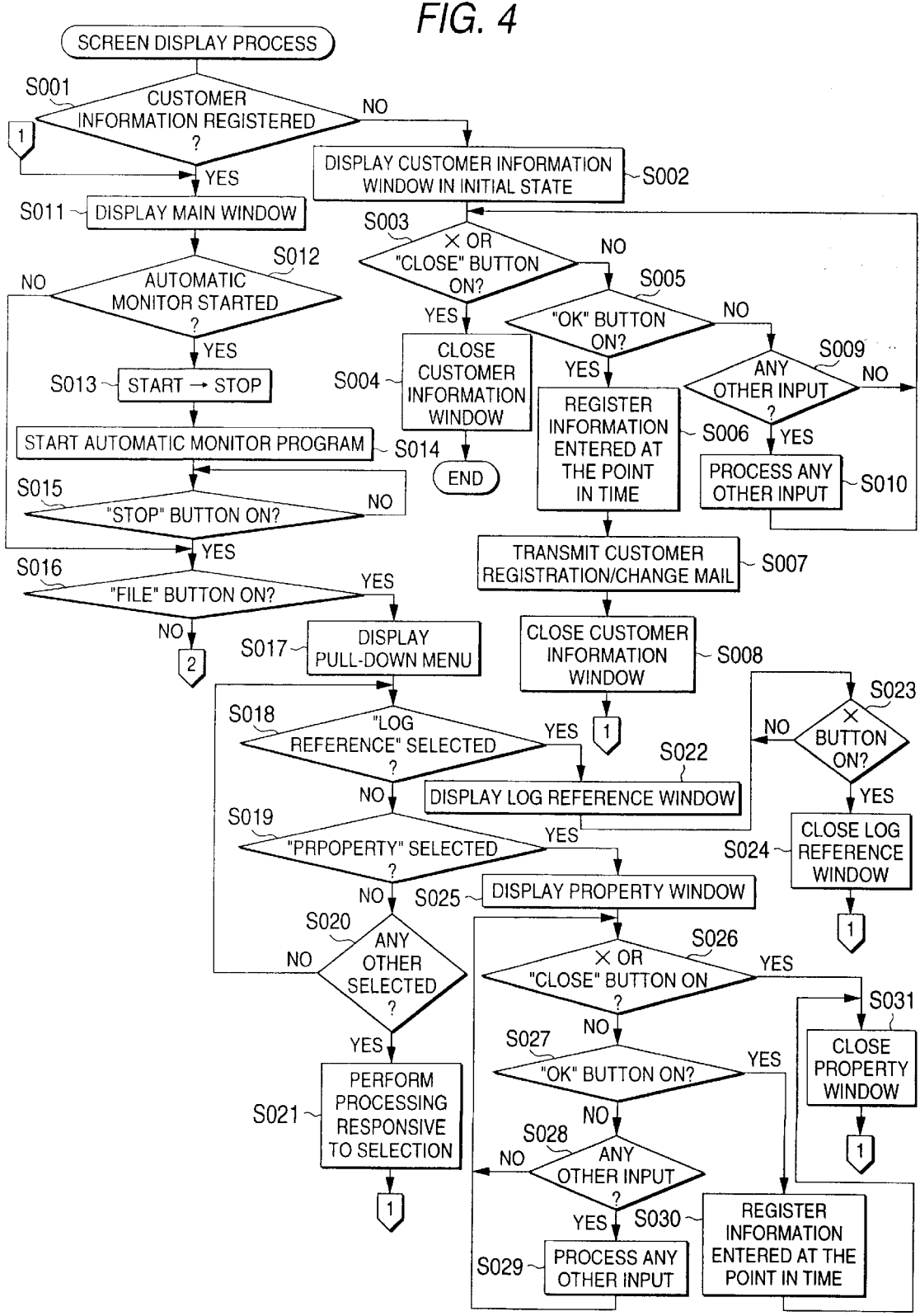
FIG. 4 is a flowchart of a screen display process forming a part of the agent program.
Figure 15:
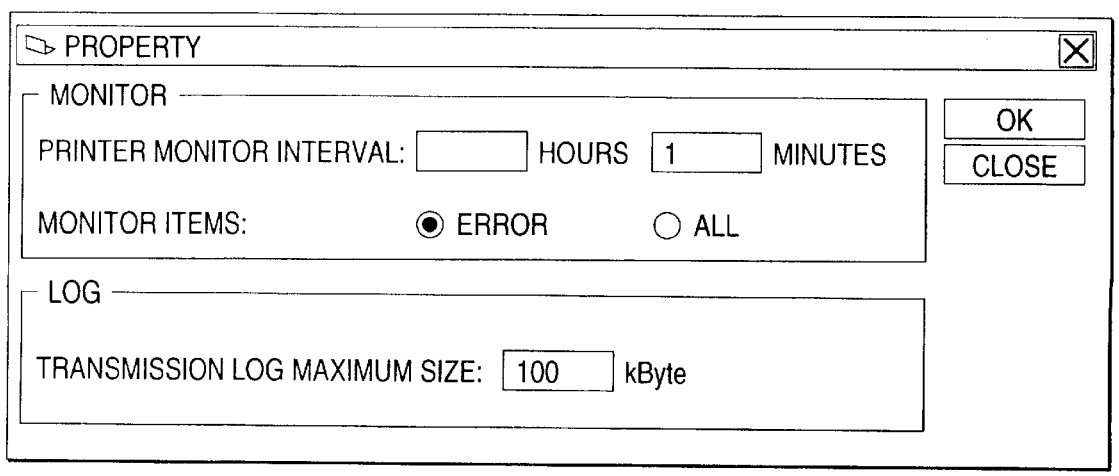
FIG. 15 depicts an illustrative property window displayed on the display.

At step S103, the CPU 30 checks whether the elapsed time found at step S102 is longer than the first time period T1 set on the property window in FIG. 15 (see, also step S030 in FIG. 4). If the elapsed time found at step S102 is longer than the first time period T1, the CPU 30 goes to step S104 and sets all network printers P registered in the printer registration log file 12c in the local information retention section 12 as the printers whose status information Ø1 is to be gotten.

At step S117 (FIG. 8), the CPU 30 specifies one of all network printers P whose status is to be gotten as the target printer.

At step S118, the CPU 30 transmits a status request command to the target printer (as a local information getting step). When receiving the status request command, the target printer executes the process shown in FIG. 10 and returns the current status information Ø1 to the CPU 30. Upon reception of the status information Ø1 at step S119, the CPU 30 advances the process to step S120.

At step S120, the CPU 30 overwrites the record of the target printer in the status log file 12a with the most recent status information Ø1 received at step S119 and rewrites the current time into the entry INFORMATION GETTING DATE AND TIME (as a local information retention step).

At step S121, the CPU 30 collates the status code contained in the most recent status information Ø1 entered at step S121 with the error table (FIG. 20) in the error table retention section 9. As shown in FIG. 20, the error table consists of an error level column Z13x under which error levels are described, a code column Z13y under which status codes are described, and a message column Z13z under which messages are described. According to the error table, all status code error levels are classified into fatal error E1, warning E2, and information E3, and messages are provided in a one-to-one correspondence with the status codes. In the error table, status codes greater than "6000" are classified as fatal error E1 in batch. The status code "XXXX" described in the error table denotes a service call error meaning that a fatal error continues for one hour or more. The CPU 30 looks up in the error table and determines which error level the status code contained in the most recent status information Ø1 belongs to. If the CPU 30 judges that the status code belongs to the fatal error level because it is greater than "6000," the CPU 30 advances the process to step S122. If the CPU 30 determines that the status code does not belong to the fatal error level because it is less than "6000," the CPU 30 advances the process to step S127.

At step S122, the CPU 30 checks whether a fatal error log file 12d is stored in the local information retention section 12. FIG. 21 shows one record in the fatal error log file 12d. The record is prepared separately for each of the network printers P with the status code error level belonging to the fatal error at steps S123 and S125 described later. A set of all the records thus prepared forms the fatal error log file 12d. As shown in FIG. 21, each record in the fatal error log file 12d describes INFORMATION GETTING DATE AND TIME indicating the point in time at which the fatal error of the corresponding network printer P occurred, the status code indicating the type of fatal error which occurred, etc. If no fatal error log file 12d is stored in the local information retention section 12, the CPU 30 advances the process to step S123; if the file is stored, the CPU 30 advances the process to step S124. When step S122 is first executed, it is determined that no fatal error log file 12d is stored, of course.

At step S123, the CPU 30 uses the information described on the record of the target printer in the status log file 12a to prepare one fatal error log file record and stores the record as a fatal error log file 12d. After completion of step S123, the CPU 30 advances the process step to S126.

In contrast, at step S124, the CPU 30 checks whether the record of the target printer is contained in the fatal error log file 12d in the local information retention section 12. If the record is contained, the CPU 30 advances the process to step S133 without updating the information in the record. In contrast, if the record of the target printer is not contained in the fatal error log file 12d, the CPU goes to step S125 and uses the information described on the record of the target printer in the status log file 12a to prepare one fatal error log file record, then adds the record to the fatal error log file 12d. After completion of step S125, the CPU 30 advances the process step to S126.

At step S126, the CPU 30 stores the information described in the fatal error log file 12d in status mail (fatal error occurrence mail) Ø2 shown in FIG. 22 and transmits the status mail Ø2 to the mail server 19 (address of the console unit 20) (as a local information transmission step). As shown in FIG. 22, the status mail Ø2 consists of a mail header of subject indicating status mail and mail address and one or more mail texts prepared for each network printer P. Each mail text consists of the serial number of the corresponding network printer P, the contents of the status information Ø1 (namely, status code, remaining amount information of toner remaining amount, ink remaining amounts, etc., and the like), and the information getting date and time indicating the point in time at which the status information Ø1 was gotten. If the status mail Ø2 is prepared based on the fatal error log file 12d, the status information Ø1 other than the status code is not contained in the fatal error log file 12d, thus the fields of the status information Ø1 other than the status code in each mail text remain blank.

At step S126, in fact, a status mail transmission subroutine shown in FIG. 9 is called and executed. At the first step S201 after the subroutine is entered, the CPU 30 copies the log file to be transmitted. At step S202, the CPU 30 disassembles the log file to be transmitted, copied at step S201 into records and again edits each record in the mail text format. At this time, the fields with no corresponding information are made to remain blank, as described above. The mail texts are concatenated with each other and a mail header is added to the top, thereby preparing the status mail Ø2 (as an electronic mail preparation step). At step S203, the CPU 30 makes dial-up IP connection to the provider with which the customer contracts. At step S204, the CPU 30 transmits the status mail Ø2 prepared at step S202 to the mail server 19 (address of the console unit 20) via the Internet 6 (as an electronic mail sending step). At step S205, the CPU 30 creates a transmission log file 12b shown in FIG. 23 based on the contents of the status mail Ø2 transmitted at step S204. The transmission log file 12b is prepared for each mail text contained in the status mail Ø2 and describes the transmission destination mail address, the serial number of the target network printer P, the transmission date and time of the status mail Ø2, and the transmission status (information as to whether the mail was normally transmitted). At step S206, the CPU 30 stores the transmission log file 12b prepared at step S205 in the local information retention section 12. Then, the CPU 30 exists from the status mail transmission subroutine.

After completion of step S126, the CPU 30 advances the process to step S133.

On the other hand, if it is determined at step 121 that the status code does not belong to the fatal error, it means that a fatal error does not occur in the target printer or that the fatal error that once occurred in the target printer is corrected. Thus, first at step S127, the CPU 30 checks whether the fatal error log file 12d exists in the local information retention section 12. If no fatal error log file 12d exists in the local information retention section 12, immediately the CPU 30 advances the process to step S133.

In contrast, if the fatal error log file 12d exists in the local information retention section 12, the CPU goes to step S128 and checks whether the fatal error log file 12d contains the record of the target printer. If the fatal error log file 12d does not contain the record of the target printer, the CPU goes to step S131 and checks whether the fatal error log file 12d contains the record of any other printer. If the record of any other printer is contained, immediately the CPU 30 advances the process to step S133. If the record of any other printer is not contained, the CPU 30 goes to step S132 and deletes the fatal error log file 12d, then advances the process to step S133.

In contrast, if the CPU 30 determines at step S128 that the fatal error log file 12d contains the record of the target printer, namely, if the fatal error that once occurred is corrected, the CPU 30 goes to step S129 and deletes the record of the target printer from the fatal error log file 12d. At step S130, the CPU 30 executes the status mail transmission subroutine in FIG. 9, thereby storing the information described in the fatal error log file 12d in the status mail (fatal error recovery mail) Ø2 and transmitting the status mail Ø2 to the mail server 19 (address of the console unit 20) (as a local information transmission step). After completion of step S130, the CPU 30 advances the process to step S133.

At step S133, the CPU 30 checks whether steps S117 to S132 are complete for all the network printers P set as printers whose status is to be gotten at step S104 (or S108). If steps S117 to S132 are not complete for all the network printers P set as printers whose status is to be gotten, the CPU 30 returns the process to step S117 to specify another network printer P as the target printer. In contrast, if steps S117 to S132 are complete for all the network printers P set as printers whose status is to be gotten, the CPU 30 advances the process to step S109.

On the other hand, if the CPU 30 determines at step S103 that the elapsed time found at step S102 is less than the first time period T1, it advances the process to step S105 at which the CPU 30 checks whether the fatal error log file 12d exists in the local information retention section 12. If no fatal error log file 12d exists in the local information retention section 12, immediately the CPU 30 advances the process to step S109. In contrast, if the fatal error log file 12d exists in the local information retention section 12, the CPU 30 advances the process to step S106.

At step S106, the CPU 30 checks all records in the fatal error log file 12d and determines the most recent information getting date and time. Then, it calculates the time difference between the determined most recent information getting date and time and the current time indicated by the timer monitor section 17 and assumes the timer difference to be the elapsed time since the last status was gotten.

At step S107, the CPU 30 checks whether the elapsed time calculated at step S106 is longer than one minute. If the elapsed time is longer than one minute, the CPU 30 goes to step S108 and sets all network printers P having the serial numbers described in the fatal error log file 12d as the printers whose status is to be gotten. Then, the CPU 30 executes steps S117 to S133 to get the status of only the network printers P set as the printers whose status is to be gotten. In contrast, if the CPU 30 determines at step S107 that the elapsed time is equal to or less than one minute, it advances the process to step S109.

At step S109, the CPU checks whether the current time sent from the timer monitor section 17 reaches the transmission timing, namely, the elapsed time since the automatic monitor process was started or the elapsed time since the most recent execution of step S110 reaches the second time period T2 specified on the customer information window shown in FIG. 11. If the current time reaches the transmission timing, namely, if the elapsed time since the automatic monitor process was started or the elapsed time since the most recent execution of step S110 reaches the second time period T2, the CPU 30 advances the process to step S110 and executes the status mail transmission subroutine in FIG. 9, thereby storing the information described in the status log file 12a in the status mail (normal mail) Ø2 and transmitting the status mail Ø2 to the mail server 19 (address of the console unit 20). After completion of step S110, the CPU 30 advances the process to step S111. In contrast, if the CPU 30 determines at step S109 that the current time does not reach the transmission timing, immediately the CPU 30 advances the process to step S111.

At step S111, the CPU 30 checks whether the fatal error log file 12d exists in the local information retention section 12. If no fatal error log file 12d exists in the local information retention section 12, immediately the CPU 30 advances the process to step S101. In contrast, if the fatal error log file 12d exists in the local information retention section 12, the CPU 30 advances the process to step S112 at which the CPU 30 calculates the time difference between the information getting date and time described on each record in the fatal error log file 12d and the current time, namely, the elapsed time since the fatal error occurred. At step S113, the CPU 30 checks whether there is a record with the elapsed time calculated at step S112 exceeding one hour. If there is no record with the elapsed time exceeding one hour, the CPU 30 returns the process to step S101. In contrast, if there is a record with the elapsed time exceeding one hour, the CPU 30 advances the process to step S114.

At step S114, the CPU 30 changes the status code (>6000) described on the record with the elapsed time exceeding one hour to "XXXX" representing a service call error. At step S115, the CPU 30 executes the status mail transmission subroutine in FIG. 9, thereby storing the information described in the fatal error log file 12d in the status mail Ø2 and transmitting the status mail (service call error mail) Ø2 to the mail server 19 (address of the console unit 20) (as a local information transmission step). The service call error mail requests the agency to dispatch maintenance personnel and there is little possibility that the user may be able to correct the error under circumstances where the service call error mail is transmitted. Then, at step S116, the CPU 30 deletes the record with the status code changed at step S114 from the fatal error log file 12d, then returns the process to step S101.

Figure 26:
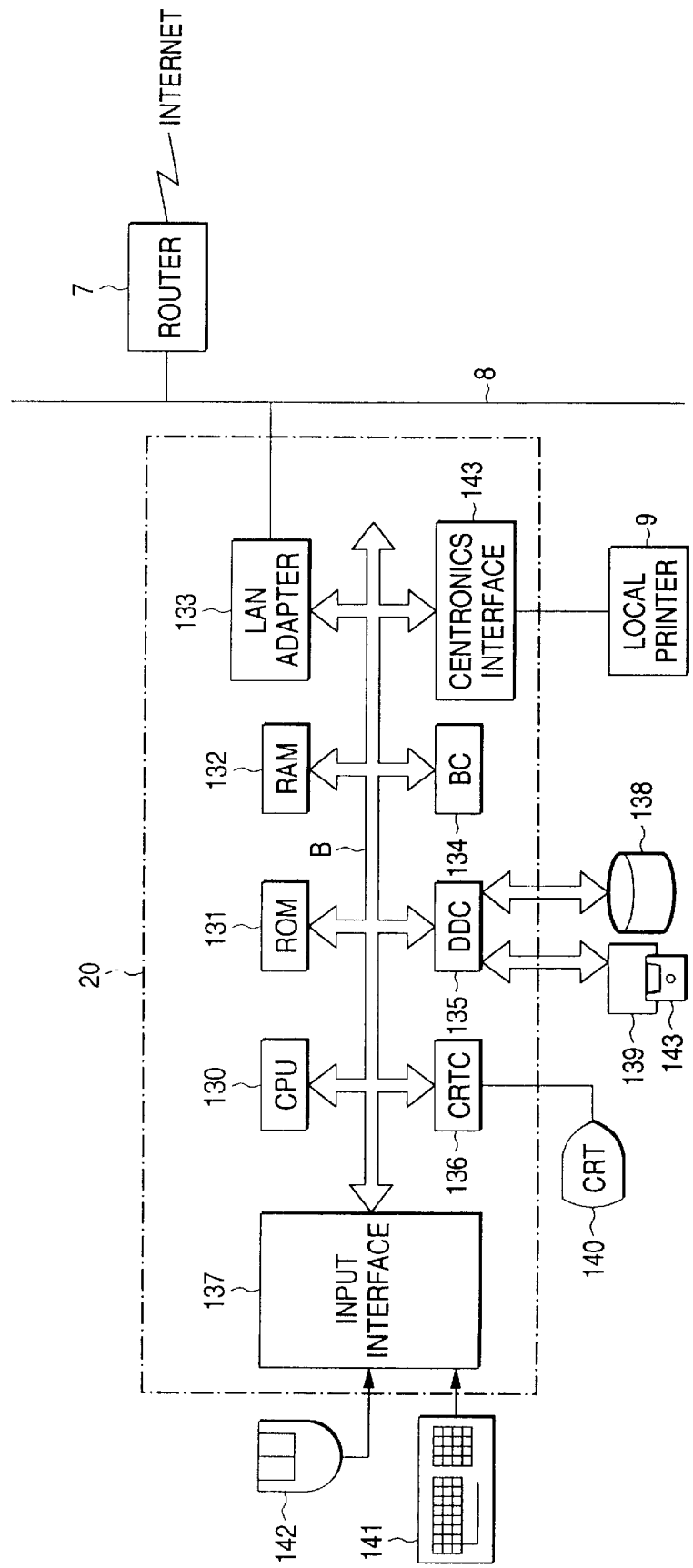
FIG. 26 is a block diagram depicting the circuit configuration of a console unit shown in FIG. 1.

The console unit 20, depicted in FIG. 26, reads electronic mail of status mail Ø2, etc., transmitted from the agent unit 10 via an appropriate route in the Internet 6 to the mail server 19 and stored in a mail box 19a thereof (see FIG. 27) at an appropriate timing through the Internet 6 according to a predetermined protocol (POP3).

FIG. 26 is a block diagram to show the hardware configuration of a computer forming the console unit 20. As shown here, the console unit 20 has almost the same hardware configuration as the agent unit 10 shown in FIG.

2 except that it is provided with a Centronics interface 143 and a local printer 9. The Centronics interface 143 is connected to a CPU 130 via a bus B and is also connected to the local printer 9 by a Centronics cable for sending print data prepared by the CPU 130 to the local printer 9. An operating system program (Windows 95™ manufactured by Microsoft) and a console program (described later) executed by the CPU 130 are stored on the hard disk 138. An error table 28 and a database 23 shown in FIG. 28 are also stored on the hard disk 138. The error table 28 is the same as that in the agent unit 10 shown in FIG. 20.

Figure 29:
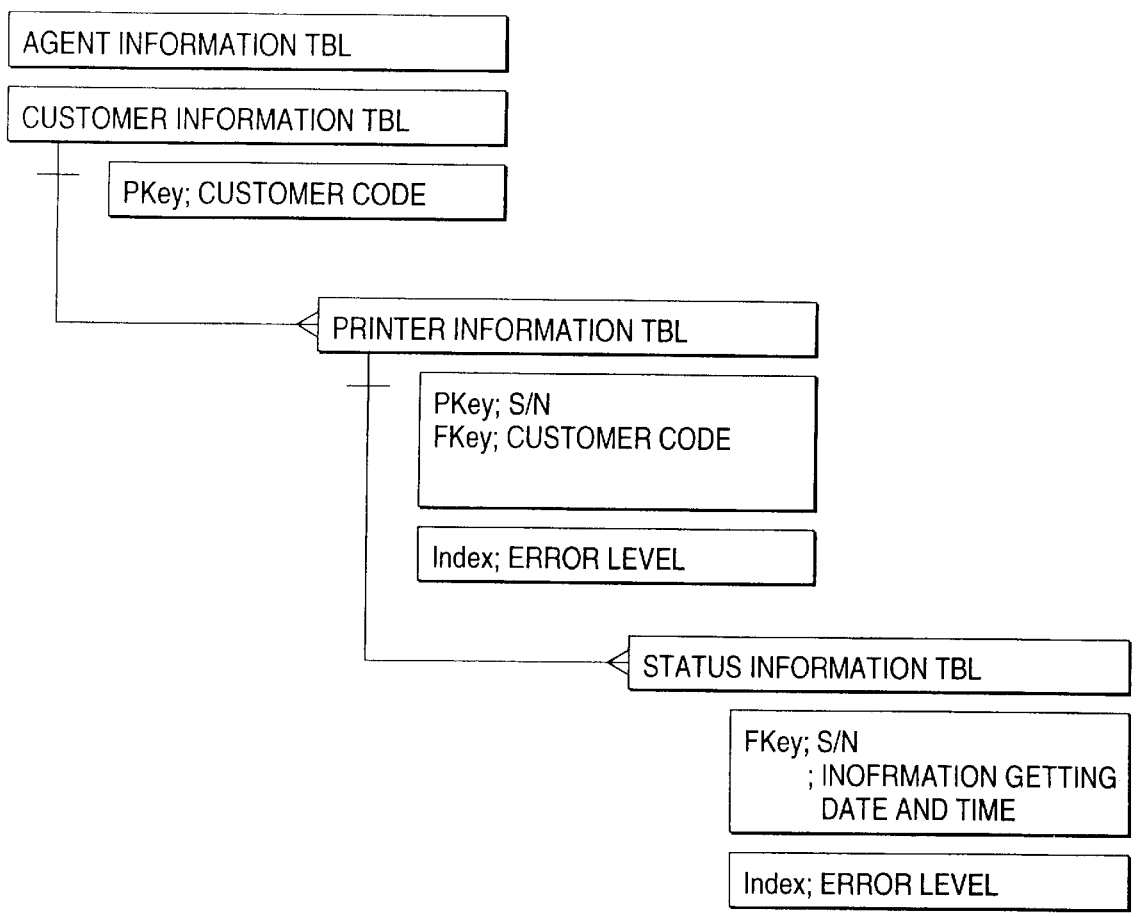
FIG. 29 illustratively depicts the relation among the tables making up the database.

The database 23 is a relational database where a plurality of tables shown in FIG. 28 are related to each other as shown in FIG. 29. The agency information table shown in FIG. 28 stores information concerning the agency operating the console unit 20. The customer information tables are prepared in a one-to-one correspondence with the agent units 10; each customer information table storing information concerning the corresponding agent unit 10 and the customer operating the agent unit 10. The printer information tables are prepared in a one-to-one correspondence with the network printers P to be monitored for storing information thereon and are related to the customer information tables for the agent units 10 for monitoring the corresponding network printers P with customer codes as keys. The status information table is prepared for each status information Ø1 gotten for each network printer P for storing the contents of the status information Ø1. The status information tables are related to the network printers P indicated by the status information Ø1 with serial numbers as keys.

The CPU 130 controls the whole console unit 20 and functions as global information getting means (electronic mail reception means, extraction means), database management means, display means, output means, and statistical processing means.

Figure 27:
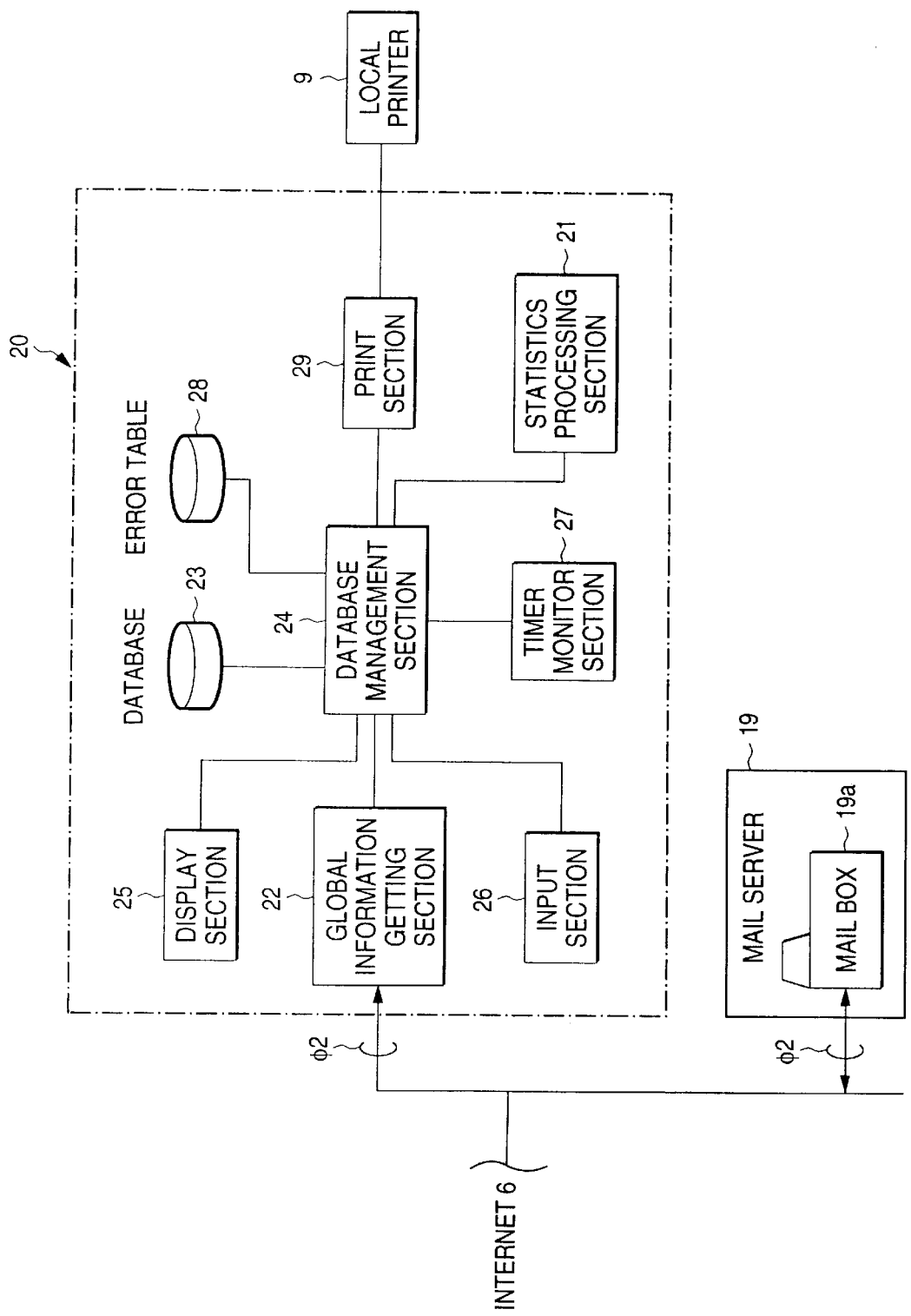
FIG. 27 is a block diagram decpiting the functions of a CPU, RAM, and a hard disk in a state in which a console program is executed.

FIG. 27 is a block diagram depicting the functions of the CPU 130, RAM 132, and the hard disk 138 provided when the CPU 130 executes the operating system program and the console program expanded in the RAM 132. The functions of the CPU 130, the RAM 132, and the hard disk 138 shown in FIG. 27 are a statistical processing section 21, a global information getting section 22, the above-mentioned database 23, a database management section 24, a display section 25, an input section 26, a timer monitor section 27, the above-mentioned error table 28, and a print section 29.

The global information getting section 22 as global information getting means receives status mail Ø2, customer registration/change mail Ø5, and printer registration/change mail Ø4 stored in the mail box 19a via the LAN 8 and the router 7 (as electronic mail reception means) and extracts the electronic mail contents (as extraction means).

Figure 35:
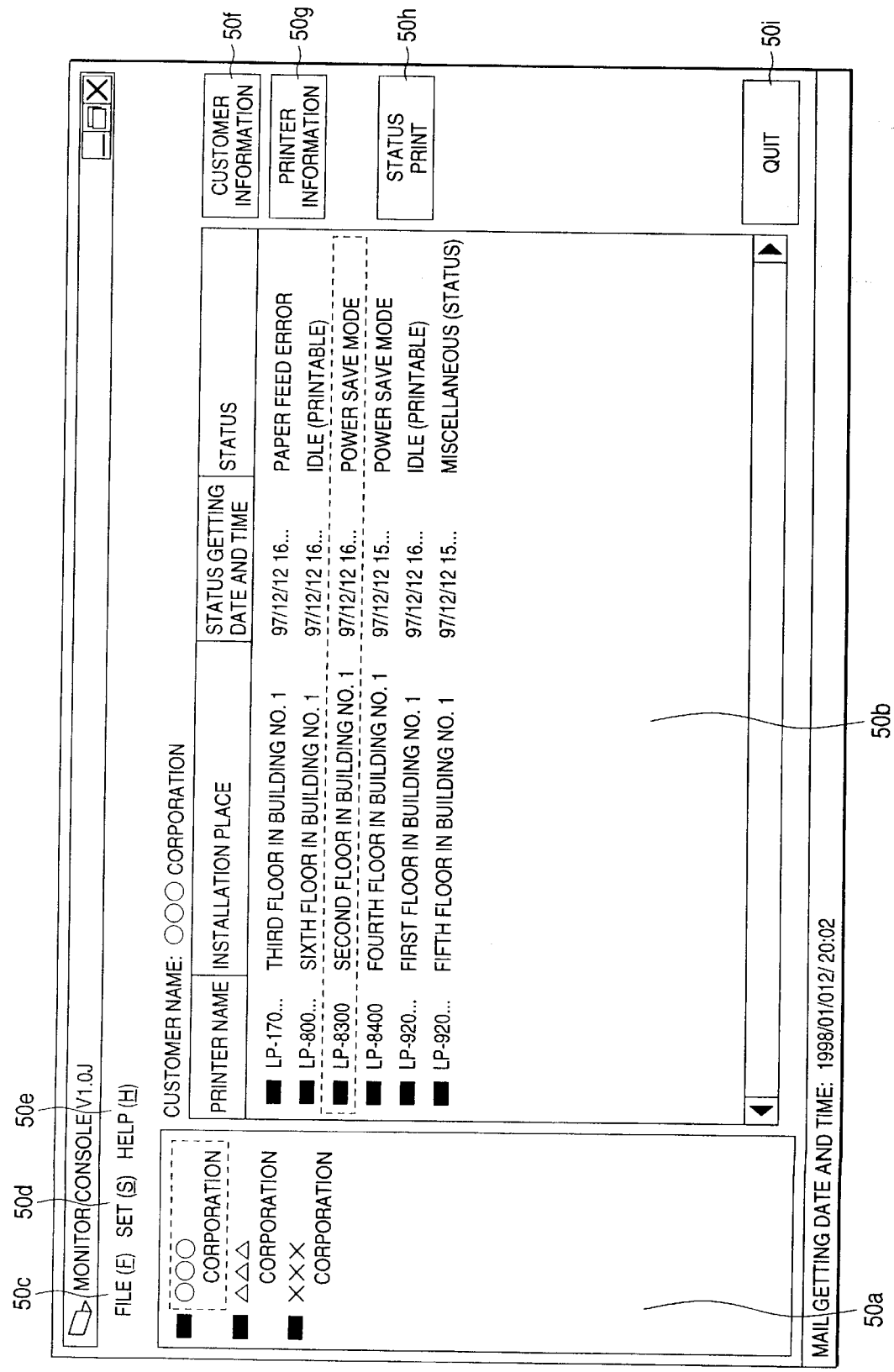
FIG. 35 depicts an illustrative main window displayed on a display.

The display section 25 as display means and output means displays information stored on the database 23 on a display 140 (FIG. 26). At this time, the display section 25 displays the status information Ø1 of the network printers P in LAN 3 units like a main window shown in FIG. 35. That is, it displays the status information Ø1 of all the network printers P belonging to each customer (agent unit 10).

The input section 26 interprets input information based on an input signal from a keyboard 141 or a mouse 142. For example, the input section 26 displays a cursor moving in response to a vector signal from the mouse 142 on the display 140 and when a click signal is entered through the mouse 142, the input section 26 assumes that the displayed information superposed on the cursor at the point in time, such as a button, is entered.

The timer monitor section 27 monitors the timing at which the global information getting section 22 reads the status mail Ø2 in the mail box 19a, and the like.

The print section 29 as output means sends the status information Ø1 displayed on the display section 25 via the Centronics interface 143 to the local printer 9 for printing the status information.

The database management section 24 as database management means updates the database 23 according to the status information Ø1 of each network printer P extracted from the status mail Ø2, the customer information extracted from the customer registration/change mail Ø5, and the printer information extracted from the printer registration/change mail Ø4. If the status information Ø1 put into electronic mail cannot be gotten (if status mail is not stored in the mail box 19a or status mail cannot be read from the mail box 19a) for a predetermined duration, the database management section 24 assumes that there is a strong possibility that a problem may occur in the mail system, and causes the display section 25 to display an error message indicating the fact on the display 140.

The statistical processing section 21 as statistical processing means predicts the statistics of the remaining amounts of consumables of ink, toner, etc., based on the past status information Ø1 (remaining amount information) stored on the database 23 for each network printer P monthly, weekly, or daily by using regression lines, etc., provided using two variables provided by a least squares method. For example, the monthly remaining amount statistics are predicted based on all consumable remaining amount information for the past five months. However, if the remaining amount information stored on the database 23 is less than that for the past five months, for example, if there is remaining amount information only for the past two to four weeks, the statistical processing section 21 predicts the remaining amount statistics based on all remaining amount information stored on the database 23. The weekly remaining amount statistics are predicted based on remaining amount information for the past five weeks. However, if the remaining amount information stored on the database 23 is less than that for the past five weeks, for example, if there is remaining amount information only for the past one week, the statistical processing section 21 predicts the remaining amount statistics based on all remaining amount information stored on the database 23. The daily remaining amount statistics are predicted based on remaining amount information for the past five days. Also in this case, if the remaining amount information is less than that for the past five days, the statistical processing section 21 predicts the remaining amount statistics based on all remaining amount information. Upon completion of predicting the remaining amount statistics, the statistical processing section 21 prepares a graph indicating the statistics and requests the display section 25 to display the graph.

The timer monitor section 27 measures the timing at which the global information getting section 22 reads mail from the mail server 19.

Figure 5:
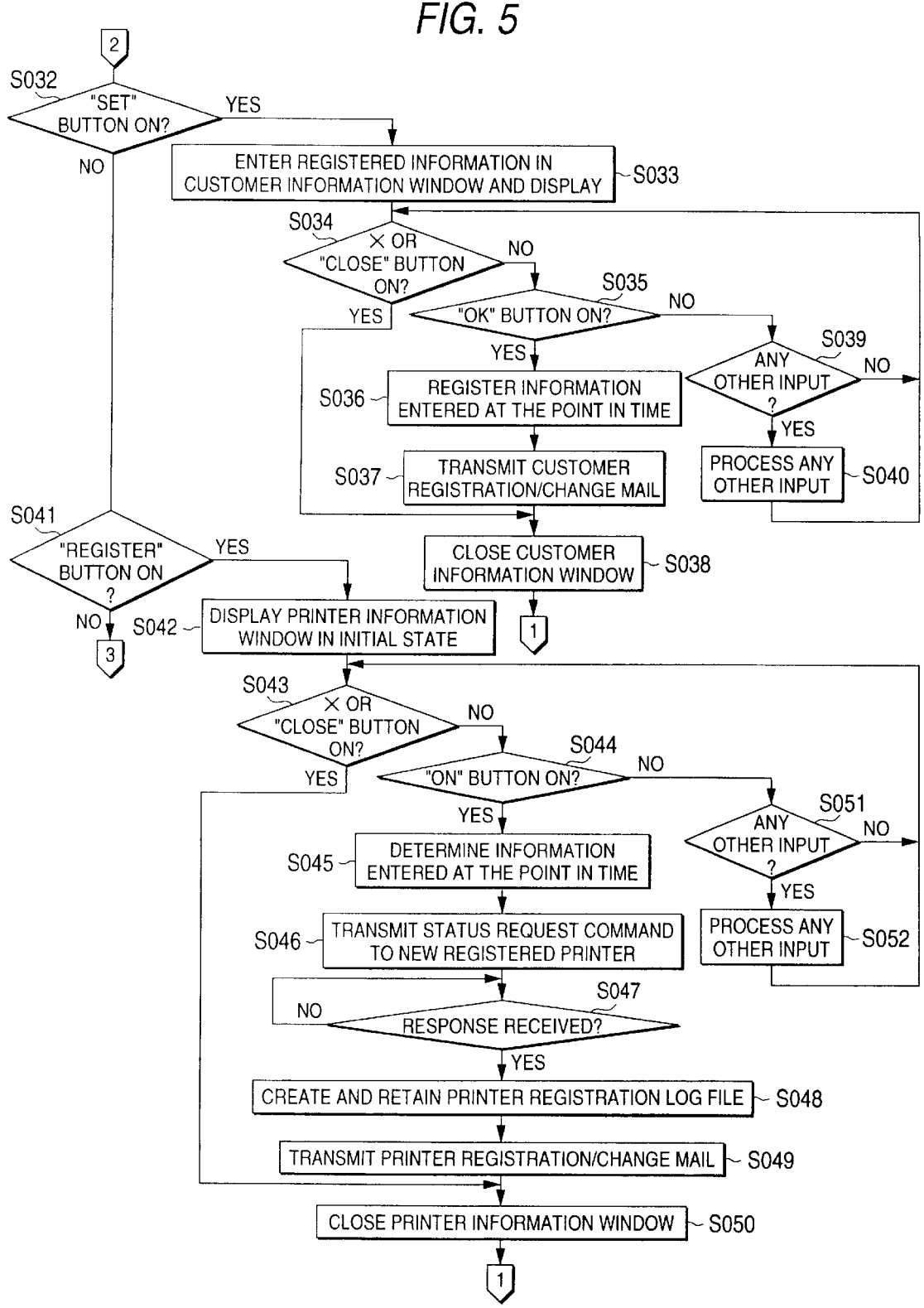
FIG. 5 is a flowchart of the screen display process forming a part of the agent program.
Figure 6:
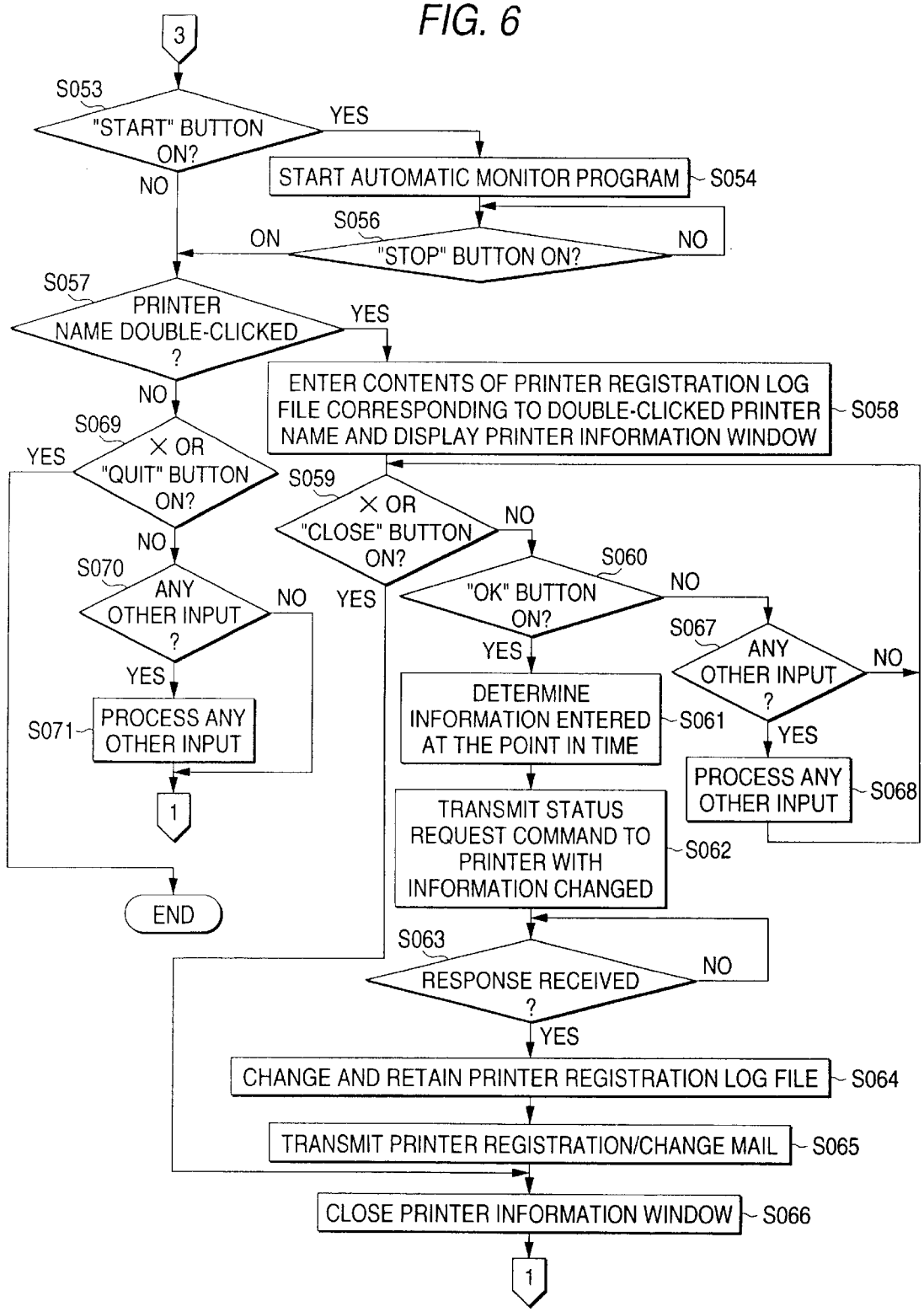
FIG. 6 is a flowchart of the screen display process forming a part of the agent program.

The operation performed when the CPU 130 having the described function executes the console program (global monitor step) will be discussed with reference to flowcharts in FIG. 30 to FIG. 5. The console program is made up of a mail getting process shown in FIG. 30 and FIG. 31 and a screen display process shown in FIG. 32 to FIG. 35.

Figure 30:
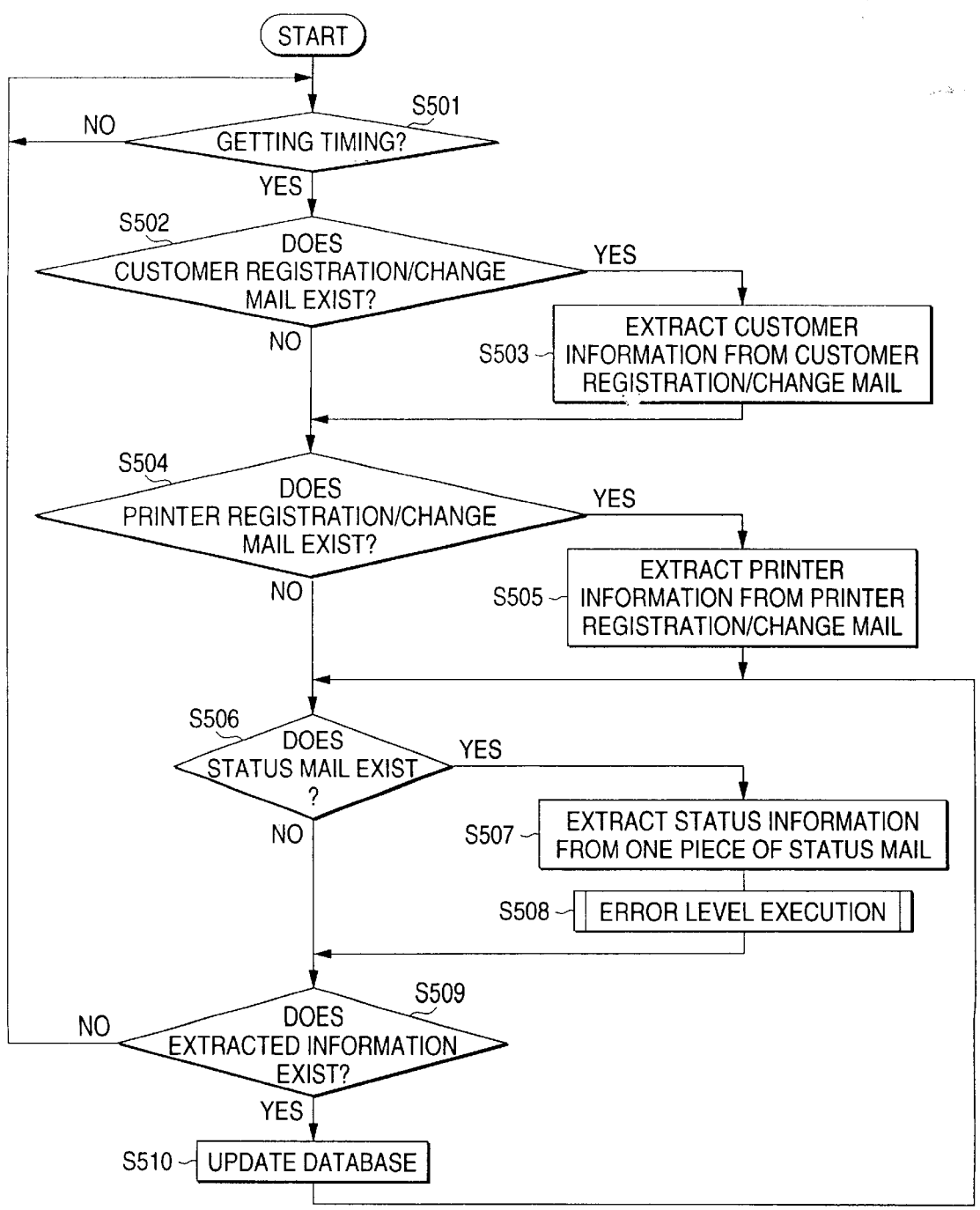
FIG. 30 is a flowchart of a mail getting process forming a part of the console program.

When an icon displayed on the display 140 is clicked, the mail getting process in FIG. 30 (as a global information getting step and a data getting step) is started. At the first step S501 after the mail getting process is started, the CPU 130 waits for the timing to read mail from the mail box 19a of the mail server 19 based on the current time information prepared by the time monitor section 27 9FIG. 27). When the timing is reached, the CPU 130 goes to step S502 and checks whether unread customer registration/change mail Ø5 exists in the mail box 19a. If unread customer registration/change mail Ø5 does not exist, immediately the CPU 130 advances the process to step S504. In contrast, if unread customer registration/change mail Ø5 exists, the CPU 130 goes to step S503 and reads all unread pieces of customer registration/change mail Ø5 from the mail box 19a, then extracts customer information from the read pieces of customer registration/change mail Ø5. Upon completion of step S503, the CPU 130 advances the process to step S504.

At step S504, the CPU 130 checks whether unread printer registration/change mail Ø4 exists in the mail box 19a. If unread printer registration/change mail Ø4 does not exist, immediately the CPU 130 advances the process to step S506. In contrast, if unread printer registration/change mail Ø4 exists, the CPU 130 goes to step S505 and reads all unread pieces of printer registration/change mail Ø4 from the mail box 19a, then extracts printer information from the read pieces of printer registration/change mail Ø4. Upon completion of step S505, the CPU 130 advances the process to step S506.

At step S506, the CPU 130 checks whether unread status mail Ø2 exists in the mail box 19a. If unread status mail Ø2 does not exist, immediately the CPU 130 advances the process to step S509. In contrast, if unread status mail Ø2 exists, the CPU 130 goes to step S507 and reads one unread piece of status mail Ø2 from the mail box 19a (as an electronic mail reception step), then extracts the status information Ø1 the information getting date and time, and the serial number from the read piece of status mail Ø2 (as an extraction step). Upon completion of step S507, the CPU 130 advances the process to step S508.

Figure 31:
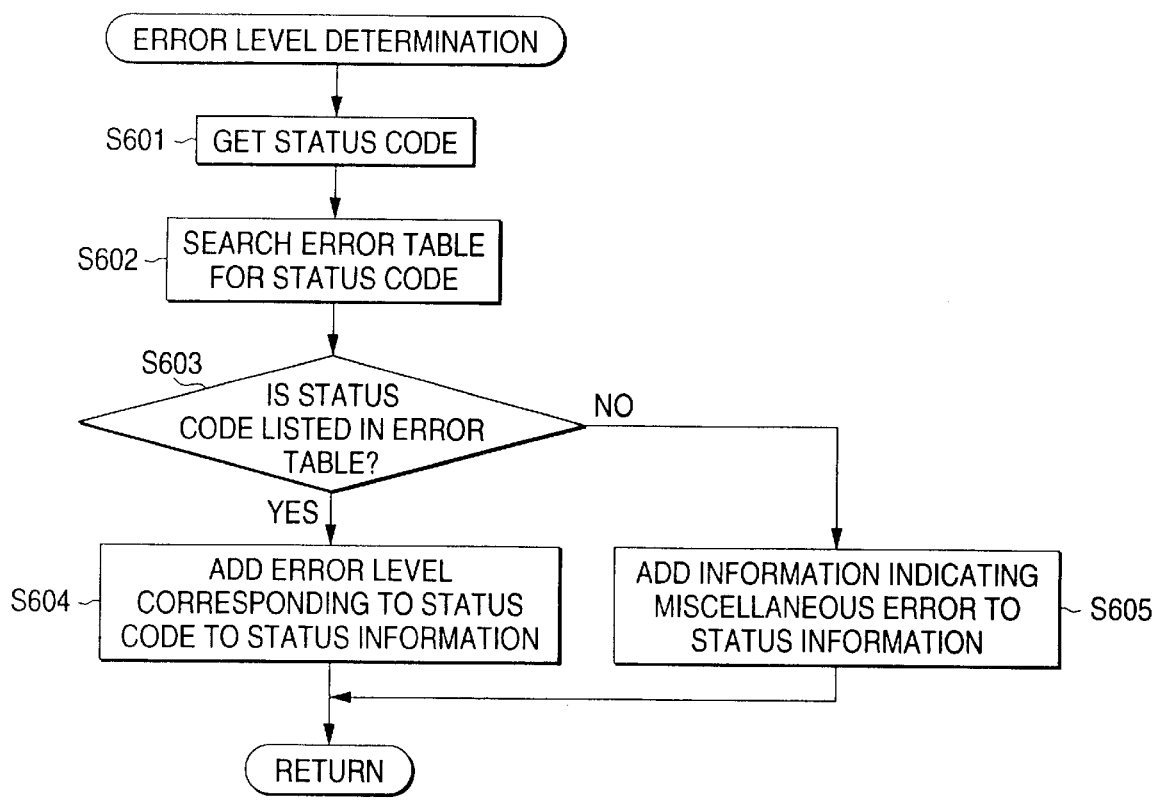
FIG. 31 is a flowchart of an error level determination subroutine executed at step S508 in FIG. 30.

At step S508, the CPU 130 determines the level of the error that occurred in the corresponding network printer P based on the status code contained in the status information Ø1 extracted at step S507. FIG. 31 is a flowchart to show an error level determination processing subroutine executed at step S508. At the first step S601 after the subroutine is entered, the CPU 130 reads status code from the status information Ø1 extracted at step S507. At step S602, the CPU 130 searches the error table 28 (FIG. 20) for the status code read at step S601. At step S603, the CPU 130 checks whether the status code read at step S601 is listed in the error table 28 as a result of the search at step S602. If the status code is listed in the error table 28, the CPU 130 adds the information indicating the error level corresponding to the status code (A: Fatal, B: Warning, C: Information) to the status information Ø1. In contrast, if the status code is not listed in the error table 28, the CPU 130 adds the information indicating a miscellaneous error to the status information Ø1. Upon completion of step S604 or S605, the CPU 130 exits from the error level determination processing subroutine and returns control to the main routine in FIG. 30. In the main routine to which control is returned, the CPU 130 advances the process to step S509 from step S508.

At step S509, the CPU 130 checks whether there is information extracted at step S503, S505, or S507. If there is extracted information, the CPU 130 advances the process to step S510 and updates the database 23 based on the customer information extracted at step S503, the printer information extracted at step S505, or the status information Ø1 extracted at step S507 (as a database management step or a data retention step). Specifically, when the customer information is extracted at step S503, if the customer information table for the same customer as the extracted customer information exists, the customer information table is updated; if the customer information table for the same customer as the extracted customer information does not exist, a new customer information table is created based on the customer information. When the printer information is extracted at step S505, if the printer information table for the same network printer P as the extracted printer information exists, the printer information table is updated; if the printer information table for the same network printer P as the extracted printer information does not exist, a new printer information table is created based on the printer information. When the status information is extracted at step S507, if a new status information table is created based on the status information. Upon completion of step S510, the CPU 130 returns the process to step S506. In contrast, if the CPU 130 determines at step S509 that no extracted information exists, it returns the process to step S501 and waits for the next mail read timing.

Figure 32:
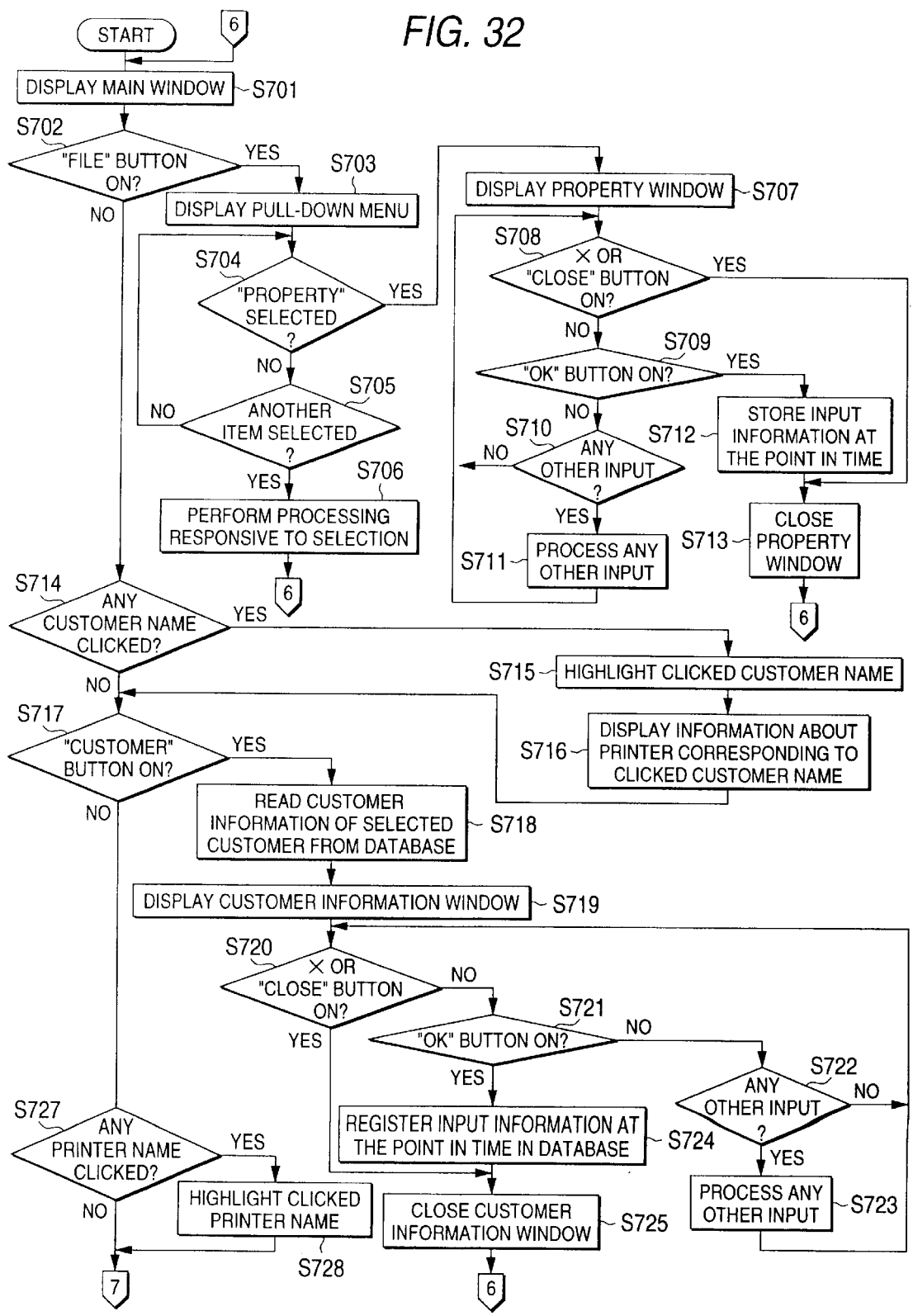
FIG. 32 is a flowchart of a screen display process forming a part of the console program.
Figure 33:
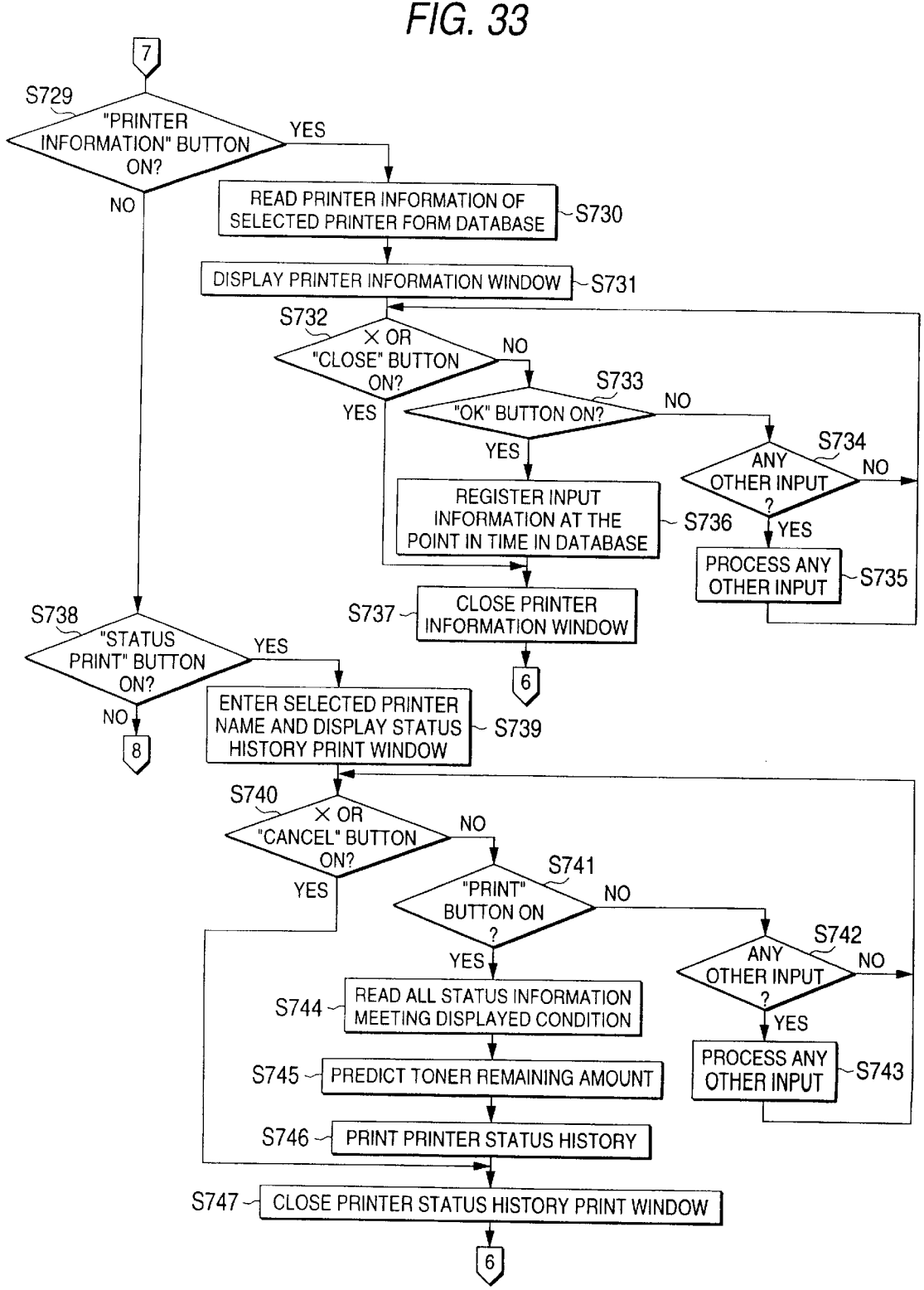
FIG. 33 is a flowchart of the screen display process forming a part of the console program.
Figure 34:
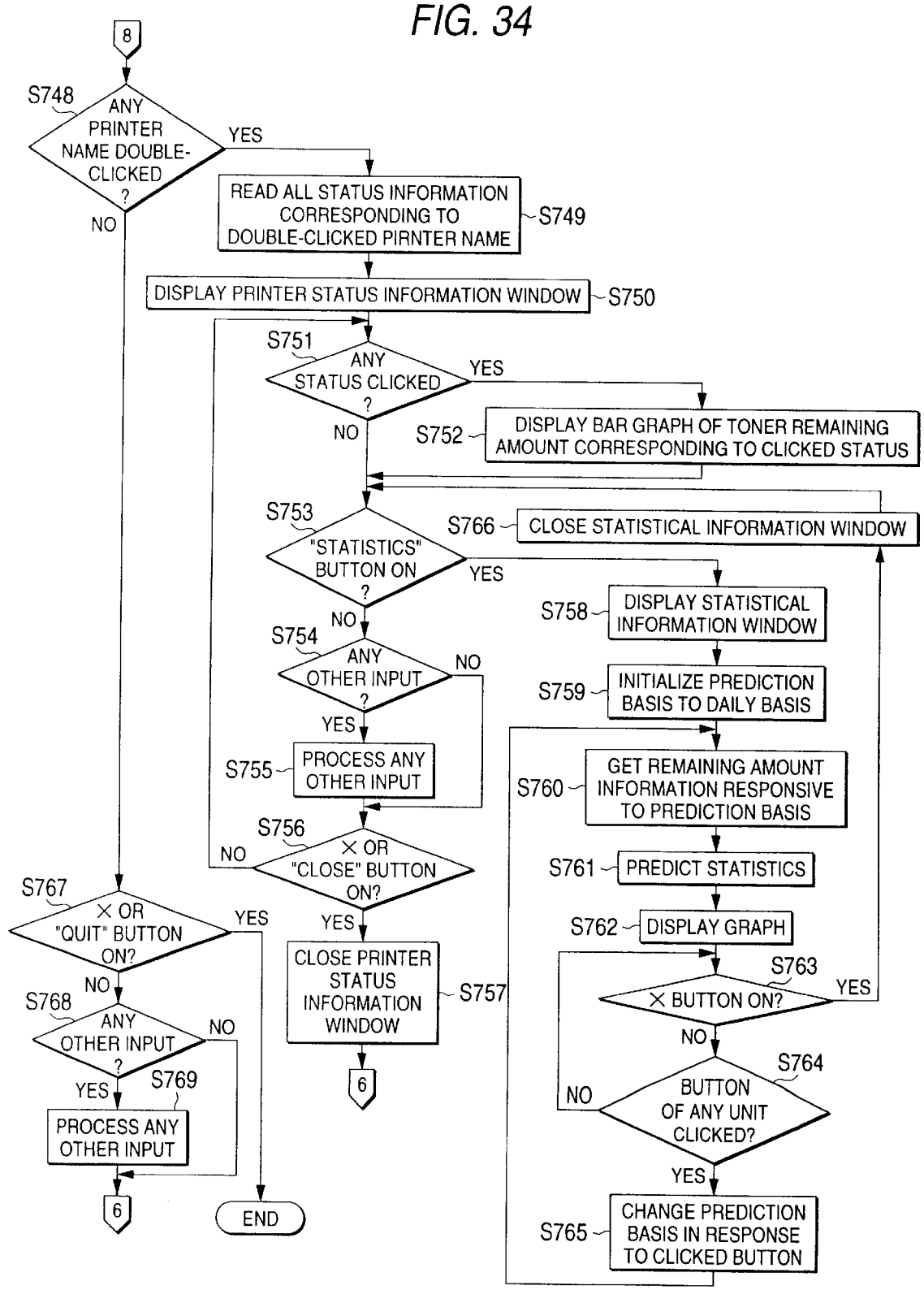
FIG. 34 is a flowchart of the screen display process forming a part of the console program.

On the other hand, when another icon displayed on the display 140 is clicked, the screen display process in FIG. 32 (as a display step and an output step) is started. At the first step S701 after the screen display process is started, the CPU 130 displays a main window (main screen) shown in FIG. 35 on the display 140 based on the information stored on the database (as a main screen display step). A list viewer area 50a is provided at the left of the main window. It displays the customer names as information indicating the areas 2 covered by the LANs 3 as the first-type networks. Any one of the customer names displayed in the list viewer area 50a is highlighted in a color different from colors for other customer names. If any customer name is clicked (indicated by dashed-line box in FIG. 35), only the clicked customer name is highlighted. Another list viewer area 50b is provided at the center of the main window. It lists information concerning all network printers P connected to the LAN 3 in the area 2 indicated by the highlighted customer name in the list viewer area 50a and registered as printers to be monitored. The information on each network printer P displayed in the list viewer area 50b is the name of the network printer P (printer name), the installation place, the date on which the most recent status information Ø was gotten (status getting date), and the message corresponding to the status code contained in the most recent status information Ø. The CPU 130 reads the message corresponding to the status code from the error table 28 and writes the message into the list viewer area 50b. For example, the message is "POWER SAVE MODE," "PAPER FEED ERROR," etc. The information displayed as the installation place denotes a detailed installation place of the network printer P on the customer side, such as "SECOND FLOOR OF BUILDING NO. 1" or "FOURTH FLOOR OF BUILDING NO. 1." The operator of the console unit 20 can visually grasp the detailed installation places of the network printers P by seeing the installation place column. A menu bar indicating a FILE button 50c, a SET button 40d, and a HELP button 50e is provided at the top of the main window. Further, a CUSTOMER INFORMATION button 50f, a PRINTER INFORMATION button 50g, a STATUS PRINT button 50h, and a QUIT button 50i are provided in order from top to bottom on the right of the list viewer area 50b on the main window.

At step S702, the CPU 130 checks whether the FILE button 50c is clicked. If the FILE button 50c not clicked, the CPU 130 goes to step S714 and checks whether any customer name displayed in the list viewer area 50*a* is clicked. If none of the customer names are clicked, the CPU 130 goes to step S717 and checks whether the CUSTOMER INFORMATION button 50*f* is clicked. If the CUSTOMER INFORMATION button 50*f* is not clicked, the CPU 130 goes to step S727 and checks whether any printer name is clicked. If none of the printer names are clicked, the CPU 130 goes to step S729 and checks whether the PRINTER INFORMATION button 50*g* is clicked. If the PRINTER INFORMATION button 50*g* is not clicked, the CPU 130 goes to step S738 and checks whether the STATUS PRINT button 50*h* is clicked. If the STATUS PRINT button 50*h* is not clicked, the CPU 130 goes to step S748 and checks whether any printer name is double-clicked. If none of the printer names are double-clicked, the CPU 130 goes to step S767 and checks whether an X button or a CLOSE button is clicked. If neither the X button or the CLOSE button is clicked, the CPU 130 goes to step S768 and if any other input occurs. If no input occurs, the CPU 130 returns the process to step S701.

If the FILE button 50*c* is clicked while the CPU executes the described check loop, the CPU 130 goes to step S703 and displays a pull-down menu providing items of LOG REFERENCE, PROPERTY, LOG CLEAR, QUIT, etc.

Figure 36:
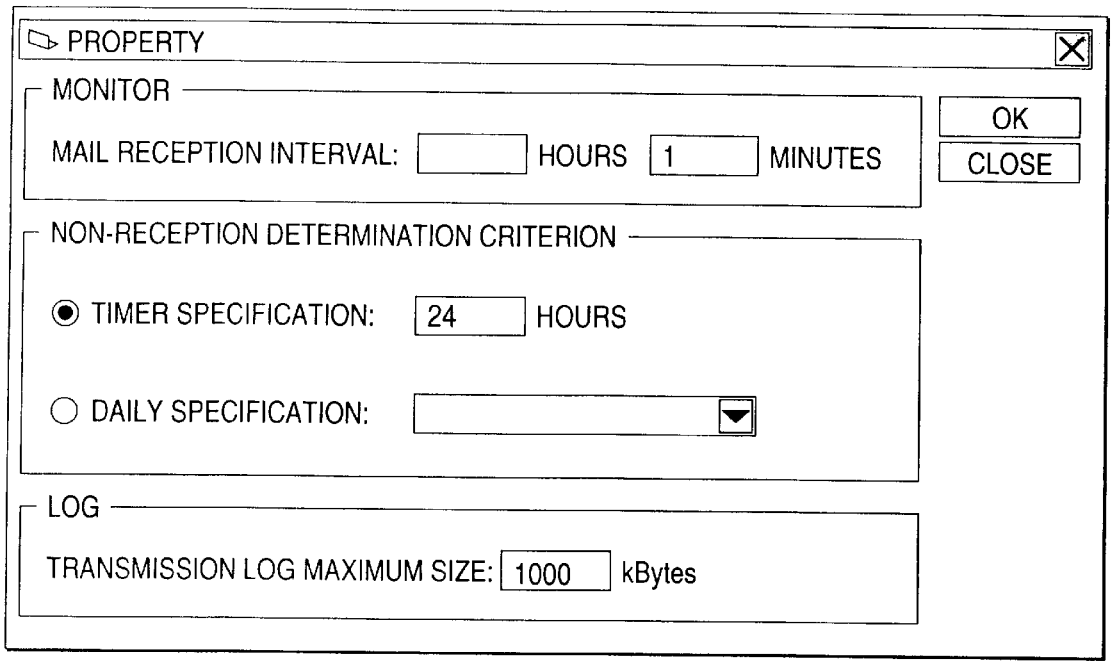
FIG. 36 depicts an illustrative property window displayed on the display.

At step S704, the CPU 130 checks whether PROPERTY is selected. If PROPERTY is selected, the CPU 130 goes to step 707 and display a property window shown in FIG. 36. This property window is a window for setting the timing interval at step S501 in FIG. 30, the reference time for determining whether mail is received, and the like.

At step S708, the CPU 130 checks whether an X button or a CLOSE button is clicked. If neither the X button nor the CLOSE button is clicked, the CPU 130 goes to step S709 and checks whether an OK button is clicked. If the OK button is not clicked, the CPU 130 goes to step S710 and checks whether any other information is entered. If any other information is not entered, the CPU 130 returns the process to step S708.

If any other information is entered while the CPU 130 executes the check loop of steps S708–S710, the CPU 130 goes to step S711 and executes processing responsive to the entered information. For example, if digits are entered through the keyboard 141 after the MAIL RECEPTION INTERVAL field is clicked, the entered digits are written into the field. Upon completion of step S711, the CPU 130 returns the process to step S708.

If the X button or the CLOSE button is input, the CPU 130 advances the process to step S713 from step S708. In contrast, if the OK button is clicked, the CPU 130 advances the process to step S712 from step S709 and stores the information entered in the fields at the point in time, then advances the process to step S713 at which the CPU 130 closes the property window and returns the process to step S701.

In contrast, if the CPU 130 judges at step S704 that PROPERTY is not selected, it goes to step S705 and checks whether another item is selected. If no items are selected, the CPU 130 returns the process to step S704. If any item is selected, the CPU 130 goes to step S706 and executes processing corresponding to the selected item, then returns the process to step S701.

On the other hand, if any customer name displayed in the list viewer area 50*a* of the main window is clicked while the CPU 130 executes the check loop of steps S702, S714, S717, S727, S729, S738, S748, S767, and S768, the CPU 130 goes to step S715, restores the color of the highlighted customer name to the former color, and highlights the clicked customer name in a color different from colors for other customer names. At step S716, the CPU 130 reads all printer information tables containing the customer code corresponding to the clicked customer name and the most recent status information tables related to the printer information tables from the database 23. It changes the information displayed in the list viewer area 50*b* to the information concerning all network printers P connected to the LAN 3 in the area 2 indicated by the highlighted customer name in the list viewer area 50*a* and registered as printers to be monitored based on the information described in the read tables. After completion of step S716, the CPU 130 advances the process to step S717.

On the other hand, if the CUSTOMER INFORMATION button 50*f* of the main window is clicked while the CPU 130 executes the check loop of steps S702, S714, S717, S727, S729, S738, S748, S767, and S768, the CPU 130 advances the process to step S718 from step S717. At step S718, the CPU 130 reads the customer information table containing the customer code corresponding to the highlighted customer name in the list viewer area 50*a* from the database 23.

At step S719, the CPU 130 displays a customer information window shown in FIG. 37 on the display 140. The customer information window is provided with fields for describing the customer name, address, telephone number, FAX number, administrator, mail address, etc. At the point in time, the CPU 130 writes the information described in the customer information table read at step S718 into the fields.

At step S720, the CPU 130 checks whether an X button or a CLOSE button is clicked. If neither the X button nor the CLOSE button is clicked, the CPU 130 goes to step S721 and checks whether an OK button is clicked. If the OK button is not clicked, the CPU 130 goes to step S722 and checks whether any other information is entered. If any other information is not entered, the CPU 130 returns the process to step S720.

If any other information is entered while the CPU 130 executes the check loop of steps S720, S721, and S722, the CPU 130 goes to step S723 and executes processing responsive to the entered information. For example, if some character is entered through the keyboard 141 after any field is clicked, the field is overwritten with the entered character. Upon completion of step S723, the CPU 130 returns the process to step S720.

If the X button or the CLOSE button is input, the CPU 130 advances the process to step S725 from step S720 and closes the customer information window, then returns the process to step S701.

If the OK button is clicked, the CPU 130 advances the process to step S724 from step S721 and overwrites the corresponding customer information table in the database 23 (customer information table read at step S718) with the information entered in the fields at the point in time. At step S725, the CPU 130 closes the customer information window, then returns the process to step S701.

On the other hand, if any printer name described in the list viewer area 50*b* of the main window is clicked while the CPU 130 executes the check loop of steps S702, S714, S717, S727, S729, S738, S748, S767, and S768, the CPU 130 advances the process to step S728 from step S727. At step S728, the CPU 130 restores the color of the highlighted printer name to the former color and highlights the clicked printer name in a color different from colors for other printer names. After completion of step S728, the CPU 130 advances the process to step S729.

On the other hand, if the PRINTER INFORMATION button 50*g* of the main window is clicked while the CPU 130 executes the check loop of steps S702, S714, S717, S727, S729, S738, S748, S767, and S768, the CPU 130 advances the process to step S730 from step S729. At step S730, the CPU 130 reads the printer information table containing the customer code corresponding to the highlighted customer name in the list viewer area 50a and the highlighted printer name in the list viewer area 50b from the database 23.

Figure 38:
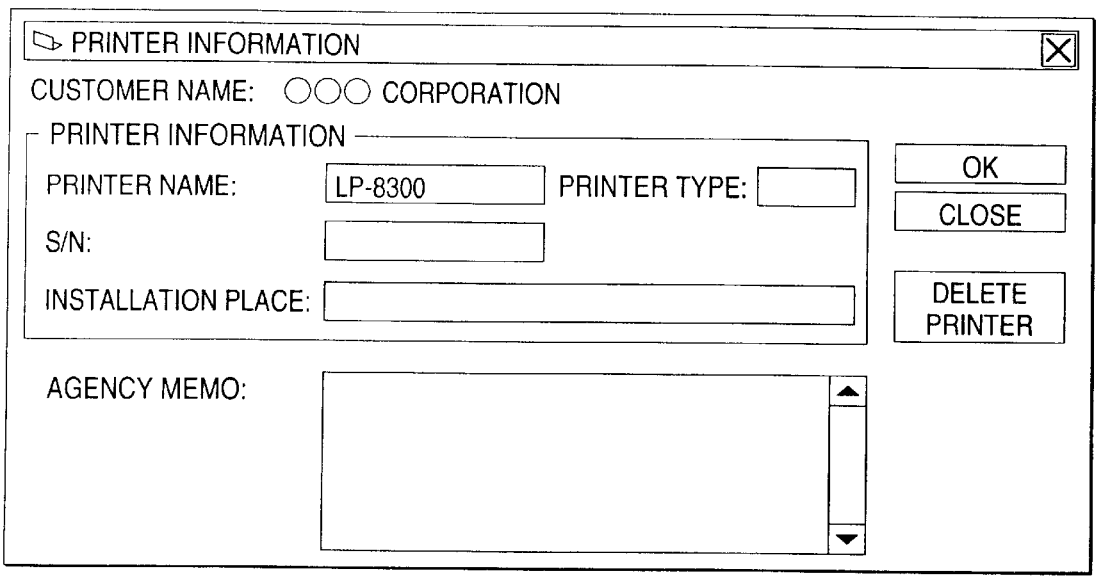
FIG. 38 depicts an illustrative printer information window displayed on the display.

At step S731, the CPU 130 displays a printer information window (subscreen) shown in FIG. 38 on the display 140 (as a subscreen display step). The printer information window is provided with fields for entering the printer name, serial number of printer, installation place, etc. At the point in time, the CPU 130 writes the information described in the printer information table read at step S730 into the fields.

At step S732, the CPU 130 checks whether an X button or a CLOSE button is clicked. If neither the X button nor the CLOSE button is clicked, the CPU 130 goes to step S733 and checks whether an OK button is clicked. If the OK button is not clicked, the CPU 130 goes to step S734 and checks whether any other information is entered. If any other information is not entered, the CPU 130 returns the process to step S732.

If any other information is entered while the CPU 130 executes the check loop of steps S732, S733, and S734, the CPU 130 goes to step S735 and executes processing responsive to the entered information. For example, if a DELETE PRINTER button is clicked, the printer information table for the network printer P displayed on the printer information screen is deleted from the database 23. Upon completion of step S735, the CPU 130 returns the process to step S732.

If the X button or the CLOSE button is input, the CPU 130 advances the process to step S737 from step S732 and closes the printer information window, then returns the process to step S701.

If the OK button is clicked, the CPU 130 advances the process to step S736 from step S733 and overwrites the corresponding printer information table in the database 23 (printer information table read at step S730) with the information entered in the fields at the point in time. At step S737, the CPU 130 closes the printer information window, then returns the process to step S701.

Figure 39:
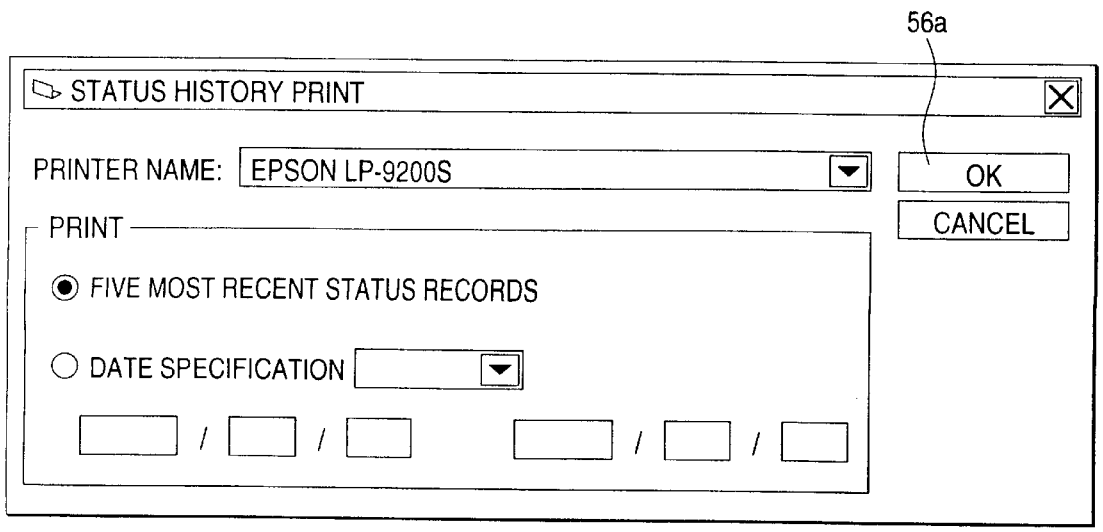
FIG. 39 depicts an illustrative status history print window displayed on the display.

On the other hand, if a STATUS PRINT button 50h of the main window is clicked while the CPU 130 executes the check loop of steps S702, S714, S717, S727, S729, S738, S748, S767, and S768, the CPU 130 advances the process to step S739 from step S738. At step S739, the CPU 130 displays a status history print window shown in FIG. 39 on the display 140. This status history print window is provided with a field for describing the printer name, a button for specifying the condition for printing the status information, namely, printing the status information in the specified getting date range or printing the five most recent status information records, a field for writing the specified getting date range, etc. At the point in time, the CPU 130 writes the highlighted printer name in the list viewer area 50b of the main window into the printer name field in the status history print window.

At step S740, the CPU 130 checks whether an X button or a CANCEL button is clicked. If neither the X button nor the CANCEL button is clicked, the CPU 130 goes to step S741 and checks whether an PRINT button 56a is clicked. If the PRINT button 56a is not clicked, the CPU 130 goes to step S742 and checks whether any other information is entered. If any other information is not entered, the CPU 130 returns the process to step S740.

If any other information is entered while the CPU 130 executes the check loop of steps S740, S741, and S742, the CPU 130 goes to step S743 and executes processing responsive to the entered information. For example, if digits are entered through the keyboard 141 with the DATE RANGE SPECIFICATION field clicked, the CPU 130 writes the entered digits into the SPECIFICATION field. Upon completion of step S743, the CPU 130 returns the process to step S740.

If the X button or the CANCEL button is input, the CPU 130 advances the process to step S747 from step S740 and closes the status history print window, then returns the process to step S701.

If the PRINT button 56a is clicked, the CPU 130 advances the process to step S744 from step S741 and reads all status information tables meeting the condition shown on the status history print window at the point in time from the database 23.

At step S745, the CPU 130 predicts the statistics of the toner remaining amount according to the above-described procedure based on the toner remaining amounts described in the status information tables read at step S744 (as a statistical processing step). It predicts the date going back predetermined days from the date on which it is predicted that the toner remaining amount will reach zero as a toner supply day and further predicts the toner remaining amount on the toner supply day according to the statistics.

At step S746, the CPU 130 prepares print data to print a printer status history based on the information described in the status information tables read at step S744 and the toner supply day and the toner remaining amount predicted at step S745 and instructs the local printer 9 to print based on the print data. Examples of status histories printed based on the print data are shown in FIGS. 40A and 40B. As shown here, the customer name, the printer name of the network printer P, and the range of the getting dates of the printed status information are printed as the status history. The toner remaining amount, the error level, and a comment corresponding to the status code contained in each status information table and the date and time at which the status information was gotten are also printed as the status history. Further, the predicted toner supply day and toner remaining amount are printed as the status history. After completion of step S746, the CPU 130 advances the process to step S747.

At step S747, the CPU 130 closes the printer status history print window and returns the process to step S701.

On the other hand, if any printer name displayed in the list viewer area 50b of the main screen is double-clicked while the CPU 130 executes the check loop of steps S702, S714, S717, S727, S729, S738, S748, S767, and S768, the CPU 130 advances the process to step S749 from step S748. At step S749, the CPU 130 reads the status information tables containing the serial number corresponding to the double-clicked printer name from the database 23.

Figure 41:
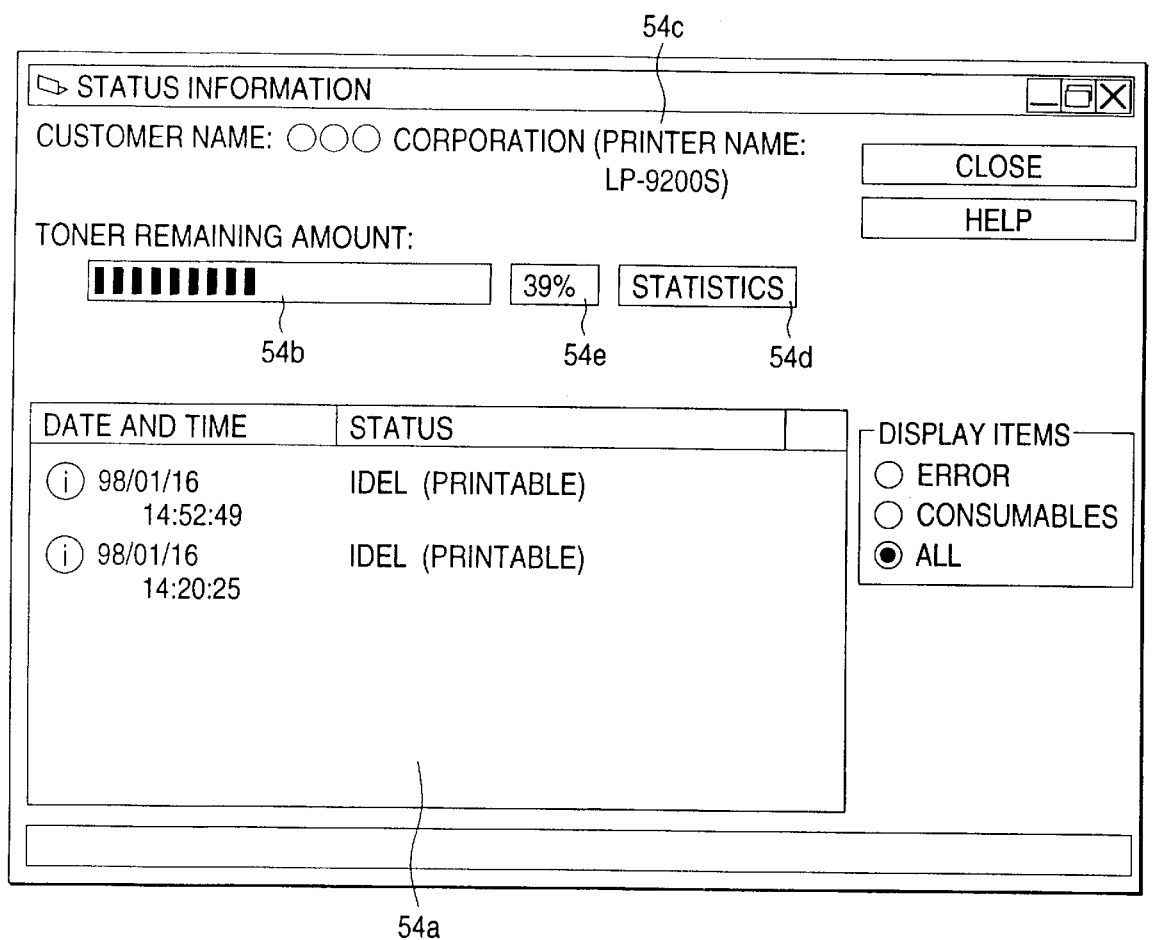
FIG. 41 depicts an illustrative status information window displayed on the display.

At step S750, the CPU 130 displays a printer status information window (subscreen) shown in FIG. 41 on the display 140 (as a subscreen display step). This printer status information window is provided with a list viewer area 54a indicating the status transition in addition to description of the customer name and printer name 54c. For each status information ø1 table read at step S749, the date and time at which the status information was gotten and a message corresponding to the status code contained in the status information are displayed in the list viewer area 54a. Further, the printer status information window is provided with a percentage display field 54e and a bar graph display field 54b indicating the toner or ink remaining amount contained in any status information a1 table. Also, it is provided with a STATISTICS button 54d in addition to an X button, a CLOSE button, and a HELP button. A history of remaining amount information of consumables of ink, etc., may be displayed in the list viewer area 54a of the printer status information window. Further, the consumable remaining amounts responsive to the type of network printer P, for example, the ink remaining amount, the photosensitive drum remaining life, etc., may be displayed in the printer status information window.

At step S751, the CPU 130 checks whether any status is clicked. If no status is clicked, the CPU 130 goes to step S753 and checks whether the STATISTICS button 54d is clicked. If the STATISTICS button 54d is not clicked, the CPU 130 goes to step S754 and checks whether any other input than clicking of the X button or the CLOSE button occurs. If any other input does not occur, the CPU 130 goes to step S756 and checks whether the X button or the CLOSE button is clicked. If neither the X button nor the CLOSE button is clicked, the CPU 130 returns the process to step S751.

If any status is clicked while the CPU 130 executes the check loop of steps S751, S753, S754, and S756, the CPU 130 goes to step S752 and checks the toner remaining amount from the status information Ø1 corresponding to the status. It displays percentage and a bar graph of the toner remaining amount on the printer status information window. After completion of step S752, the CPU 130 advances the process to step S753.

If the STATISTICS button 54d is clicked, the CPU 130 advances the process to step S758 from Step S753. At step S758, the CPU 130 displays a statistical information window shown in FIG. 42. A graph display area 55g for displaying a graph of the statistics of the consumable remaining amount predicted is provided in the center of the statistical information window. A MONTHLY button 55c, a WEEKLY button 55d, and a DAILY button 55e for setting the statistical prediction of the consumable remaining amount and graph display thereof to a monthly basis, a weekly basis, and a daily basis respectively are provided on the bottom of the statistical information window.

At step S759, the CPU 130 initializes the basis to daily prediction of the consumable remaining amount statistics.

At step S760, the CPU 130 gets the remaining amount information responsive to the setup prediction basis from the status information tables read at step S749. Specifically, if the prediction basis is set to the daily basis, the CPU 130 gets the toner or ink remaining amount from the status information tables for the past five days. However, unless the status information tables for the past five days are complete, the CPU 130 gets the toner or ink remaining amount from all the status information tables provided so far. If the prediction basis is set to the weekly basis, the CPU 130 gets the toner or ink remaining amount from the status information tables for the past five weeks. However, unless the status information tables for the past five weeks are complete, the CPU 130 gets the toner or ink remaining amount from all the status information tables provided so far. If the prediction basis is set to the monthly basis, the CPU 130 gets the toner or ink remaining amount from the status information tables for the past five months. However, unless the status information tables for the past five months are complete, the CPU 130 gets the toner or ink remaining amount from all the status information tables provided so far.

At step S761, the CPU 130 finds the future toner or ink remaining amount statistics as an above-mentioned regression line according to the above-described procedure based on the toner or ink remaining amount gotten at step S760 (as a statistical processing step).

Figure 42A:
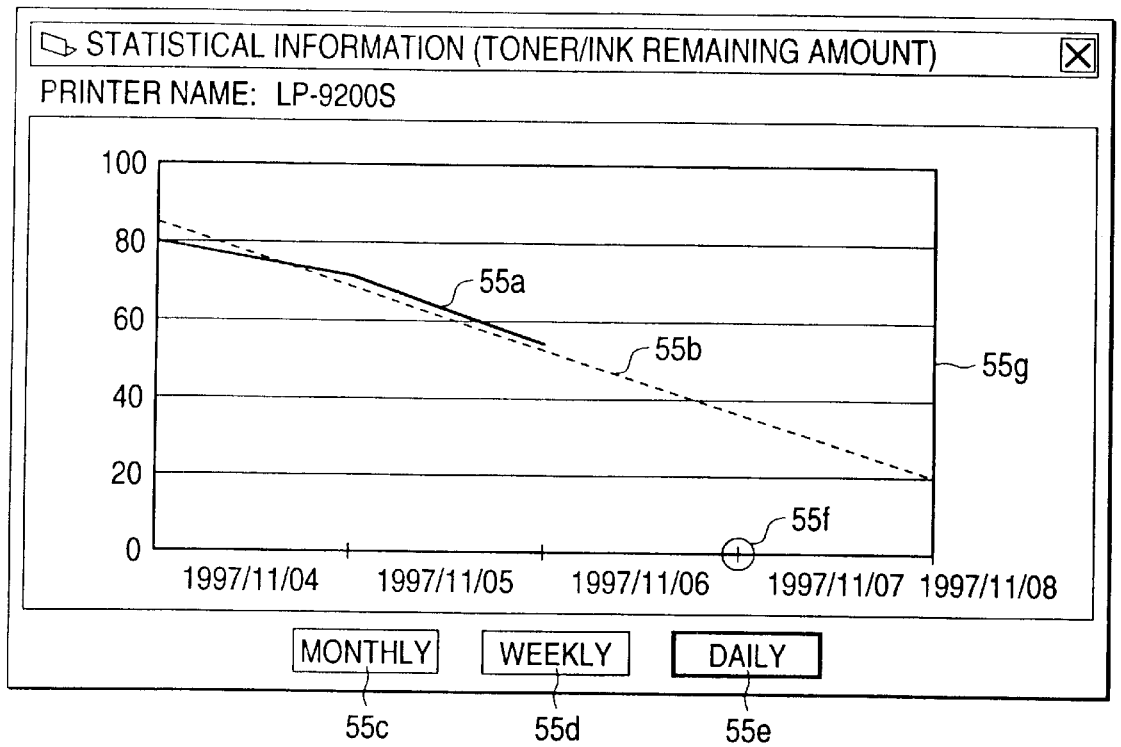
FIGS. 42A and 42B depict illustrative statistical information windows displayed on the display.
Figure 42B:
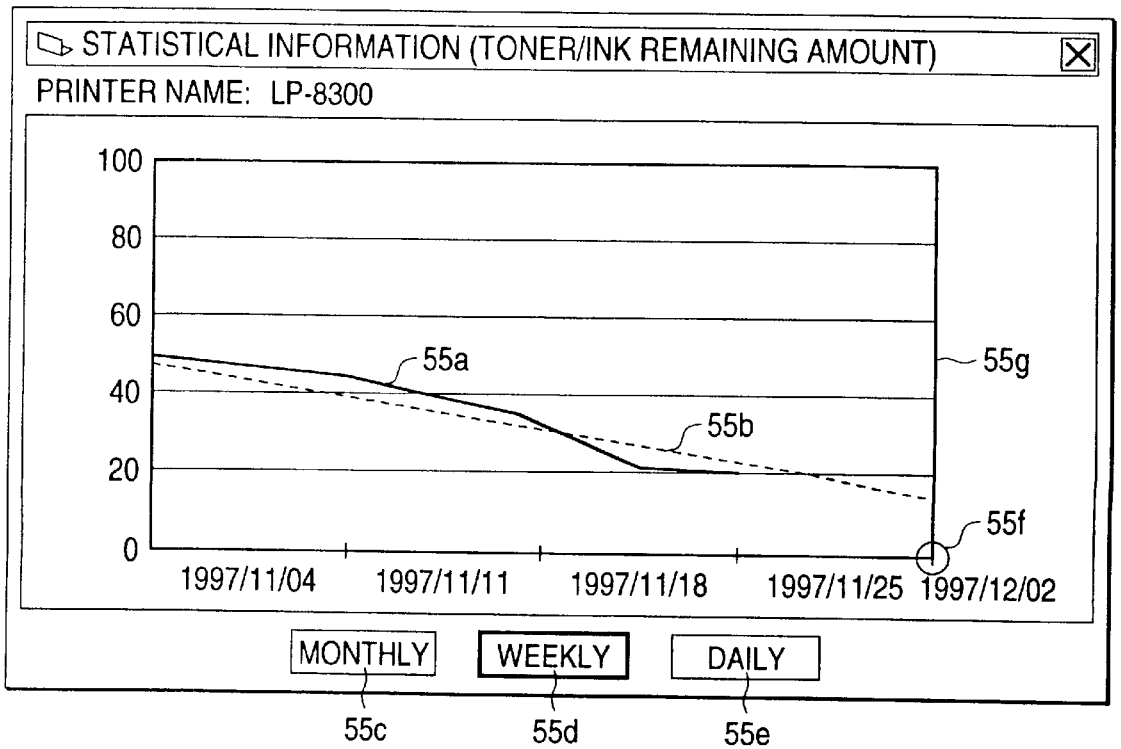

At step S762, the CPU 130 displays the regression line found at step S761 in the graph display area 55g of the statistical information window in a graph form. FIG. 42A illustrates a regression line (dashed line) 55b indicating the statistics predicted on a daily basis corresponding to the printer status history shown in FIG. 40A and a polygonal line (solid line) 55a indicating a history of the toner or ink remaining amounts gotten on a daily basis. That is, in FIG. 42A, the regression line 55b is prepared based on the history 55a to Nov. 6, 1997 and the toner or ink remaining amount statistics from Nov. 6, 1997 to Nov. 8, 1997 are predicated according to the regression line 55b. As seen from the regression line 55b, toner or ink is consumed at a rate of approximately 20% per day in the network printer (LP-9200S) displayed in the statistical information window, thus it is visually recognized that the consumable will run out almost on or about Nov. 9, 1997. FIG. 42B illustrates a regression line (dashed line) 55b indicating the statistics predicted on a weekly basis corresponding to the printer status history shown in FIG. 40B and a polygonal line (solid line) 55a indicating a history of the toner or ink remaining amounts gotten on a weekly basis. That is, in FIG. 42B, the regression line 55b is prepared based on the history 55a to Nov. 25, 1997 and the toner or ink remaining amount statistics from Nov. 25, 1997 to Dec. 2, 1997 are predicated according to the regression line 55b. As seen from the regression line 55b, toner or ink is consumed at a rate of approximately 10% per week in a network printer (LP-8300) different from the network printer (LP-9200S) shown in FIG. 42A, thus it is visually recognized that the consumable will run out on or about Dec. 9, 1997 in a week.

At step S763, the CPU 130 checks whether an X button is clicked. If the X button is not clicked, the CPU 130 goes to step S764 and checks whether any one of the MONTHLY button 55c, the WEEKLY button 55d, or the DAILY button 55e is clicked. If no buttons are clicked, the CPU 130 returns the process to step S763.

If any of the MONTHLY button 55c, the WEEKLY button 55d, or the DAILY button 55e is clicked while the CPU 130 executes the check loop of steps S763 and S764, the CPU 130 advances the process to step S765 from step S764. At step S765, the CPU 130 changes the current prediction basis in response to the clicked button 55c, 55d, or 55e. That is, if the MONTHLY button 55c is clicked, the CPU 130 sets prediction of consumable statistics on a monthly basis; if the WEEKLY button 55d is clicked, the CPU 130 sets prediction of consumable statistics on a weekly basis; if the DAILY button 55e is clicked, the CPU 130 sets prediction of consumable statistics on a daily basis. After completion of step S765, the CPU 130 returns the process to step S760 to predict the statistics on the newly setup basis.

If the X button is clicked, the CPU 130 goes to step S766 and closes the statistical information window, then returns the process to step S753.

If any other input than clicking of the X button or the CLOSE button occurs in the status information window shown in FIG. 41, the CPU 130 advances the process to step S755 from S754 and executes processing responsive to the input information. For example, if any button to select a display item is clicked, the CPU 130 changes the type of status displayed in the list viewer area 54a. After completion of step S755, the CPU 130 advances the process to step S756.

If the X button or the CLOSE button of the status information window is clicked, the CPU 130 advances the process to step S757 from S756 and closes the printer status window, then returns the process to step S701.

On the other hand, if any other input than clicking of the X button or the CLOSE button occurs in the main window while the CPU 130 executes the check loop of steps S702, S714, S717, S727, S729, S738, S748, S767, and S768, the CPU 130 goes to step S769 and performs processing responsive to the input information. For example, if the DISPLAY button 50d of the main screen 50 is clicked, the CPU 130 displays a pull-down menu containing items of ERROR LEVEL and CUSTOMER. If ERROR LEVEL is selected, the CPU 130 displays the customer names in the error level order in the list viewer area 50a. If CUSTOMER is selected, the CPU 130 displays the customer names in the name order. If the HELP button 50e of the main screen 50 is clicked, the CPU 130 displays a pull-down menu containing items of VERSION INFORMATION and TOPIC RETRIEVAL. If either item is selected, the CPU 130 displays an application version information or help retrieval window of the console unit 20. After completion of step S769, the CPU 130 returns the process to step S701.

On the other hand, if the X button or the QUIT button of the main window is clicked at step S767 while the CPU 130 executes the check loop of steps S702, S714, S717, S727, S729, S738, S748, S767, and S768, the CPU 130 terminates the screen display process.

In the machine monitor system according to the embodiment described, the status information ø1 of each network printer P is gotten by each agent unit 10 through the local computer network (LAN 3). The status information ø1 thus gotten in computer network units is sent to the console unit 20 through the Internet 6, which is a global computer network. The operator in the agency operating the console unit 20 executes centralized management of the network printers based on the status information ø1. Since the Internet 6 covers almost all the world, local distances do not introduce any problem and the console unit 20 can be installed virtually anywhere in the world. Therefore, the number of persons necessary for monitoring the network printers installed in a wide range can be reduced and service can be improved. Each network printer P need not have an ordering function of consumables of ink, etc., or a sending function of purchase orders over the public switched network; a number of the network printers P and one agent unit 10 may be connected by the LAN 3 and the computer functioning as the agent unit 10 may be provided with a communication function. Therefore, it is not necessary to change the specifications of the network printers to be monitored or add facilities, so that the machine monitor system can be constructed at comparatively low costs. Since the status information of a large number of network printers P is integrated into the database 23 in one console unit 20, a reference to the information in the database 23 can also be made from the business locations and various after-sales services can be provided. Thus, integrated maintenance and after-sales service of machines such as the network printers P can be provided smoothly and various troubles of machines can be prevented from occurring.

According to the machine monitor system of the embodiment, the agent unit 10 in each area 2 does not transmit the status information ø1 gotten from all network printers to be monitored (namely, network printers P connected to the LAN 3 and registered as printers to be monitored) to the console unit 20 separately each time the information is gotten; every given time period T2, the agent unit 10 integrates the status information accumulated and updated in the time period T2 into the electronic mail (status mail ø2) format and transmits the status information in batch (steps S109 and S110). Therefore, the communication traffic of the line connected to the agent unit 10 can be suppressed. Since the status information ø1 is sent from each network printer P to the agent unit 10 by high-speed packet transmission through the LAN 3, the processing time in each network printer P can be shortened as compared with transmitting of purchase orders directly to the agency over the public switched network and therefore print processing is not affected.

Moreover, the status mail ø2 is not directly transmitted to the console unit 20 and is once stored in the mail box 19a of the mail server 19 in accordance with the Internet protocol at step S110 and is read by the console unit 20 at steps S506 and S507 whenever necessary. Therefore, to transmit the status mail ø2 from the agent unit 10, it is not necessary to synchronize with the console unit 20 in such a manner to start the console 20 and connect thereto. Thus, the timing of transmitting the status information ø1 from the agent unit 10 at step S109 can be properly set depending only on the circumstances of the agent unit 10 (customer). The console unit 20 need not be provided with an interface, a program, or a number of lines for enabling data communication with a number of network printers P. Therefore, the console unit 20 can be realized in a simple and low-cost configuration although it can monitor a large number of network printers installed in a wide range. Further, the console unit 20 can get a large number of pieces of status mail each piece storing a number of pieces of status information ø1 (namely, an extremely large number of pieces of status information ø1) by executing one communication with the mail server 19, so that the communication costs can be reduced.

Figure 24:
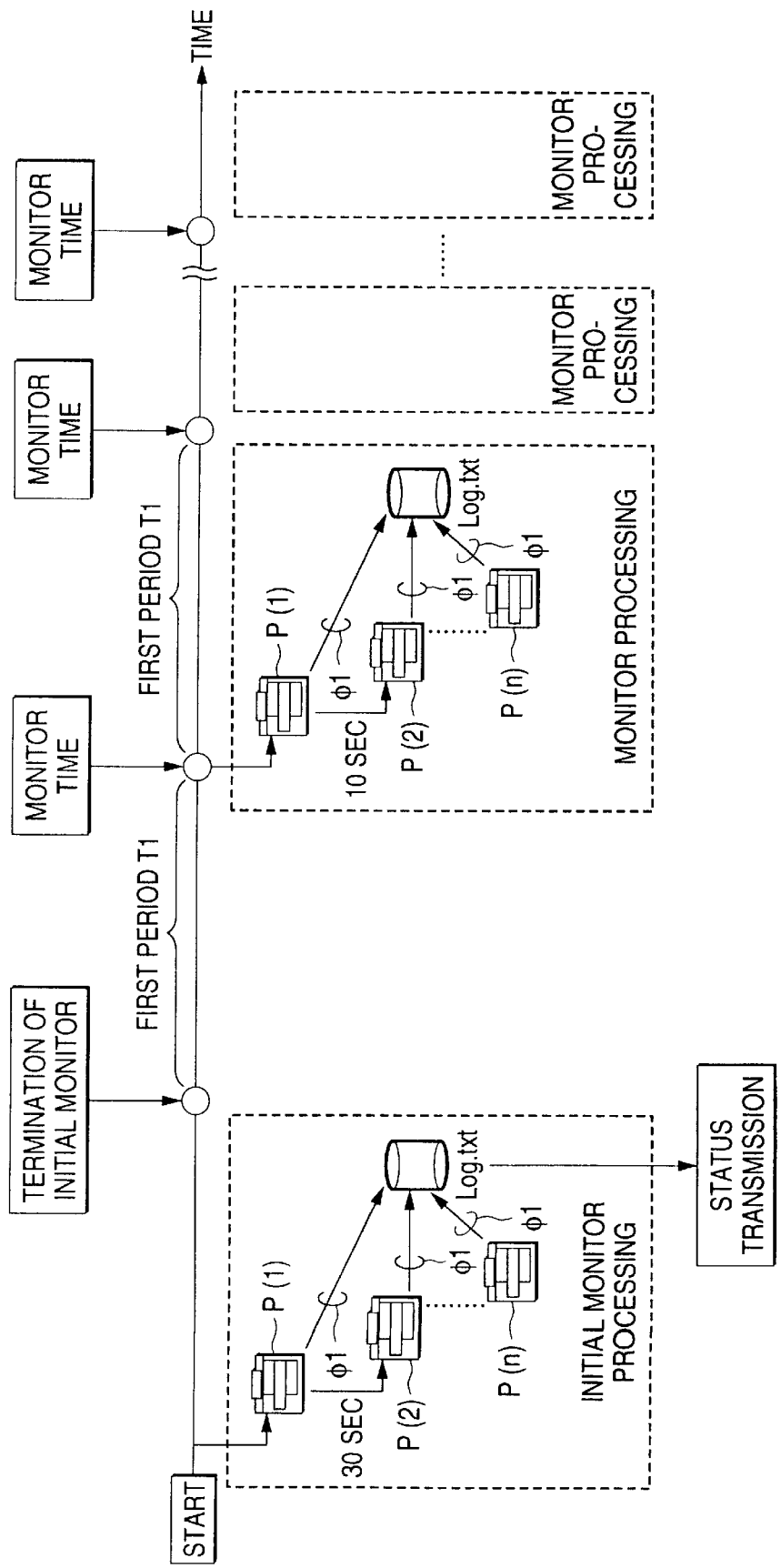
FIG. 24 is a schematic representation of timing periods for getting network printer status information.
Figure 25:
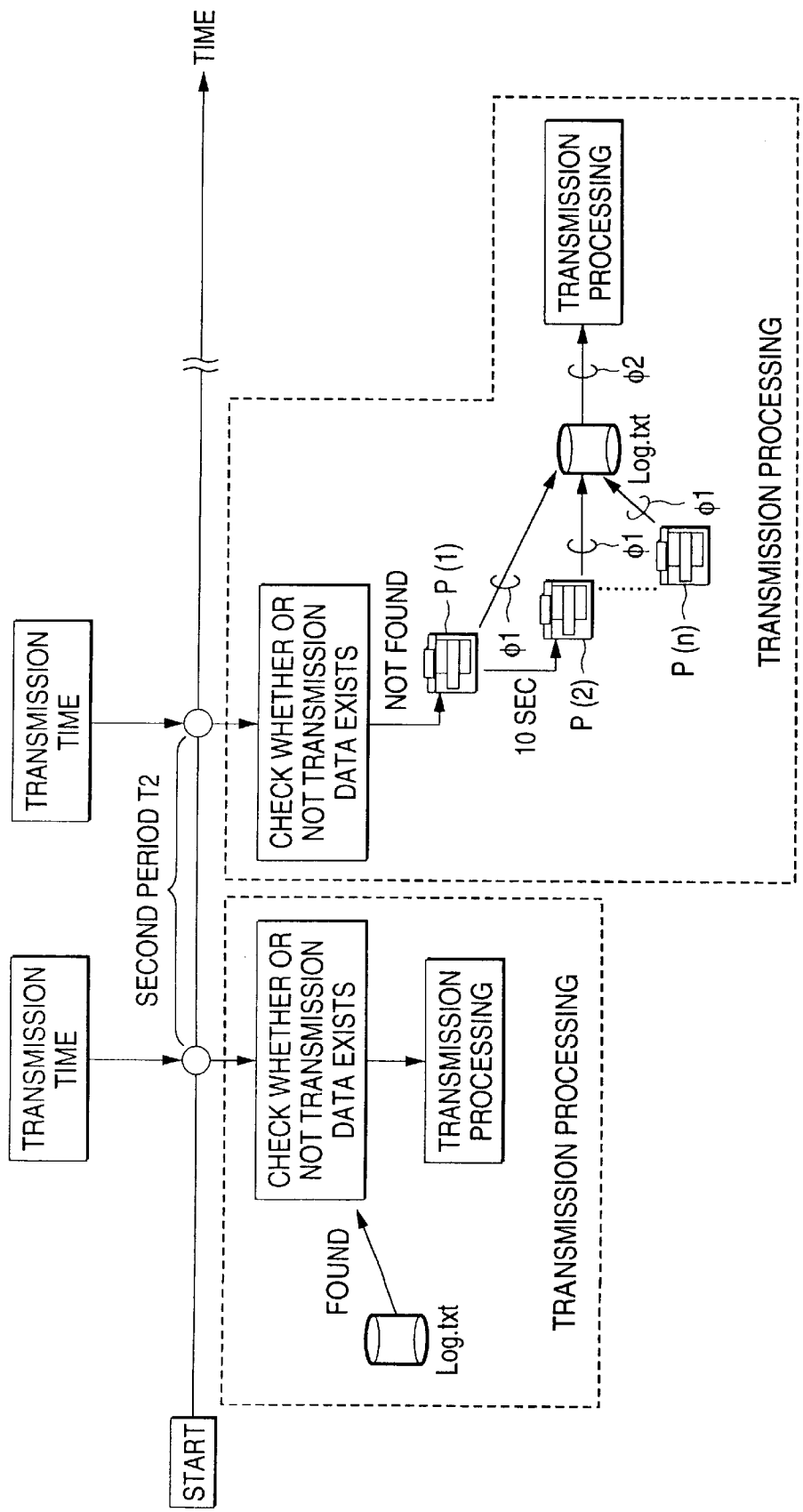
FIG. 25 is a schematic representation of timing periods for sending status mail to the Internet.

As shown in FIG. 24 and FIG. 25, at the normal time during which an error does not occur in the network printers 2, the agent unit 10 monitors each network printer P at step S103 in a first time period T1 (for example, 10 minutes) shorter than a second time period T2 (for example, two hours) actually transmitting the status mail ø2 and always updates the status information ø1 from each network printer P recorded in the status log file 12a at step S120, then sends only the most recent status information ø1 at time of transmitting the status mail ø2 to the console unit 20 via the mail server 19 at step S110. Therefore, even if the status code in the status information ø1 becomes temporarily the status code indicating WARNING or INFORMATION before the status mail ø2 is transmitted, the status code is not sent to the console unit 20 if the status is canceled when the status mail ø2 is transmitted. Then, the operator of the console unit 20 (agency) is relieved of the inconvenience of a temporary error.

However, if the status code in the status information ø1 from the network printer P indicates occurrence of a fatal error (status code>6000), immediately the agent unit 10 sends status mail ø2 indicating the fact (fatal error occurrence mail) to the console unit 20 via the mail server 19 at step S126 regardless of whether the timing is the normal status mail transmission timing. Therefore, the operator of the console unit 20 (agency) can know occurrence of a fatal error requiring that prompt steps be taken, at earlier timing than status change in the normal state.

If such a fatal error occurs, the agent unit 10 continues to monitor only the network printer P where the fatal error occurs in a time period (one minute) shorter than the normal monitor period (first time period T1) at steps S105 and S107, whereby the agent unit 10 can keep track of the status information ø1 more accurate than that in the normal state. If the fatal error is recovered from before the elapsed time since the fatal error occurrence exceeds one hour, immediately the agent unit 10 transmits status mail indicating the fact (fatal error recovery mail) to the console unit 20 via the mail server 19 at step S130. Therefore, the operator of the console unit 20 (agency) can cancel the emergency system adopted in response to the fatal error occurrence. In contrast, if the elapsed time since the fatal error occurrence exceeds one hour, immediately the agent unit 10 transmits status mail making a request for dispatching maintenance personnel (service call error mail) to the console unit 20 via the mail server 19 at steps S113 and S115. Therefore, the operator of the console unit 20 (agency) can dispatch maintenance personnel.

On the other hand, the most recent status information Ø1 of each network printer P is displayed in the list viewer area 50*b* of the main window displayed on the display 140 of the console unit 20. Therefore, the operator in the agency operating the console unit 20 can keep track of the most recent operation status of each network printer P at a glance without opening any windows under the main screen window, and can make good use of the most recent status information for monitoring and after-sales service of the network printers P. Moreover, the status information Ø1 is listed in customer units (namely, LAN 3 units) in the list viewer area 50*b* at steps S701 and S716. Thus, the operator can easily keep track of the number of the network printers P installed in the customer and moreover can easily keep track of the operation state of each network printer P. Since all customer names are displayed in the list viewer area 50*a* of the main window, the operator can easily keep track of the number of the customers to be monitored at step S701. Thus, the operator can reliably monitor the network printers P in customer units (LAN 3 units) and provide service of higher quality. That is, the operator can recognize the network printer P placed in an error state at a glance and easily determine the user (customer) of the network printer P, thus can provide service of rapidly dispatching maintenance personnel to the customer.

When the state of each network printer P is displayed in customer units (LAN units), if the number of the network printers P to be monitored increases, the state of each network printer P can be easily understood as compared with simple listing of the printers. Therefore, when a maintenance person needs to be dispatched to one network printer P, if another network printer P fails in the area 2 in which that printer is installed, the operator can easily recognize the fact. In such a case, the operator can dispatch maintenance personnel to the area 2 only once without dispatching engineers separately to the printers P for executing maintenance of the printers. Therefore, after-sales service can be provided for a number of printers in batch in area 2 units (LAN 3 units); rapid and efficient service can be provided.

After an engineer is dispatched to one network printer P, when another printer fails near the installation place of that printer, maintenance of the failing printer can be executed simply by calling the engineer from the agency in which the console unit 20 is installed or the like without dispatching another engineer; more flexible service can be developed. Further, since the printers to be monitored are displayed in area (customer) units, to ship consumables of ink, toner, etc., to one network printer P, the place to which the consumables are to be shipped is easy to determine and shipment mistakes are thereby avoided. That is, if the printers are simply listed, the printer installation place is hard to determine and if one printer is mistaken for another printer, there is a possibility that consumables will be shipped to an incorrect place.

Since the status information window (subscreen) shown in FIG. 41 is displayed on the display 140 of the console unit 20, the operator can see a status history of each network printer P and check the remaining amounts of consumables of toner, ink, etc. Thus, the operator can keep track of the conditions of each network printer P in detail and easily and can also keep track of the use state of consumables of toner, etc., easily.

Moreover, with the console unit 20, the future statistics of a consumable article predicted by the statistical processing section 21 (regression line 55*b*) and a history of the remaining amounts of the consumable article (polygonal line 55*a*) are displayed as a graph on the statistical information window (FIG. 42). Thus, the operator can easily and reliably keep track of the consumable consumption tendency in each network printer P based on the inclination of the regression line 55*b* simply by seeing the statistical information window and can also easily understand the future statistics, namely, the date on which the consumable article will run out. Therefore, the operator can supply the consumables to the network printers P which differ in consumable consumption speed or order the consumables for the network printers P reliably at a proper timing. Resultantly, the consumable article to be supplied is delivered reliably to the user just before it runs out, so that the consumable article can be prevented from running out or being stocked by the user for a long time. The operator can make a reference to the future consumable statistics (regression line 55*b*) in the network printers P for grasping the whole consumable consumption tendencies, thus good use of the statistical information can be made for determining the inventories in a service center, etc., and also for setting up a yearly plan of manufacturing, sales, etc., of consumables from the consumption amounts of the consumables.

The date on which a consumable article will run out may be automatically calculated from the consumption rate of the consumable article (inclination of the regression line 55*b*) and further the shipment date of the consumable article may be automatically calculated considering the number of delivery days, of course. A mark 55*f* may be displayed on the calculated shipment date, as shown in FIGS. 42A and 42B.

The console unit 20 predicts the consumable statistics on a monthly, weekly, or daily basis by the statistical processing section 21 and thus can predict the statistics matching the consumable consumption speed of each network printer P. That is, the statistics in a comparatively short term on a weekly or daily basis can be predicted for the network printers P consuming consumables at high speed; the statistics in a comparatively long term on a monthly basis can be predicted for the network printers P consuming consumables at low speed.

In the description, network printers are taken as an example of peripheral machines connected to the first-type computer network (LAN) 3*a*, but other computer system peripheral machines such as scanners may be adopted. Further, the monitor system can be applied to factory automation machines such as numerical control machines connected over a network or other various machines such as user terminals of personal computers, etc., for monitoring the operation state thereof. The screens displayed on the display 40 of the agent unit 10 and the display 140 of the console unit 20 are illustrations and the scope of the invention is not limited to the illustrative screens, needless to say.

According to the first to twenty-third embodiments, thirty-third to fifty-first embodiments, and sixty-first to sixty-seventh embodiments of the invention, the needs for providing a communication system for each machine to be monitored and a totalizer of a special hardware configuration are eliminated.

Resultantly, the configuration enabling the machines to be reliably monitored regardless of the number of the monitored machines can be provided at low costs.

According to the twenty-fourth to twenty-sixth embodiments, fifty-second to fifty-fourth embodiments, and sixty-eighth embodiments of the invention, it is made possible to precisely keep track of the state of each of the machines to be monitored and efficiently dispatch maintenance personnel in user units if the machines to be monitored increase.

According to the twenty-seventh to thirty-second embodiments, fifty-fifth to sixtieth embodiments, and sixty-ninth embodiments of the invention, it is made possible to execute a shipment procedure, etc., of a consumable article at an appropriate timing for each machine to be monitored and efficiently manage the inventory of consumables in the store operating the integrated monitor unit.

What is claimed is:

1. A local monitor unit for transmitting status information formed of a plurality of pieces of information indicating an operation state of a machine to be monitored to an integrated monitor unit through a computer network, said local monitor unit comprising:

local information getting means for getting the status information from the machine through a first-type computer network;

local information retention means for retaining the status information gotten by said local information getting means; and local information transmission means for transmitting at least a part of the plurality of pieces of the status information retained in said local information retention means to the integrated monitor unit through a second-type computer network connecting the first-type computer network to the integrated monitor unit.

2. The local monitor unit of claim 1, wherein the first-type computer network is a local area network and the second-type computer network is the Internet.

3. The local monitor unit of claim 1, wherein said local information transmission means comprises:

electronic mail preparation means for converting the status information into a format of electronic mail to which an address of the integrated monitor unit is added; and electronic mail sending means for sending electronic mail prepared by the electronic mail preparation means to a mail server of the second-type computer network.

4. The local monitor unit of claim 3, wherein said local information getting means gets status information for a plurality of machines, and wherein the electronic mail preparation means of said local information transmission means converts the status information gotten from the plurality of machines into one piece of electronic mail.

5. The local monitor unit of claim 1, wherein said local information getting means gets the status information in a first time period, and wherein said local information transmission means transmits the most recent status information of the machine to the integrated monitor unit in a second time period, the second time period being longer than the first time period.

6. The local monitor unit of claim 5, further comprising state determination means for determining whether the status information gotten by said local information getting means indicates an abnormal state of the machine, and wherein said local information getting means gets the status information in a time period shorter than the first time period only while said state determination means determines that the status information indicates an abnormal state of the machine.

7. The local monitor unit of claim 6, wherein said local information getting means gets the status information of a plurality of machines and, while said state determination means determines that the status information gotten from a specific machine indicates an abnormal state of the specific machine, gets the status information only from the specific machine in a time period shorter than the first time period.

8. The local monitor unit of claim 5, further comprising state determination means for determining whether the status information gotten by said local information getting means indicates an abnormal state of the machine, and wherein when said state determination means starts to determine that the status information indicates an abnormal state of the machine, said local information transmission means transmits the status information to the integrated monitor unit prior to completion of the second time period.

9. The local monitor unit of claim 8, wherein when said state determination means determines that the status information indicates an abnormal state of the machine over a predetermined time, said local information transmission means transmits status information indicating the fact to the integrated monitor unit prior to completion of the second time period.

10. The local monitor unit of claim 1, further comprising display means for displaying a main screen for indicating information concerning every machine connected through the first-type computer network and a subscreen for indicating detailed information concerning a specific machine specified on the main screen.

11. The local monitor unit of claim 1, wherein the machine is a computer system peripheral machine.

12. The local monitor unit of claim 1, wherein the machine is a network printer.

13. A local monitor unit for transmitting status information indicating an operation state of a machine to be monitored to an integrated monitor unit through a computer network, said local monitor unit comprising:

local information getting means for getting the status information from the machine;

electronic mail preparation means for converting the status information gotten by said local information getting means into a format of electronic mail to which an address of the integrated monitor unit is added; and local information transmission means for sending electronic mail prepared by said electronic mail preparation means to a mail server of the computer network.

14. An integrated monitor unit for receiving status information indicating an operation state of each of a plurality of machines to be monitored, connected to a first-type computer network through a second-type computer network connected to the first-type computer network, said integrated monitor unit comprising:

global information getting means for getting the status information from the plurality of machines;

a database for storing information concerning the plurality of machines;

database management means for updating said database based on the status information gotten by said global information getting means; and display means for displaying the information stored on said database.

15. The integrated monitor unit of claim 14, wherein the first-type computer network is a local area network and the second-type computer network is the Internet.

16. The integrated monitor unit of claim 15, wherein said global information getting means comprises:

electronic mail reception means for receiving electronic mail containing status information from a mail server of the second-type computer network; and extraction means for extracting the status information from the electronic mail received by said electronic mail reception means.

17. The integrated monitor unit of claim 14, wherein said database also stores past status information of the plurality of machines previously gotten by said global information getting means, and wherein said display means displays a main screen for indicating the status information of the plurality of machines connected through the first-type computer network and a subscreen for indicating a history of the status information of a specific machine specified on the main screen.

18. The integrated monitor unit of claim 17, wherein the main screen indicates the most recent status information of each machine.

19. The integrated monitor unit of claim 17, wherein the main screen indicates the status information of machines grouped for each first-type computer network.

20. The integrated monitor unit of claim 17, wherein the status information contains information indicating the remaining amount of a consumable article and wherein the subscreen for indicating a history of the status information of a specific machine displays a history of the remaining amounts of the consumable article of the machine.

21. The integrated monitor unit of claim 14, wherein the machine is a computer system peripheral machine.

22. The integrated monitor unit of claim 14, wherein the machine is a network printer.

23. An integrated monitor unit for receiving status information indicating an operation state of each of a plurality of machines to be monitored through a computer network, said integrated monitor unit comprising:

electronic mail reception means for receiving electronic mail containing the status information from a mail server of the computer network;

extraction means for extracting the status information from the electronic mail received by said electronic mail reception means;

a database for storing information concerning the plurality of machines;

database management means for updating said database based on the status information extracted by said extraction means; and display means for displaying the information stored on said database.

24. An integrated monitor unit for receiving status information indicating an operation state of each of a plurality of machines to be monitored through a computer network, said integrated monitor unit comprising:

global information getting means for getting the status information from the plurality of machines; and display means for displaying, in installation area units of the plurality of machines, the status information gotten by said global information getting means.

25. The integrated monitor unit of claim 24, wherein the machines are connected to first-type computer networks, the first-type computer networks connected to each other through a second-type computer network, and wherein said display means displays the status information of the plurality of machines in each first-type computer network to which the plurality of machines are connected.

26. The integrated monitor unit of claim 24, wherein said display means displays the most recent status information of each of the plurality of machines.

27. An integrated monitor unit for receiving status information containing remaining amount information of a consumable article of each of a plurality of machines to be monitored through a computer network, said integrated monitor unit comprising:

global information getting means for periodically getting the status information from the plurality of machines;

a database for storing information concerning the plurality of machines;

database management means for storing the status information gotten by said global information getting means on said database;

statistical processing means for predicting statistics of the remaining amount of the consumable article based on a plurality of pieces of the status information of each machine stored on said database; and output means for outputting the remaining amount statistics of the consumable article predicted by said statistical processing means.

28. The integrated monitor unit of claim 27, wherein the plurality of machines are printers and the consumable article is ink, toner, or an ink ribbon.

29. The integrated monitor unit of claim 27, wherein said statistical processing means predicts the remaining amount statistics of the consumable article for a predetermined time period selected from a group of time periods consisting of monthly, weekly, and daily.

30. The integrated monitor unit of claim 27, wherein said database stores the status information of the plurality of machines gotten by said global information getting means, and wherein said output means displays a main screen for indicating the status information of the plurality of machines and a subscreen for indicating the remaining amount statistics of the consumable article of a specific machine specified on the main screen.

31. The integrated monitor unit of claim 27, wherein said output means outputs the remaining amount statistics of the consumable article of the machine in a graph format.

32. The integrated monitor unit of claim 27, wherein said output means outputs a history of the remaining amounts of the consumable article of the machine and the remaining amount statistics of the consumable article of the machine predicted by said statistical processing means in a graph format.

33. A machine monitor system for centrally monitoring status information, said status information indicating an operation state of each of a plurality of machines to be monitored, said machine monitor system comprising:

local monitor unit being connected to the plurality of machines to be monitored through a first-type computer network for sending status information of the plurality of machines to be monitored to a second-type computer network; and an integrated monitor unit for receiving the status information sent by said local monitor unit to the second-type computer network.

34. The machine monitor system of claim 33, wherein the status information includes a plurality of pieces of information and said local monitor unit comprises:

local information getting means for getting the status information from the plurality of machines through the first-type computer network;

local information retention means for retaining the status information gotten by said local information getting means; and local information transmission means for transmitting at least a part of a plurality of pieces of the status information retained in said local information retention means to said integrated monitor unit through the second-type computer network, and wherein said integrated monitor unit comprises:

global information getting means for receiving the status information through the second-type computer network;

a database for storing information concerning the plurality of machines;

database management means for updating said database based on the status information gotten by said global information getting means; and display means for displaying the information stored on said database.

35. The machine monitor system of claim 34, wherein the first-tpe computer network is a local area network and the second-type computer network is the Internet.

36. The machine monitor system of claim 35, wherein said local information transmission means of said local monitor unit comprises:

electronic mail preparation means for converting the status information into a format of electronic mail to which an address of said integrated monitor unit is added; and electronic mail sending means for sending electronic mail prepared by the electronic mail preparation means to a mail server of the second-type computer network, and wherein said global information getting means of said integrated monitor unit comprises:

electronic mail reception means for receiving electronic mail containing the status information from a mail server of the second-type computer network; and extraction means for extracting the status information from the electronic mail received by said electronic mail reception means.

37. The machine monitor system of claim 34, wherein said local information getting means of said local monitor unit gets the status information in a first time period, and wherein said local information transmission means of said local monitor unit transmits the most recent status information of each machine to said integrated monitor unit in a second time period, said second time period being longer than the first time period.

38. A machine monitor system for centrally monitoring status information, the status information indicating an operation state of each of a plurality of machines to be monitored, said machine monitor system comprising:

a local monitor unit being connected to the machines to be monitored through a first-type network for converting status information of the plurality of machines to be monitored into a format of electronic mail and sending the electronic mail to a second-type network; and an integrated monitor unit for receiving the electronic mail sent by said local monitor unit to the second-type network and extracting the status information from the electronic mail.

39. The machine monitor system of claim 38, wherein said local monitor unit comprises:

local information getting means for getting the status information from the plurality of machines;

electronic mail preparation means for converting the status information gotten by said local information getting means into a format of electronic mail to which an address of said integrated monitor unit is added; and local information transmission means for sending electronic mail prepared by said electronic mail preparation means to a mail server of the second-type computer network, and wherein said integrated monitor unit comprises:

electronic mail reception means for receiving electronic mail storing the status information from the mail server of the second-type computer network;

extraction means for extracting the status information from the electronic mail received by said electronic mail reception means;

a database for storing information concerning the plurality of machines;

database management means for updating said database based on the status information extracted by said extraction means; and display means for displaying the information stored on said database.

40. A method for monitoring a machine comprising:

a local monitor step of getting status information indicating an operation state of each of a plurality of machines to be monitored, a group of said plurality of machines being connected to one of a plurality of first-type computer networks and sending the status information to a second-type computer network connected to the first-type computer network; and a global monitor step of getting the status information through the second-type computer network;

wherein said local monitor step comprises:

a local information getting step of getting the status information of the plurality of machines;

a local information retention step of retaining the gotten status information; and a local information transmission step of sending the retained status information to the second-type computer network; and wherein said global monitor step comprises:

a global information getting step of getting the status information through the second-type computer network;

a step of providing a machine database for storing information concerning the plurality of machines to be monitored;

a database management step of updating said machine database based on the status information;

a step of providing a display; and a display step of displaying the information stored on said machine database on said display.

41. The method of claim 40, wherein the first-type computer network is a local area network and the second-type computer network is the Internet.

42. The method of claim 41, wherein said local information transmission step includes converting the status information of the machine into a format of electronic mail and sending the electronic mail to the second-type computer network, and wherein said global information getting step includes extracting the status information from the electronic mail received through the second-type computer network.

43. The method of claim 40, wherein said local information getting step includes getting the status information in a first time period, and wherein said local information transmission step includes sending the status information in a second time period different from the first time period.

44. The method of claim 43, wherein said local information getting step includes getting the status information in a time period shorter than the first time period only while the status information indicates an abnormal state of the machine.

45. The method of claim 44, wherein when the status information starts to indicate an abnormal state of the machine, said local information transmission step includes transmitting the status information to the second-type computer network before completion of the second time period.

46. The method of claim 40, wherein said display step comprises a main screen display step of displaying a main screen for listing the machines stored on said database on said display and a subscreen display step of displaying a subscreen for indicating information concerning a specific machine specified on the main screen on said display.

47. The method of claim 40, wherein said display step comprises a main screen display step of displaying a main screen for listing the machines stored on said database on said display and a subscreen display step of displaying a subscreen for indicating a history of the status information of a specific machine specified on the main screen on said display.

48. The method of claim 47, wherein the main screen displays the most recent status information of the machine.

49. The method of claim 47, wherein the main screen indicates the status information of machines grouped for each of the plurality of first-type computer networks.

50. The method of claim 47, wherein the status information contains information indicating the remaining amount of a consumable article and further comprising the step of indicating a history of the status information of a specific machine by displaying a subscreen of a history of the remaining amounts of the consumable article of the machine.

51. A method for monitoring a machine comprising:
   a local monitor step of getting status information indicating an operation state of each of a plurality of machines to be monitored and sending the status information to a computer network; and
   a global monitor step of getting the status information through the computer network;
   wherein said local monitor step comprises:
      a local information getting step of getting the status information of the plurality of machines;
      an electronic mail preparation step of converting the gotten status information into a format of electronic mail; and
      a local information sending step of sending prepared electronic mail to the computer network; and
   wherein said global monitor step comprises:
      an electronic mail reception step of receiving the electronic mail through the computer network;
      an extraction step of extracting the status information from the received electronic mail;
      a step of providing a machine database for storing information concerning the plurality of machines to be monitored;
      a database management step of updating said machine database based on the status information;
      a step of providing a display; and
      a display step of displaying the information stored on said machine database on said display.

52. A method for monitoring a machine comprising:
   a data getting step of getting status information indicating an operation state of each of a plurality of machines to be monitored, the plurality of machines being connected to a computer network and the information being gotten through the computer network;
   a step of providing a display; and
   a display step of displaying on said display, in installation area units of the machines, the status information of the plurality of machines.

53. The method of claim 52, wherein the plurality of machines are connected to first-type computer networks connected to each other through a second-type computer network, and wherein said display step includes displaying the status information of the plurality of machines in first-type computer network units to which the plurality of machines are connected.

54. The method of claim 53, wherein said display step includes displaying the most recent status information of each of said plurality of machines.

55. A method for monitoring a machine comprising:
   a data getting step of periodically getting status information containing remaining amount information of a consumable article of each of a plurality of machines to be monitored, the plurality of machines being connected to a computer network;
   a data retention step of retaining the gotten status information;
   a statistical processing step of predicting statistics of the remaining amount of the consumable article based on a plurality of pieces of the retained status information of each of said plurality of machines; and
   an output step of outputting the predicted remaining amount statistics of the consumable article.

56. The method of claim 55, wherein the plurality of machines are printers and the consumable article is ink, toner, or an ink ribbon.

57. The method of claim 55, wherein said statistical processing step includes predicting the remaining amount statistics of the consumable article for a predetermined time period selected from a group of time periods consisting of monthly, weekly, and daily.

58. The method of claim 55, wherein the gotten status information of the machines is stored, and wherein said output step comprises a main screen display step of displaying a main screen for indicating the status information of the plurality of machines and a subscreen display step of displaying a subscreen for indicating the remaining amount statistics of the consumable article of a specific machine specified on the main screen.

59. The method of claim 55, wherein said output step includes outputting the remaining amount statistics of the consumable article of the machine in a graph format.

60. The method of claim 55, wherein said output step includes outputting a history of the remaining amounts of the consumable article of the machine and the predicted remaining amount statistics of the consumable article of the machine in a graph format.

61. A computer-readable medium storing thereon a program for causing a computer connected to a plurality of machines to be monitored through a first-type computer network to execute:
   a local information getting step of getting status information indicating an operation state of each of the plurality of machines to be monitored;
   a local information retention step of retaining the status information; and
   a local information transmission step of sending the status information to a second-type computer network.

62. The computer-readable medium of claim 61, wherein said program causes said computer to convert the status information into a format of electronic mail and send the electronic mail to the second-type computer network at said local information transmission step.

63. The computer-readable medium of claim 61, wherein said program causes said computer to output image data of a main screen for indicating information concerning all of the plurality of machines to be monitored which are connected through the first-type computer network and image data of a subscreen for indicating detailed status information of a specific machine specified on the main screen.

64. A computer-readable medium storing a program for causing a computer connected to a machine to be monitored to execute:
- a local information getting step of getting status information indicating an operation state of the machine to be monitored;
- an electronic mail preparation step of converting the gotten status information into a format of electronic mail; and
- a local information transmission step of sending the prepared electronic mail to a computer network.

65. A computer-readable medium storing a program for causing a computer connected to a plurality of machines to be monitored through a computer network to execute:
- a global information getting step of getting status information indicating an operation state of each of the plurality of machines to be monitored through the computer network;
- a database management step of updating a machine database storing monitor information of the plurality of machines based on the status information; and
- a display step of displaying on a display, in installation area units of the plurality of machines, the information stored on the machine database.

66. The computer readable medium of claim 65, wherein said program causes said computer to extract the status information from the electronic mail received through the computer network at said global information getting step.

67. A computer-readable medium storing a program for causing a computer connected to a plurality of machines to be monitored through a computer network to execute:
- an electronic mail reception step of receiving electronic mail storing status information indicating an operation state of each of the plurality of machines to be monitored through the computer network;
- an extraction step of extracting the status information from the received electronic mail;
- a database management step of updating a machine database containing information concerning the plurality of machines to be monitored based on the status information; and
- a display step of displaying the information stored on the machine database on a display.

68. A computer-readable medium storing a program for causing a computer connected to a plurality of machines to be monitored through a computer network to execute:
- a global information getting step of getting status information indicating an operation state of each of the plurality of machines to be monitored through the computer network; and
- a display step of displaying, in installation area units of the plurality of machines, the gotten status information.

69. A computer-readable medium storing a program for causing a computer connected to a plurality of machines to be monitored through a computer network to execute:
- a global information getting step of periodically getting status information containing remaining amount information of a consumable article of each of the plurality of machines to be monitored;
- a data retention step of retaining the gotten status information;
- a statistical processing step of predicting statistics of the remaining amount of the consumable article based on a plurality of pieces of the retained status information of each of the plurality of machines; and
- an output step of outputting the predicted remaining amount statistics of the consumable article.

\* \* \* \* \*